(12) United States Patent
Redmond

(10) Patent No.: US 11,748,815 B2
(45) Date of Patent: *Sep. 5, 2023

(54) DEPLOYING AND IMPLEMENTING CENTRALIZED TRADING AND TRACKING COMPUTING PLATFORMS TO SUPPORT TRI-PARTY TRADING

(71) Applicant: Bank of America Corporation, Charlotte, NC (US)

(72) Inventor: Valerie J. Redmond, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/516,034

(22) Filed: Nov. 1, 2021

(65) Prior Publication Data
US 2022/0058741 A1 Feb. 24, 2022

Related U.S. Application Data

(63) Continuation of application No. 16/675,425, filed on Nov. 6, 2019, now Pat. No. 11,227,336, which is a
(Continued)

(51) Int. Cl.
*G06Q 40/00* (2023.01)
*G06Q 40/06* (2012.01)
*G06Q 40/04* (2012.01)

(52) U.S. Cl.
CPC ............ *G06Q 40/06* (2013.01); *G06Q 40/04* (2013.01)

(58) Field of Classification Search
None
See application file for complete search history.

(56) References Cited

U.S. PATENT DOCUMENTS

| 7,424,303 | B2 | 9/2008 | Al-Sarawi |
| 7,428,506 | B2 | 9/2008 | Waelbroeck et al. |

(Continued)

OTHER PUBLICATIONS

Federal-Reserve, "Trading and Capital-Markets Activities Manual, Overview of Risk Management in Trading Activities," Section 2000.1, 1998. Retrieved from <https://www.federalreserve.gov/boarddocs/supmanual/trading/2000p1.pdf>.*

(Continued)

*Primary Examiner* — Olabode Akintola
(74) *Attorney, Agent, or Firm* — Banner & Witcoff, Ltd.

(57) ABSTRACT

Methods, systems, and computer-readable media for deploying and implementing centralized trading and tracking computing platforms to support tri-party trading are presented. In some embodiments, a central trading computing platform may receive, from a discretionary and managed accounts administration computer system associated with a financial institution, trade information defining one or more trades in one or more mutual funds for one or more accounts administrated by the financial institution. Subsequently, the central trading computing platform may validate the trade information and create order information based on the trade information. Then, the computing platform may send the order information to a clearing entity computer system. The order information created may be configured to cause the clearing entity computer system to settle the one or more trades in the one or more mutual funds for the one or more accounts administrated by the financial institution with a custodian different from the financial institution.

20 Claims, 37 Drawing Sheets

Related U.S. Application Data continuation of application No. 14/843,032, filed on Sep. 2, 2015, now Pat. No. 10,489,858.

(56) References Cited

U.S. PATENT DOCUMENTS

| | | | |
|---|---|---|---|
| 7,454,376 B1 * | 11/2008 | Argenbright | G06Q 40/00 |
| | | | 705/35 |
| 7,729,973 B2 | 6/2010 | Chada et al. | |
| 2002/0038277 A1 | 3/2002 | Yuan | |
| 2004/0019562 A1 | 1/2004 | Viberg | |
| 2004/0064398 A1 | 4/2004 | Browne et al. | |
| 2004/0236660 A1 | 11/2004 | Thomas et al. | |
| 2005/0108153 A1 | 5/2005 | Thomas et al. | |
| 2005/0187857 A1 | 8/2005 | Tull | |
| 2005/0222941 A1 | 10/2005 | Tull | |
| 2006/0026090 A1 * | 2/2006 | Balabon | G06Q 40/04 |
| | | | 705/37 |
| 2006/0253361 A1 | 11/2006 | Robinson et al. | |
| 2006/0282356 A1 | 12/2006 | Andres et al. | |
| 2008/0228661 A1 | 9/2008 | Silitch et al. | |
| 2008/0281751 A1 | 11/2008 | Robinson et al. | |
| 2008/0288387 A1 | 11/2008 | Meyerhoff, II | |
| 2009/0307124 A1 | 12/2009 | Meyerhoff, II | |
| 2010/0030705 A1 | 2/2010 | Tharmananthar et al. | |
| 2010/0169205 A1 | 7/2010 | Labuszewski et al. | |
| 2011/0145128 A1 | 6/2011 | Hukkawala et al. | |
| 2011/0191233 A1 | 8/2011 | Russo et al. | |
| 2011/0196778 A1 * | 8/2011 | Vinokour | G06Q 40/04 |
| | | | 705/37 |
| 2011/0313906 A1 | 12/2011 | Jin et al. | |
| 2012/0011081 A1 | 1/2012 | Blank | |
| 2012/0136808 A1 | 5/2012 | Blank | |
| 2012/0143744 A1 | 6/2012 | Meyerhoff, II | |
| 2012/0150714 A1 | 6/2012 | Agbor | |
| 2012/0150715 A1 | 6/2012 | Boudreault et al. | |
| 2012/0259796 A1 | 10/2012 | Blank et al. | |
| 2013/0097066 A1 | 4/2013 | Blank et al. | |
| 2013/0191264 A1 | 7/2013 | Robinson | |
| 2013/0318006 A1 | 11/2013 | Morik et al. | |
| 2014/0122372 A1 | 5/2014 | Silitch et al. | |
| 2014/0129416 A1 | 5/2014 | Boudreault et al. | |
| 2014/0180907 A1 | 6/2014 | Blank et al. | |
| 2014/0188691 A1 | 7/2014 | Blank et al. | |
| 2014/0222659 A1 | 8/2014 | Labuszewski et al. | |
| 2014/0279351 A1 | 9/2014 | Christiansen et al. | |
| 2014/0279368 A1 | 9/2014 | Chan | |
| 2014/0279697 A1 | 9/2014 | Blank et al. | |
| 2014/0344135 A1 | 11/2014 | Steiner | |
| 2015/0032591 A1 | 1/2015 | Jacob | |
| 2015/0073949 A1 | 3/2015 | Armstrong et al. | |
| 2015/0081501 A1 | 3/2015 | Chakar et al. | |
| 2015/0081591 A1 | 3/2015 | Chakar et al. | |

OTHER PUBLICATIONS

Jan. 26, 2018 (US) Non-Final Office Action—U.S. Appl. No. 14/843,083.

Jul. 9, 2018 (US) Final Office Action—U.S. Appl. No. 14/843,083.

Jul. 12, 2018 (US) Non-Final Office Action—U.S. Appl. No. 14/842,921.

Jan. 24, 2019 (US) Final Office Action—U.S. Appl. No. 14/842,921.

May 6, 2019 (US) Notice of Allowance and Fees Due—U.S. Appl. No. 14/842,921.

Federal Reserve, "Trading and Capital-Markets Activities Manual, Overview of Risk Management in Trading Activities," Section 2000.1, 1998, retrieved from: <https://www.federalreserve.gov/boarddocs/supmanual/trading/2000p1.pdf Feb1998>), 92 pages.

Apr. 29, 2019 (US) Notice of Allowance and Fees Due—U.S. Appl. No. 14/843,083.

Sep. 10, 2019 (US) Notice of Allownce and Fee Due—U.S. Appl. No. 14/842,921.

Mialkiel, Burton G., "Asset Management Fees and the Growth of Finance," Spring 2013, Journal of Economic Perspective, vol. 27, pp. 99-107.

Nov. 6, 2019 (US) Notice of Allowance and Fees Due—U.S. Appl. No. 14/843,083.

Nov. 18, 2019 (US) Non-Final Office Action—U.S. Appl. No. 16/573,085.

Mar. 17, 2020 (US) Notice of Allowance and Fees Due—U.S. Appl. No. 16/573,085.

* cited by examiner

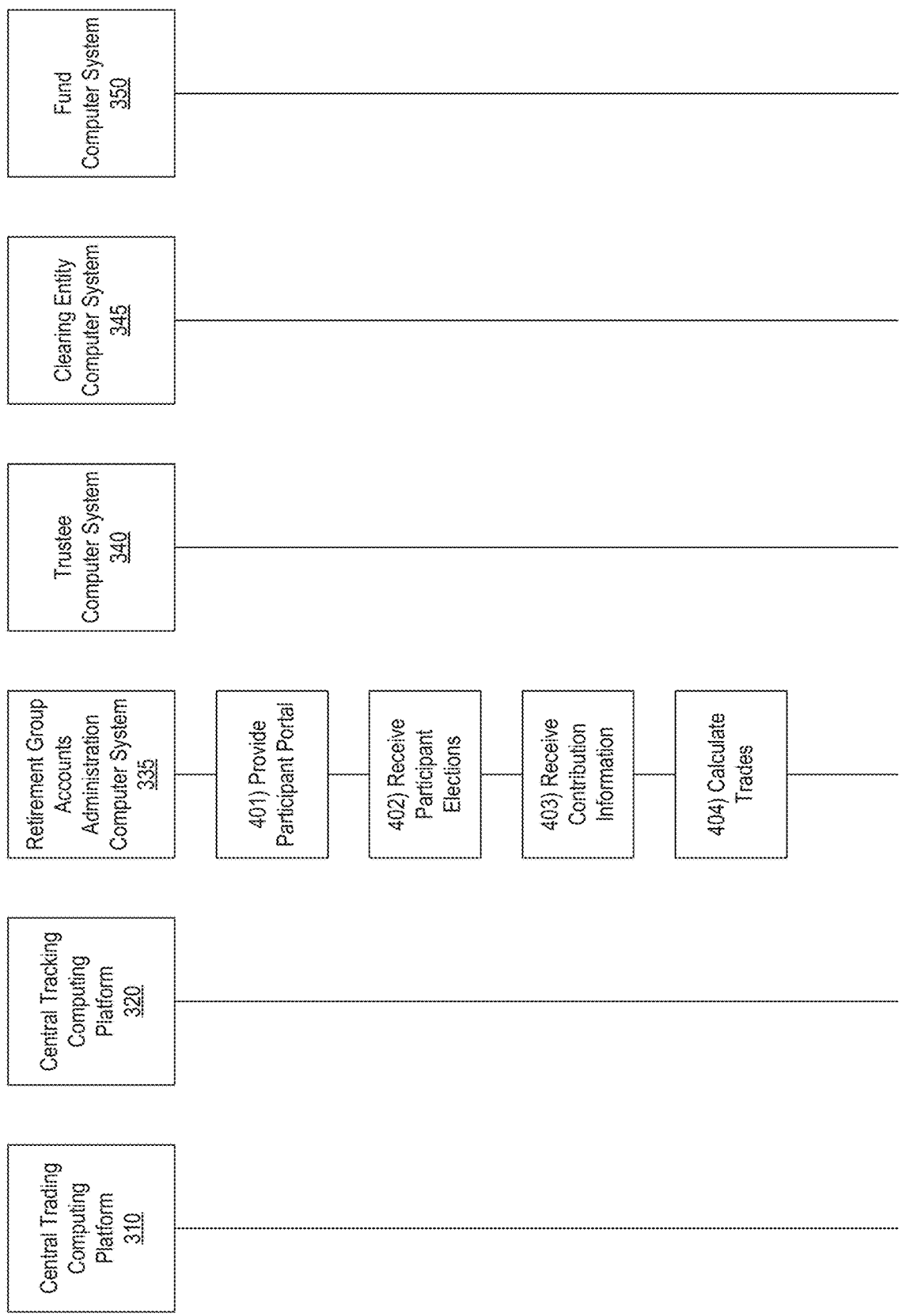

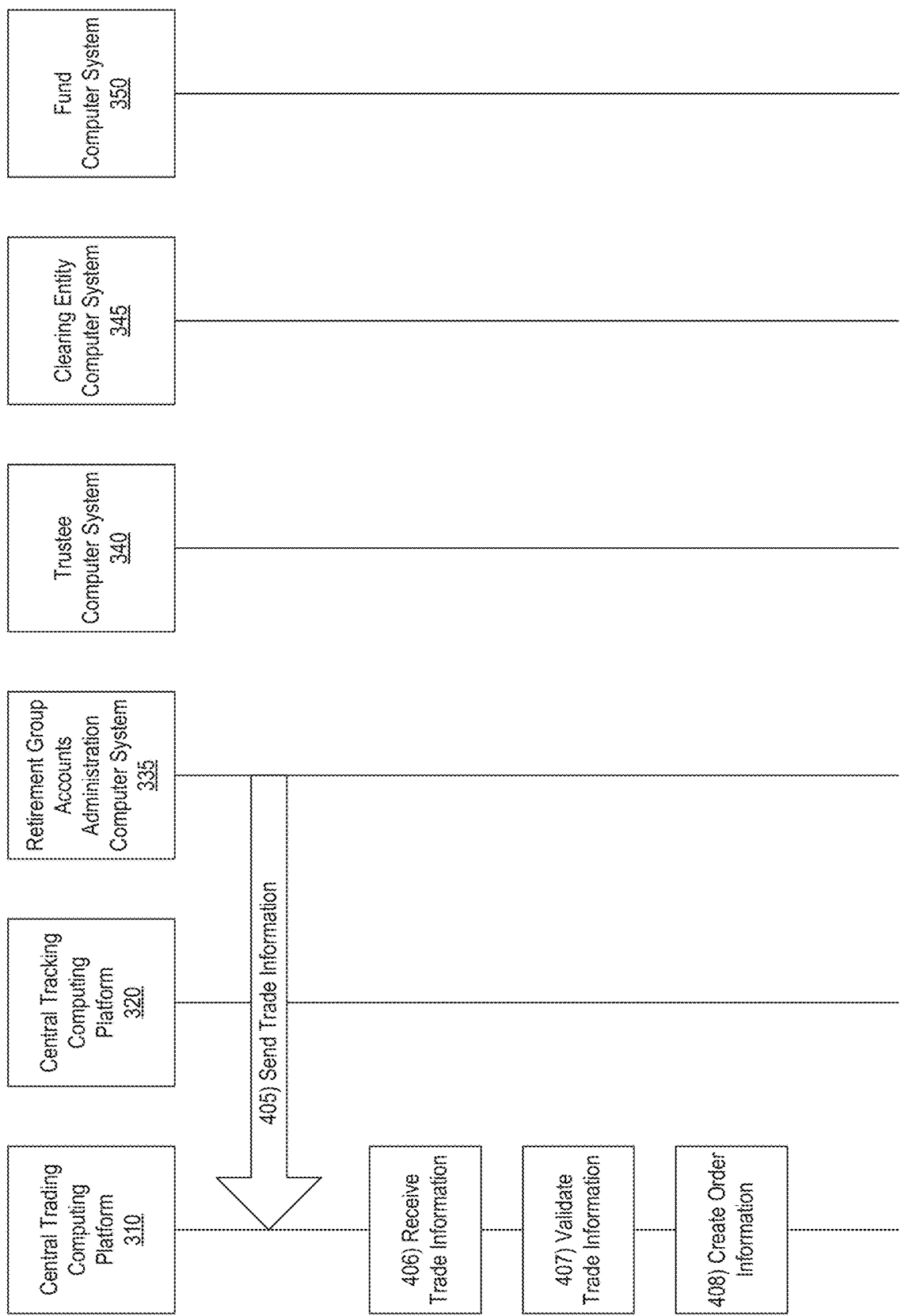

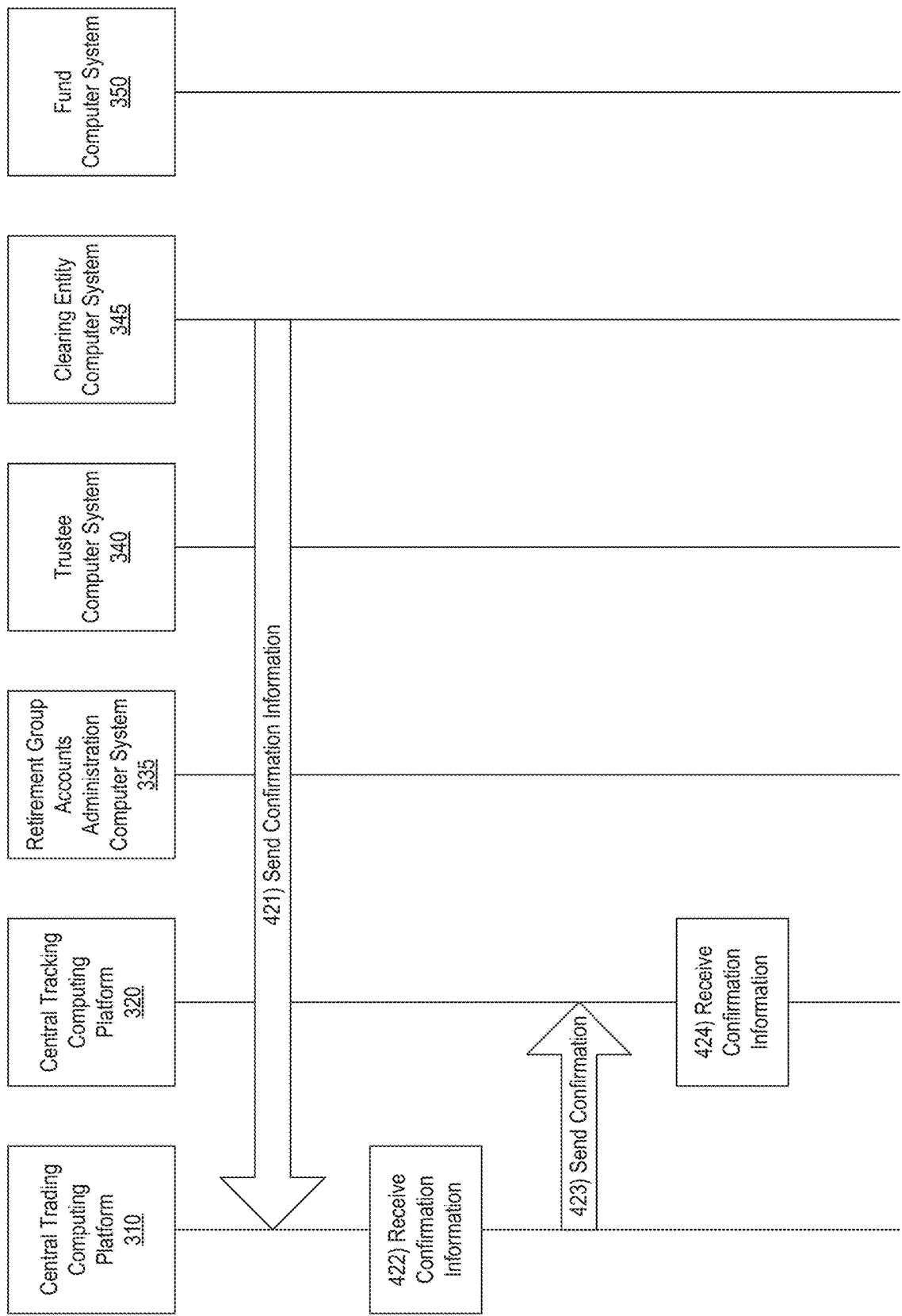

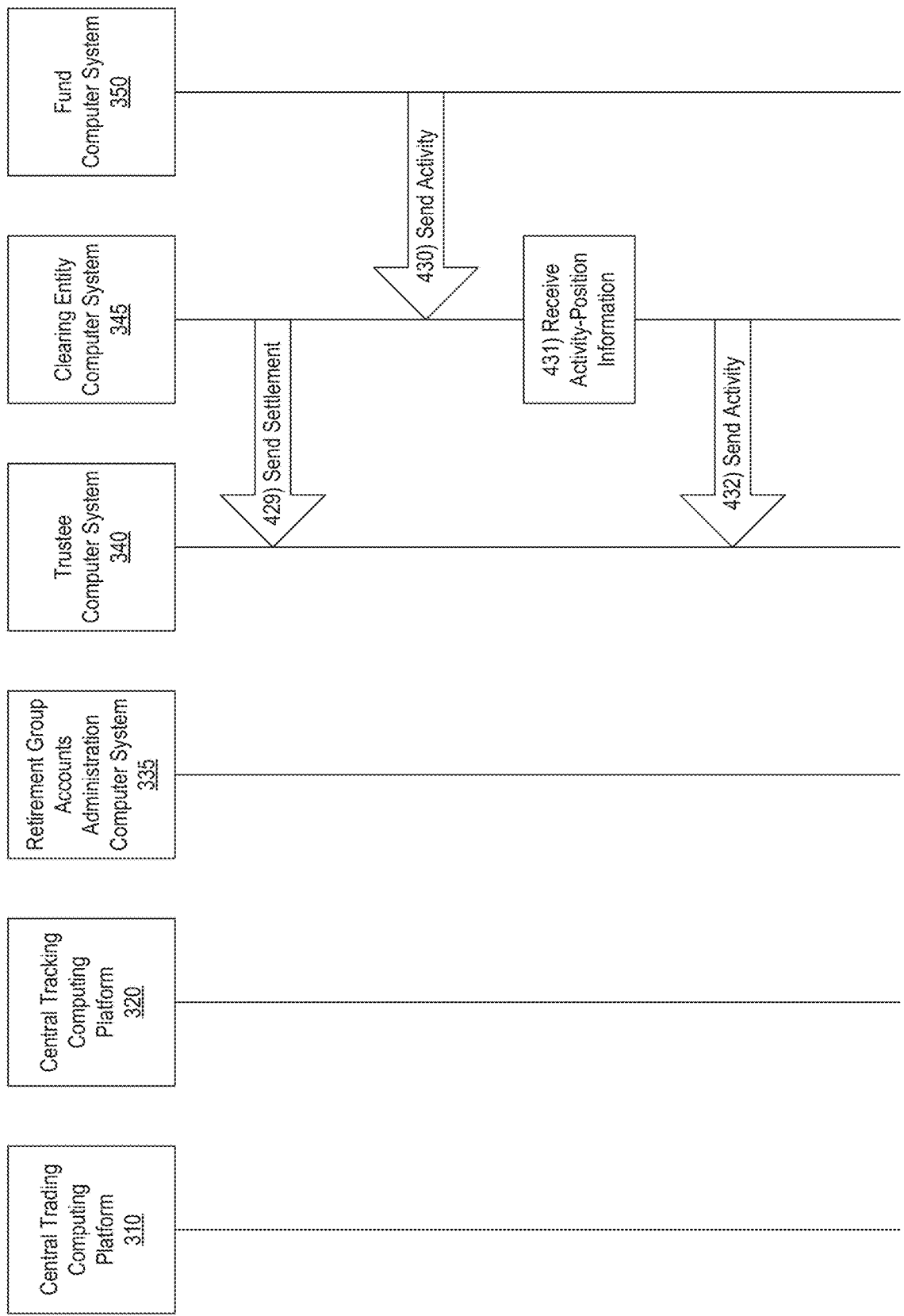

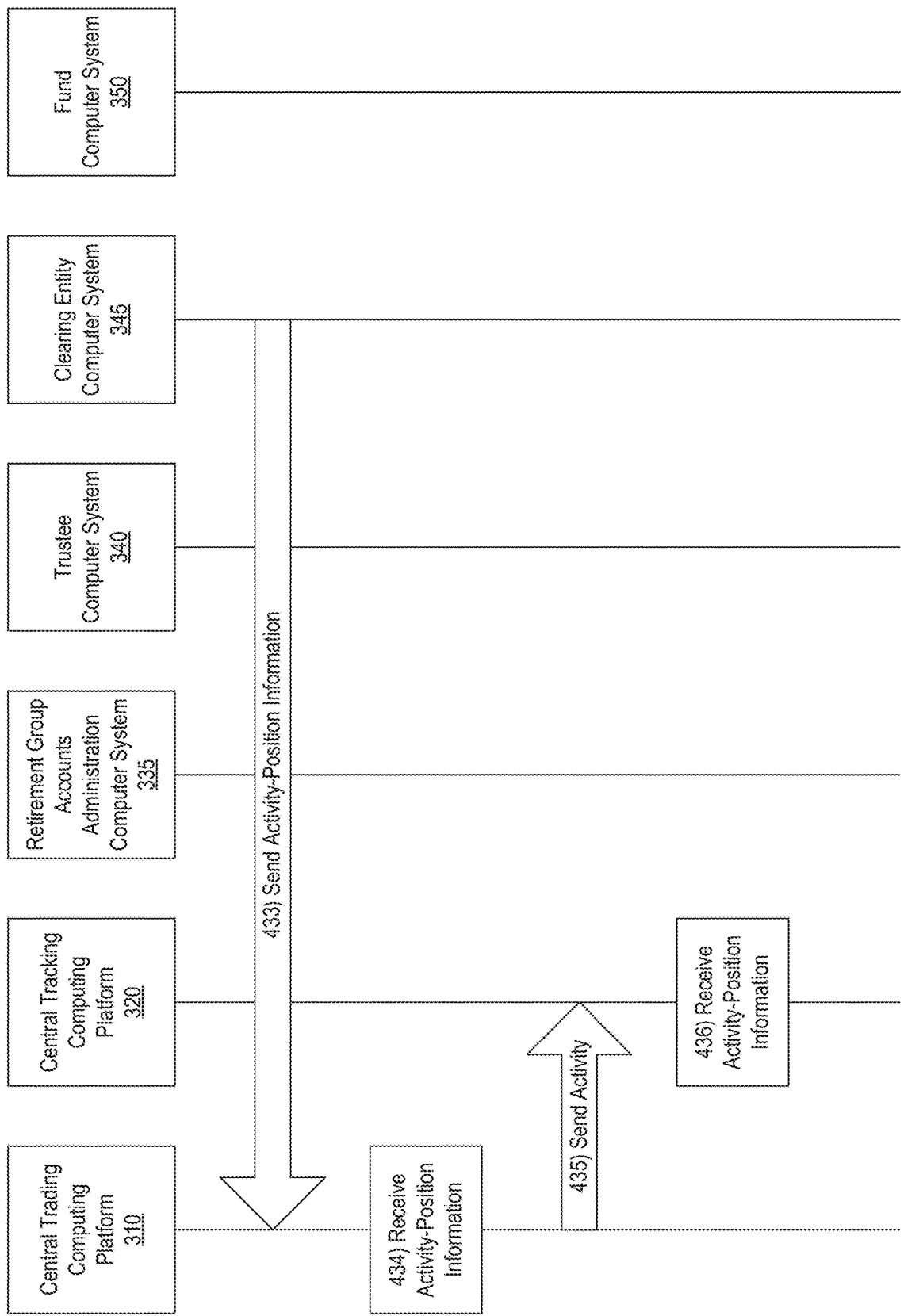

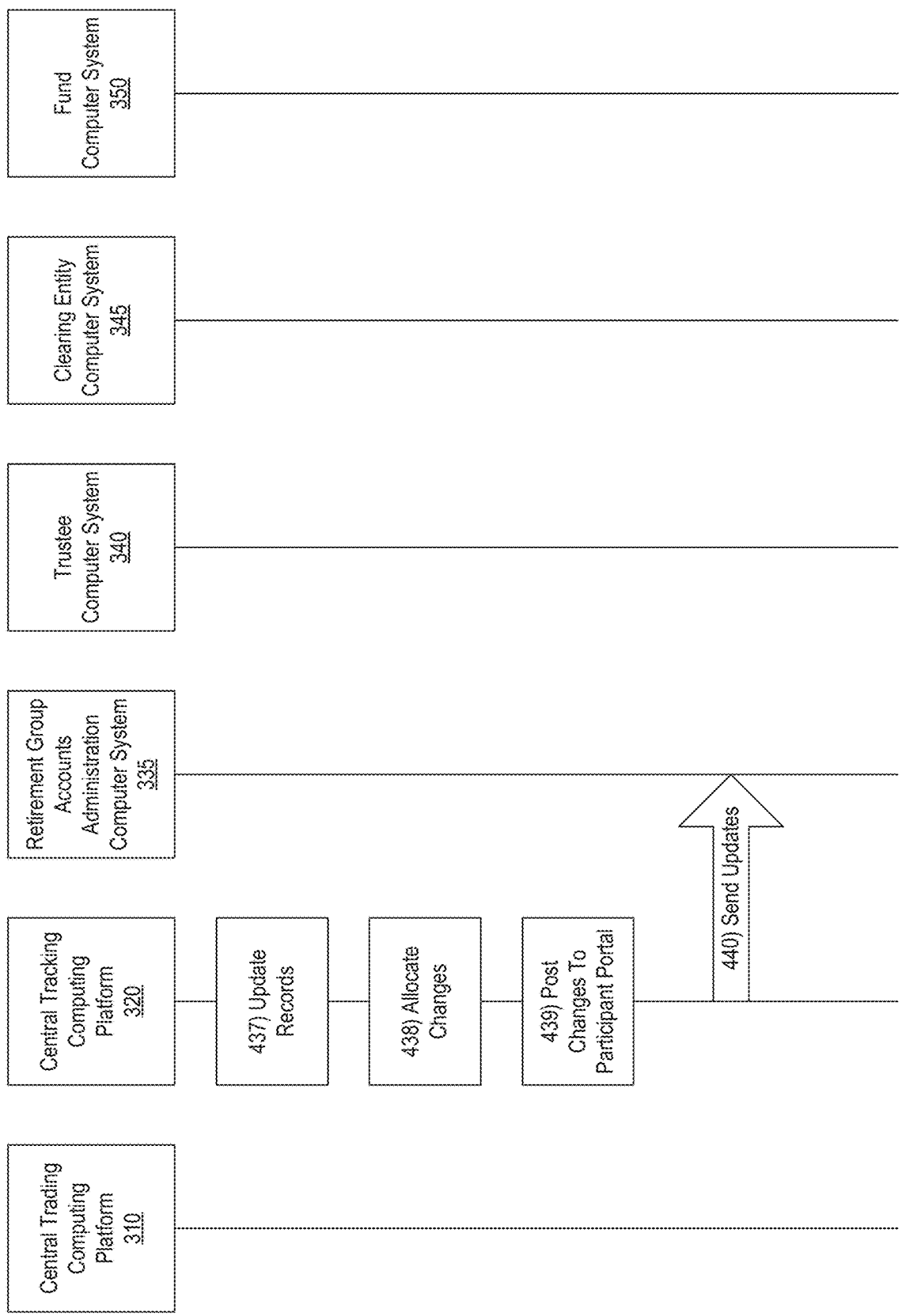

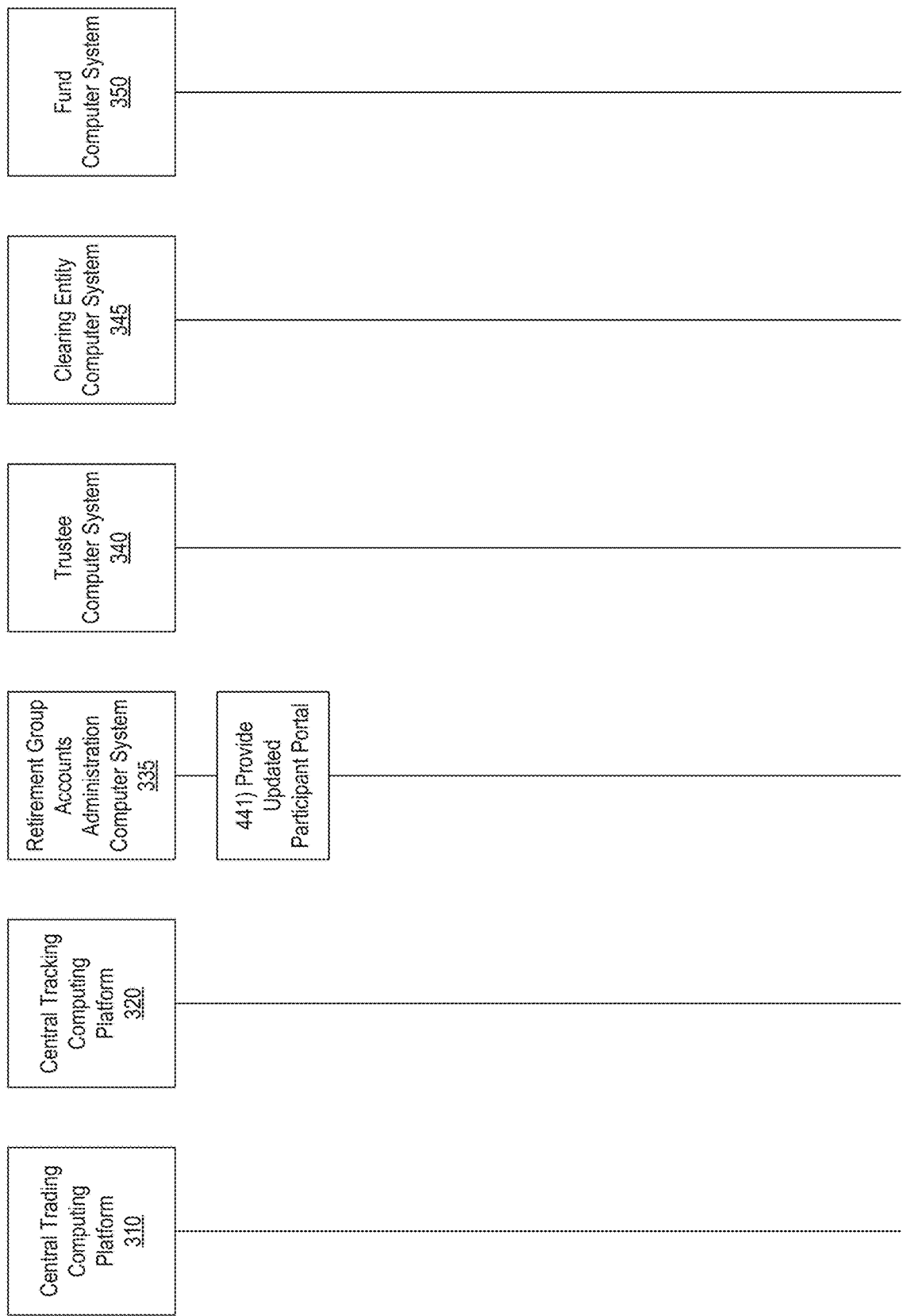

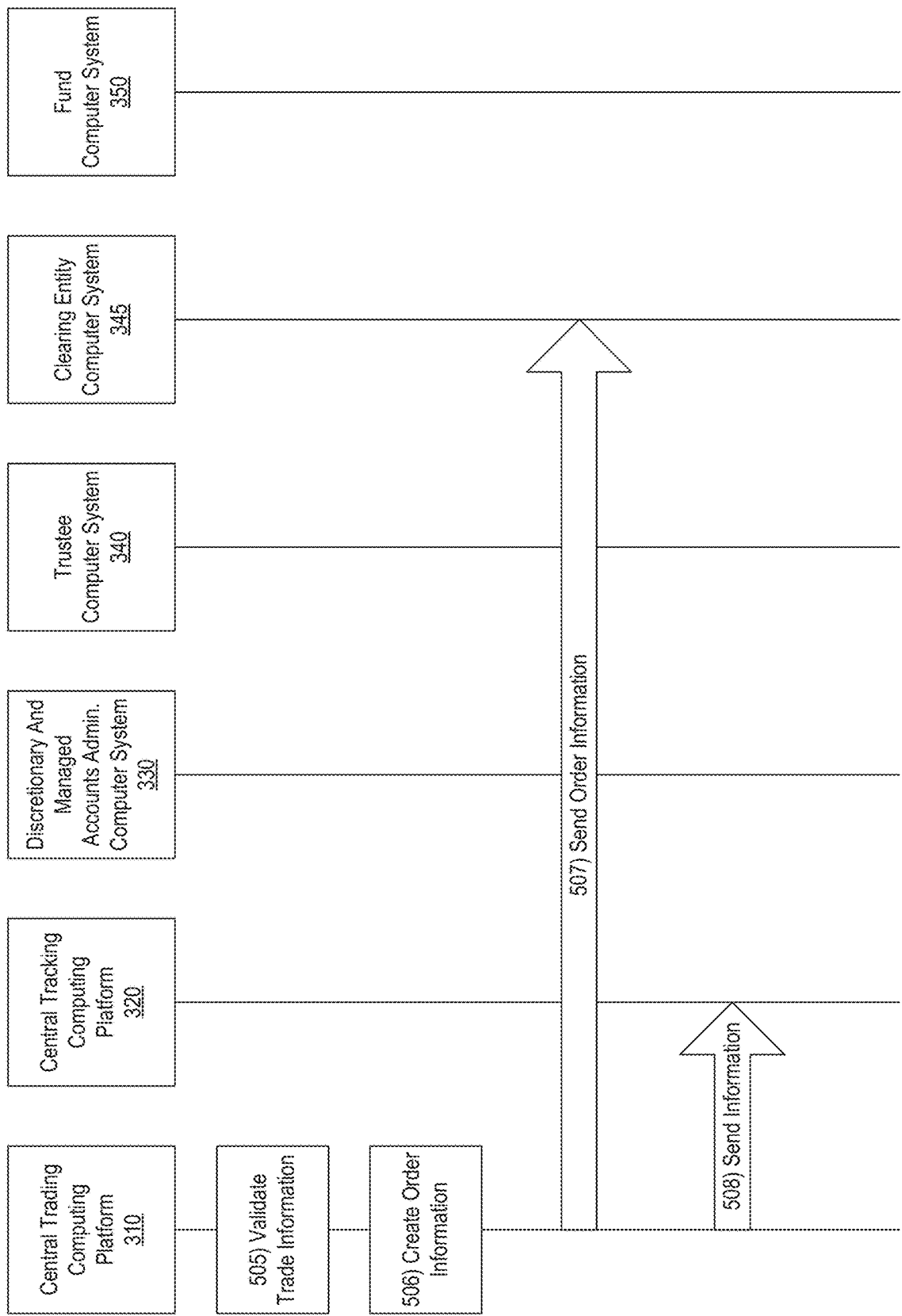

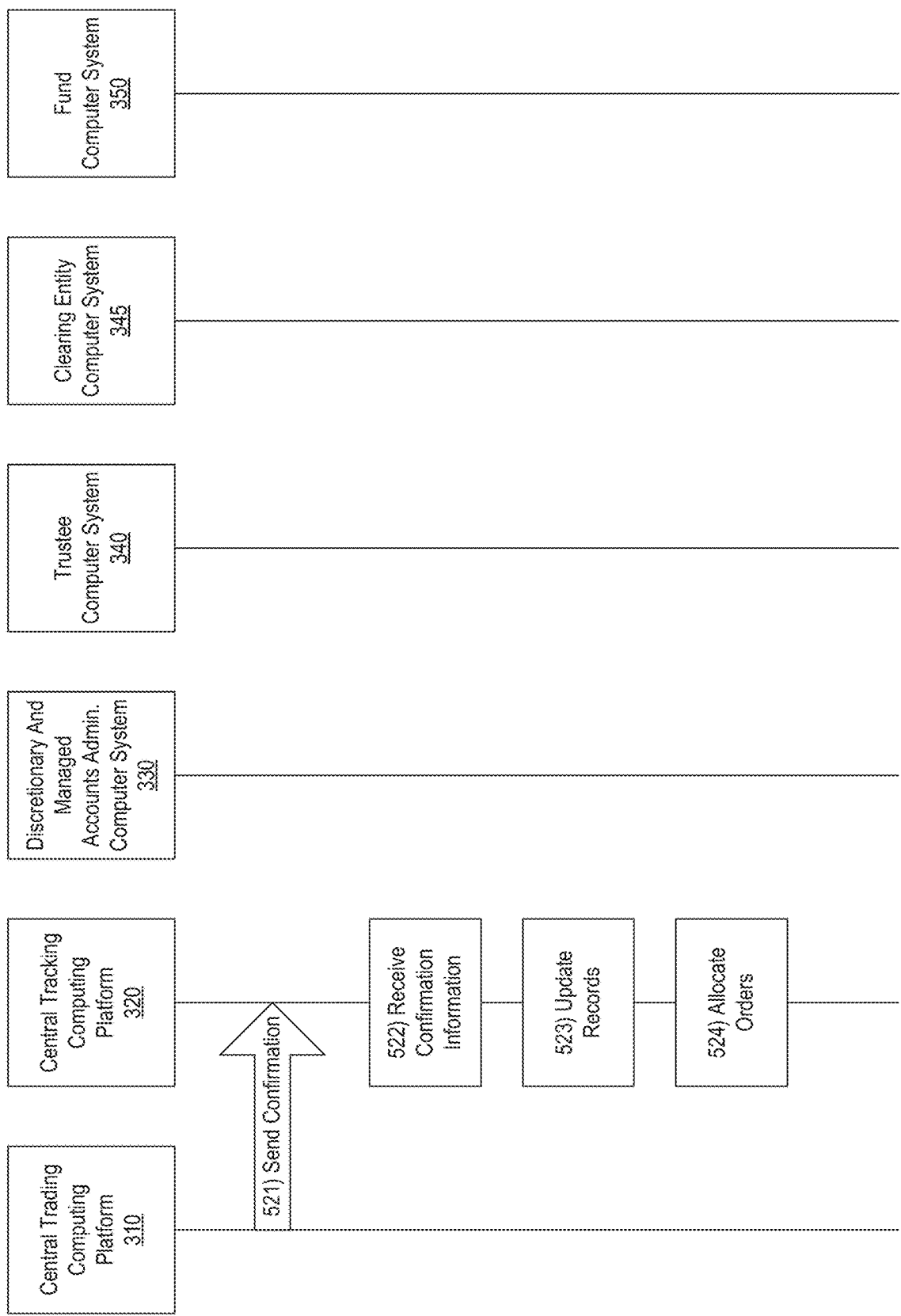

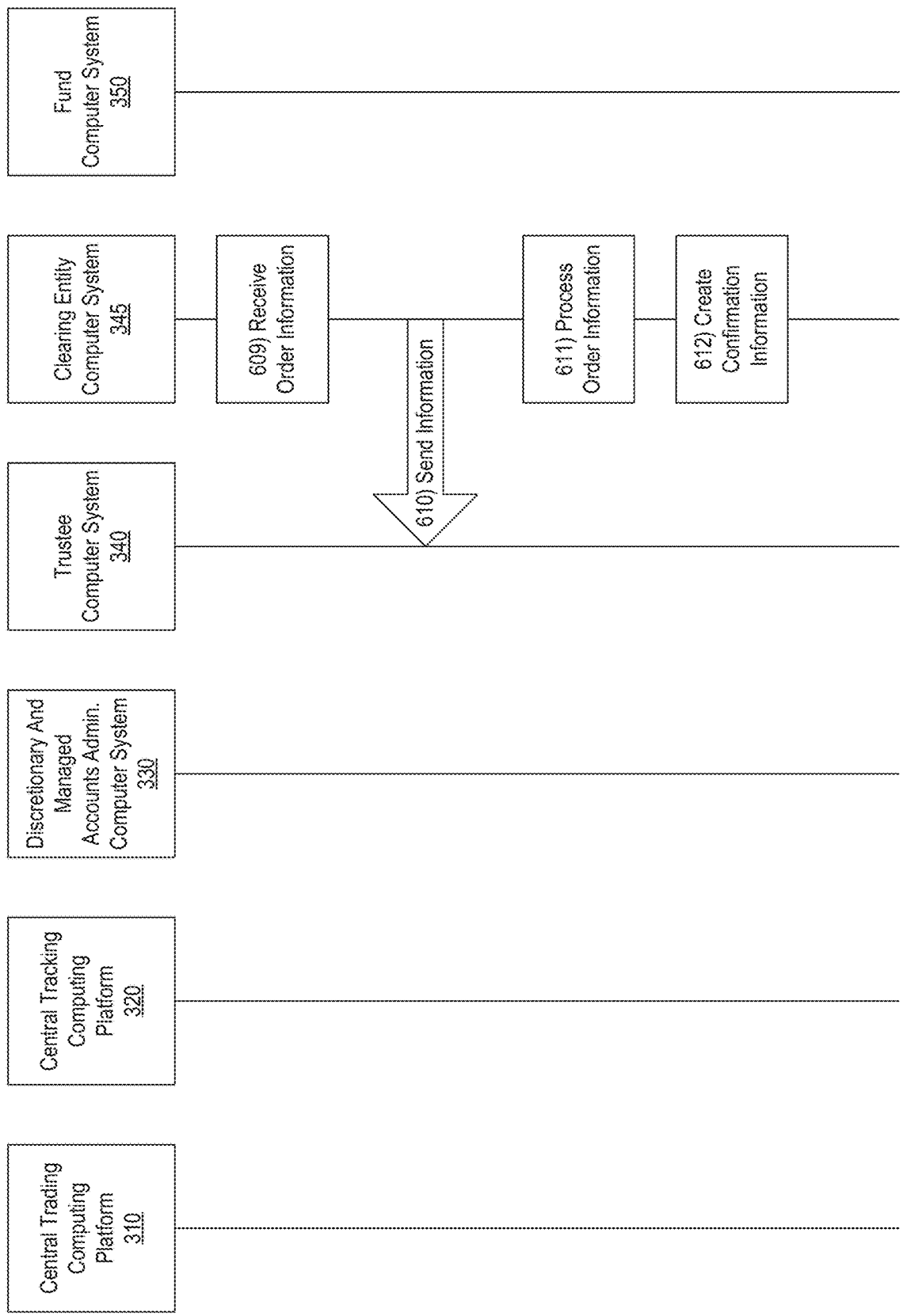

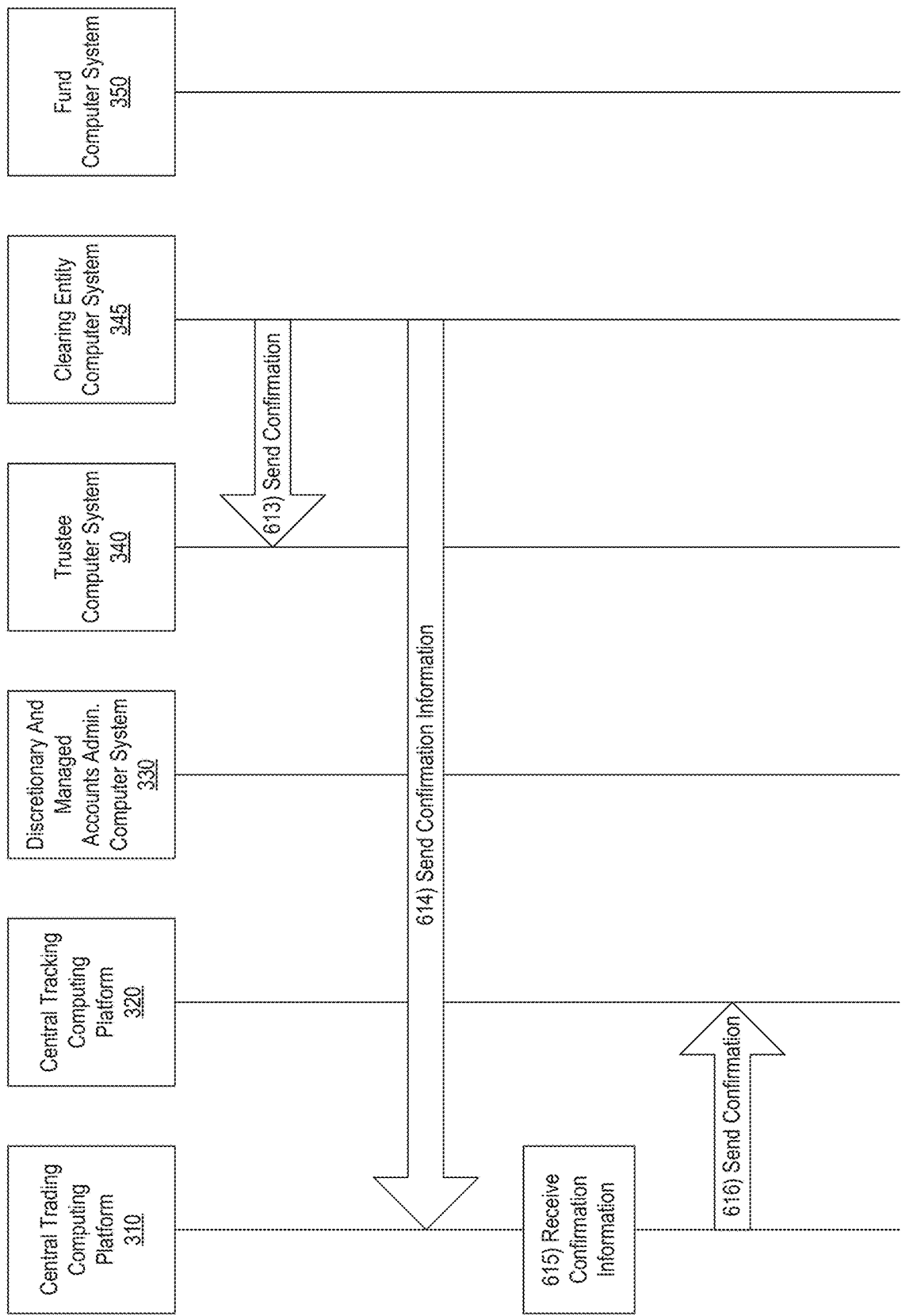

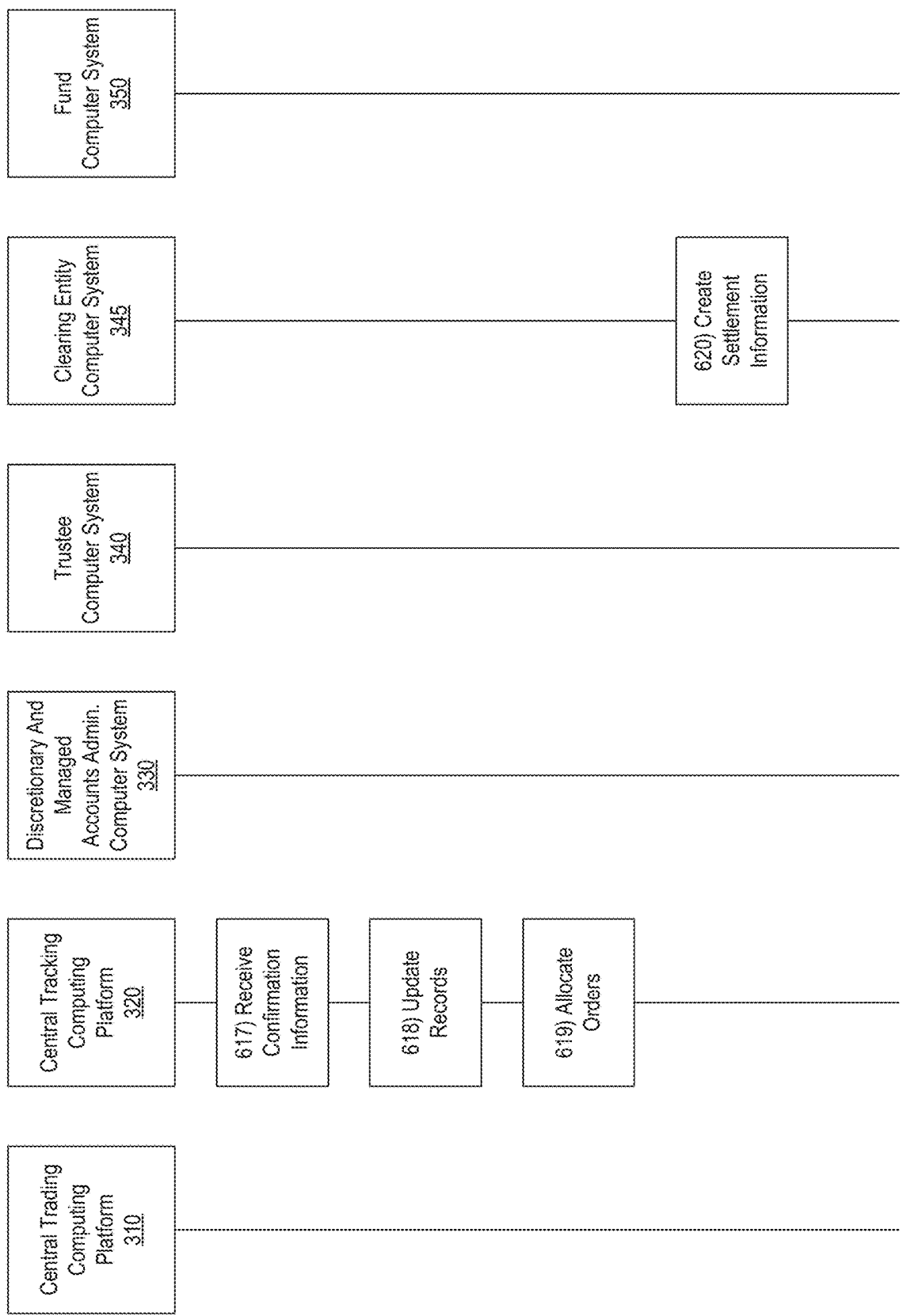

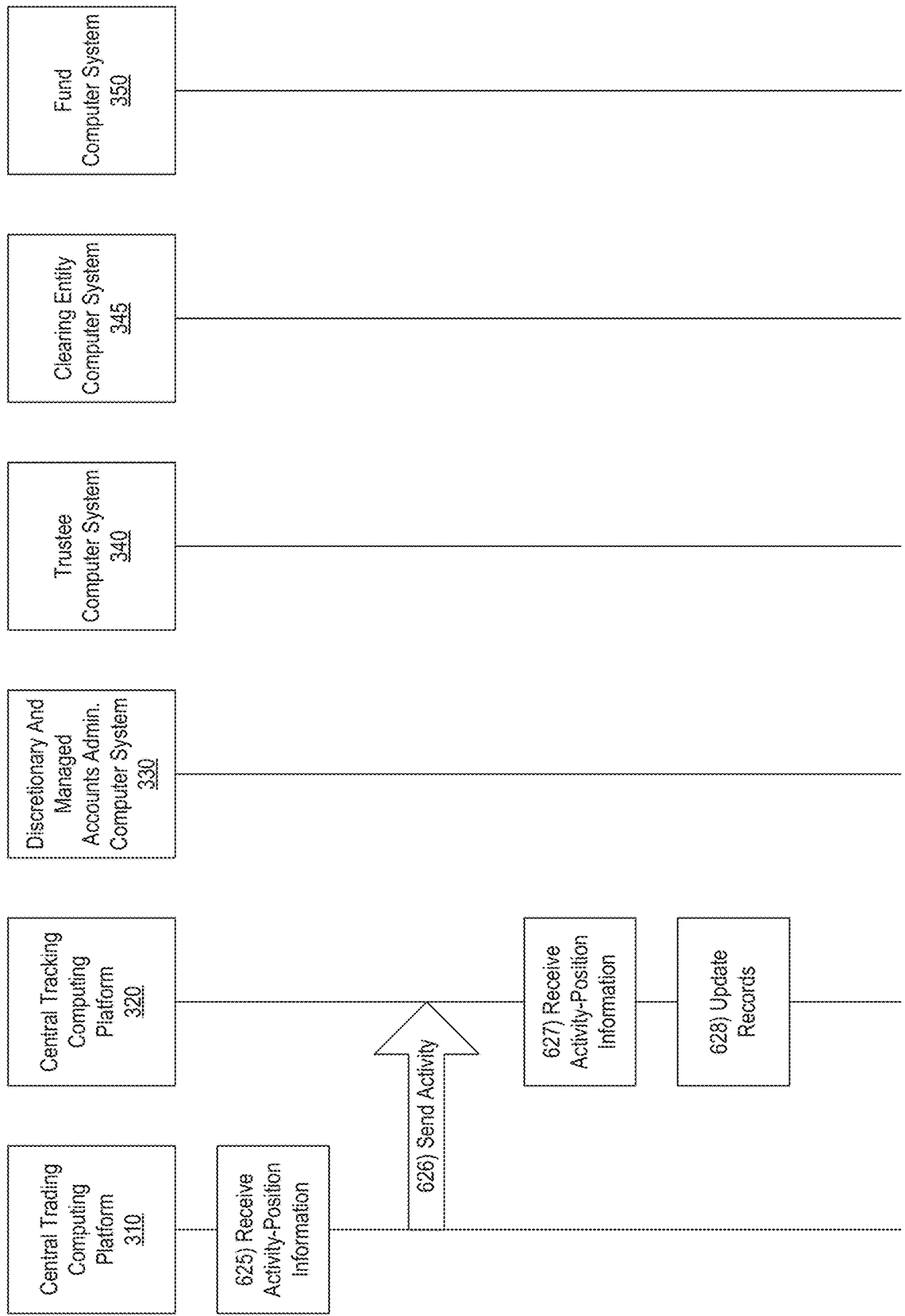

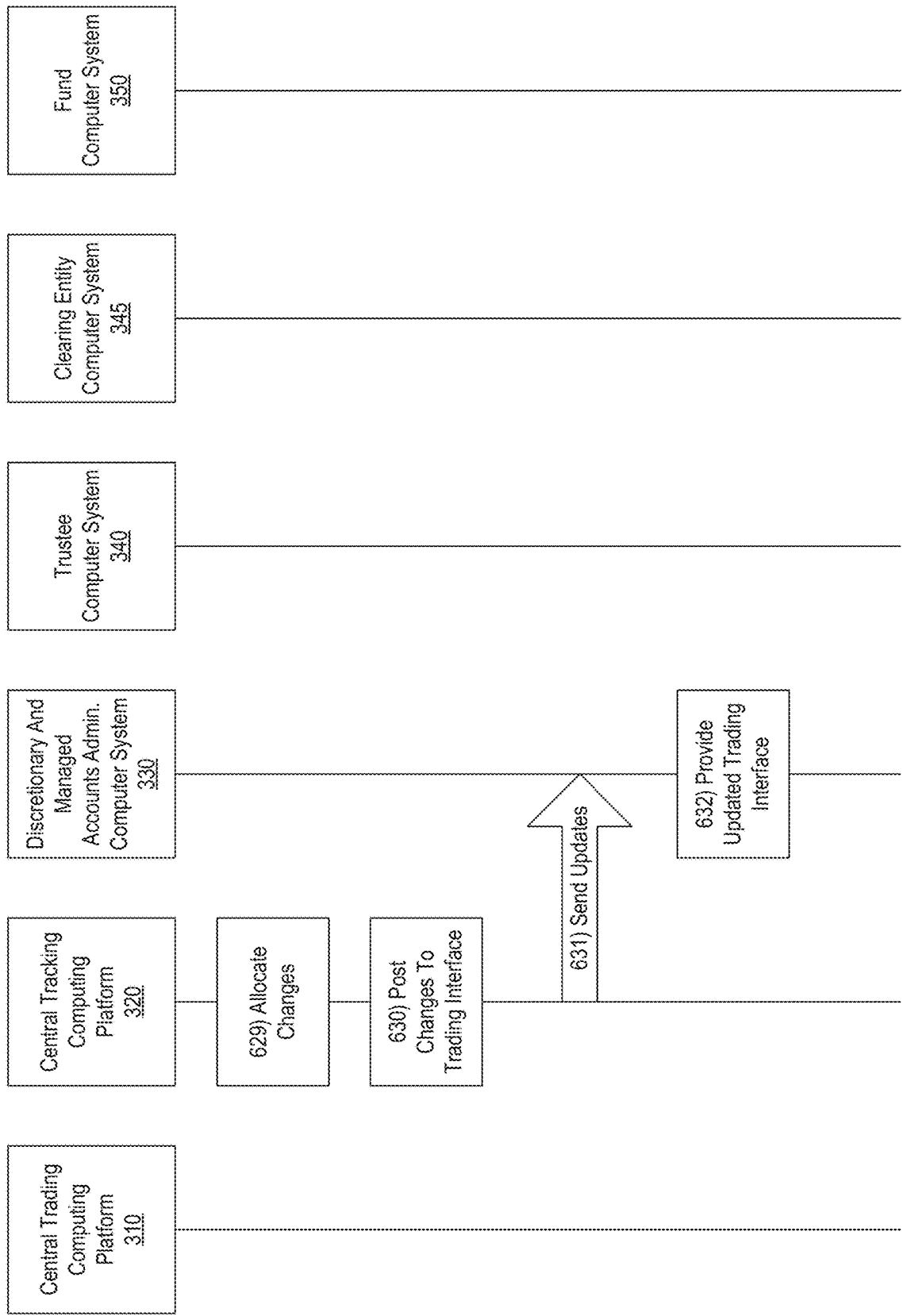

DEPLOYING AND IMPLEMENTING CENTRALIZED TRADING AND TRACKING COMPUTING PLATFORMS TO SUPPORT TRI-PARTY TRADING

CROSS-REFERENCE TO RELATED APPLICATIONS

This application claims the benefit of and is a continuation of co-pending U.S. patent application Ser. No. 16/675,425, filed Nov. 6, 2019, and entitled, "Deploying and Implementing Centralized Trading and Tracking Computing Platforms to Support Tri-Party Trading," which is a continuation of and claims the benefit of U.S. application Ser. No. 14/843,032 (now U.S. Pat. No. 10,489,858), filed Sep. 2, 2015, and entitled "Deploying and Implementing Centralized Trading and Tracking Computing Platforms to Support Tri-Party Trading," all of which are incorporated by reference herein in their entirety.

BACKGROUND

Aspects of the disclosure relate to computer hardware and software. In particular, one or more aspects of the disclosure generally relate to computer hardware and software for deploying and implementing centralized trading and tracking computing platforms to support tri-party trading.

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to efficiently, effectively, securely, and uniformly manage its computer systems, and particularly manage how internal computer systems exchange information with external computer systems in providing and/or supporting different products and services offered by the organization.

SUMMARY

Aspects of the disclosure relate to computer systems that provide effective, efficient, scalable, and convenient ways of securely and uniformly managing how internal computer systems exchange information with external computer systems to provide and/or support different products and services offered by an organization, such as a financial institution.

For example, one or more aspects of the disclosure relate to centralized trading and tracking computing platforms that may perform various functions, including supporting tri-party trading, and may integrate with other computer systems operated by an organization, such as a financial institution. As illustrated in greater detail below, the centralized trading and tracking computing platforms may support trading operations in which a financial institution operating the centralized trading and tracking computing platforms trades assets that are held away from the financial institution by a third-party custodian or trustee on behalf of a customer or other beneficiary.

Increasingly, some customers of financial institutions, such as organizations that operate employer-sponsored retirement plans and other large investors that may have assets that are traded, held, or managed by a financial institution, may wish to have some or all of their assets held away from the financial institution (e.g., by a third-party trustee or other custodian) to mitigate the risks that might otherwise arise if all of their assets were held by a single financial institution. As discussed in greater detail below, one way that this can be accomplished is by utilizing DAC/RAP (delivery against collateral—receipt against payment) in which certain assets are held by a trustee-custodian for a beneficiary, and a third-party administrator (e.g., the financial institution) trades the assets on behalf of the beneficiary. These arrangements may present certain difficulties, however, as the third-party administrator might not have current position information for the assets (which may, e.g., identify the current price and/or value of the assets, the current quantity of the assets, and/or other attributes of the assets), since they are held by another entity (e.g., the trustee-custodian), and accordingly might not be able to accurately trade the assets that are held by the trustee-custodian, if at all. For example, any position information that the third-party administrator has may be outdated, for instance, if the trustee-custodian only provides statements to the third-party administrator on a monthly basis, or simply inaccurate, for instance, if the beneficiary has gone to the trustee-custodian and initiated a liquidation without informing the third-party administrator. These difficulties may be further complicated when the assets to be held by the trustee-custodian include one or more mutual funds, which are relatively more complex that traditional equities and exchange traded funds (ETFs) due to their fees, structures, and other characteristics. In addition, these difficulties also may be further complicated when the third-party administrator provides omnibus processing for one or more employer-sponsored retirement plans, in which all assets of all participants of a single retirement plan are held in a single account by a trustee-custodian, and the third-party administrator allocates changes in value that result from activity and trading to the various participant sub-accounts administrated by the third-party administrator and held by the trustee-custodian.

Aspects of the disclosure overcome one or more these and other issues by utilizing centralized trading and tracking computing platforms to support tri-party trading, as illustrated in greater detail below. In particular, by implementing and/or utilizing one or more aspects of the disclosure, a third-party administrator may be able to have an up-to-date, if not real-time, view of the assets held by a trustee-custodian on behalf of a beneficiary for which the third-party administrator trades. One or more of these features may enable the third-party administrator to more accurately and confidently trade the assets held by the trustee-custodian, and further may enable the third-party administrator to trade in complex mutual funds that are held by the trustee-custodian, in addition to equities and ETFs, even though the assets are held away by the trustee-custodian. In addition, in instances in which the third-party administrator provides omnibus processing for a retirement plan in which assets are held by a trustee-custodian, some aspects of the disclosure enable the third-party administrator to provide a more accurate view of positions held by individual participants in the retirement plan to such participants view one or more client portal user interfaces, as the trade data, activity data, and/or position data that may be included in and/or used in generating such client portal user interfaces may be updated more frequently and/or on an on-demand basis.

Some aspects of the disclosure relate to deploying and implementing centralized trading and tracking computing platforms to support tri-party trading associated with a retirement group of a financial institution trading in mutual funds in which assets are held away by a trustee-custodian. In particular, in accordance with one or more embodiments, a central trading computing platform having at least one processor, a memory, and a communication interface may receive, via the communication interface, and from a retirement group accounts administration computer system associated with a financial institution, trade information defining one or more trades in one or more mutual funds for one or more accounts administrated by the financial institution. Subsequently, the central trading computing platform may validate the trade information defining the one or more trades in the one or more mutual funds for the one or more accounts administrated by the financial institution received from the retirement group accounts administration computer system associated with the financial institution. After validating the trade information defining the one or more trades in the one or more mutual funds for the one or more accounts administrated by the financial institution received from the retirement group accounts administration computer system associated with the financial institution, the central trading computing platform may create order information based on the trade information defining the one or more trades in the one or more mutual funds for the one or more accounts administrated by the financial institution received from the retirement group accounts administration computer system associated with the financial institution. Thereafter, the central trading computing platform may send, via the communication interface, and to a clearing entity computer system, the order information created based on the trade information defining the one or more trades in the one or more mutual funds for the one or more accounts administrated by the financial institution received from the retirement group accounts administration computer system associated with the financial institution. In some instances, the order information created based on the trade information defining the one or more trades in the one or more mutual funds for the one or more accounts administrated by the financial institution received from the retirement group accounts administration computer system associated with the financial institution may be configured to cause the clearing entity computer system to settle the one or more trades in the one or more mutual funds for the one or more accounts administrated by the financial institution with a custodian different from the financial institution.

In some embodiments, the retirement group accounts administration computer system associated with the financial institution may be configured to provide one or more retirement plan user interfaces to one or more participants in an employer-sponsored retirement plan administered by the financial institution. In some instances, the retirement group accounts administration computer system associated with the financial institution may be configured to receive one or more participant elections from the one or more participants in the employer-sponsored retirement plan administered by the financial institution via the one or more retirement plan user interfaces provided to the one or more participants in the employer-sponsored retirement plan administered by the financial institution. In some instances, the retirement group accounts administration computer system associated with the financial institution may be configured to receive contribution information associated with one or more payroll contributions made by the one or more participants in the employer-sponsored retirement plan administered by the financial institution to the employer-sponsored retirement plan administered by the financial institution. In some instances, the retirement group accounts administration computer system associated with the financial institution may be configured to calculate the one or more trades in the one or more mutual funds for the one or more accounts administrated by the financial institution based on the contribution information associated with the one or more payroll contributions made by the one or more participants in the employer-sponsored retirement plan administered by the financial institution to the employer-sponsored retirement plan administered by the financial institution.

In some instances, validating the trade information defining the one or more trades in the one or more mutual funds for the one or more accounts administrated by the financial institution received from the retirement group accounts administration computer system associated with the financial institution may include accepting the one or more trades in the one or more mutual funds for the one or more accounts administrated by the financial institution based on one or more processing rules associated with the one or more mutual funds and based on one or more product rules associated with the one or more mutual funds.

In some instances, creating the order information based on the trade information defining the one or more trades in the one or more mutual funds for the one or more accounts administrated by the financial institution received from the retirement group accounts administration computer system associated with the financial institution may include adding one or more indicators identifying the custodian different from the financial institution to the trade information defining the one or more trades in the one or more mutual funds for the one or more accounts administrated by the financial institution received from the retirement group accounts administration computer system associated with the financial institution.

In some instances, the custodian may hold one or more assets of the employer-sponsored retirement plan administered by the financial institution in trust, such that the one or more assets of the employer-sponsored retirement plan administered by the financial institution are held away from the financial institution. In some instances, the one or more assets of the employer-sponsored retirement plan administered by the financial institution may be held in a single combined account, and the central trading computing platform may provide omnibus processing for the financial institution by allocating the one or more assets of the employer-sponsored retirement plan administered by the financial institution to the one or more participants in the employer-sponsored retirement plan administered by the financial institution.

In some instances, the central trading computing platform may receive, via the communication interface, and from the clearing entity computer system, activity-position information associated with the one or more mutual funds. Subsequently, the central trading computing platform may send, via the communication interface, and to a central tracking computing platform associated with the financial institution, the activity-position information associated with the one or more mutual funds received from the clearing entity computer system.

In some instances, the central tracking computing platform associated with the financial institution may be configured to update billing information, supervision information, and reconciliation information based on the activity-position information associated with the one or more mutual funds received from the clearing entity computer system. In some instances, the central tracking computing platform associated with the financial institution may be configured to allocate changes identified in the activity-position information associated with the one or more mutual funds received from the clearing entity computer system to the one or more participants in the employer-sponsored retirement plan administered by the financial institution. In some instances, the central tracking computing platform associated with the financial institution may be configured to post the changes identified in the activity-position information associated with the one or more mutual funds received from the clearing entity computer system and allocated to the one or more participants in the employer-sponsored retirement plan administered by the financial institution to a participant portal provided by the retirement group accounts administration computer system associated with the financial institution.

Some aspects of the disclosure relate to deploying and implementing centralized trading and tracking computing platforms to support tri-party trading associated with managed account advisors of a financial institution and/or financial advisors of a financial institution trading with discretion in mutual funds in which assets are held away by a trustee-custodian. In particular, in accordance with one or more embodiments, a central trading computing platform having at least one processor, a memory, and a communication interface may receive, via the communication interface, and from a discretionary and managed accounts administration computer system associated with a financial institution, trade information defining one or more trades in one or more mutual funds for one or more accounts administrated by the financial institution. Subsequently, the central trading computing platform may validate the trade information defining the one or more trades in the one or more mutual funds for the one or more accounts administrated by the financial institution received from the discretionary and managed accounts administration computer system associated with the financial institution. After validating the trade information defining the one or more trades in the one or more mutual funds for the one or more accounts administrated by the financial institution received from the discretionary and managed accounts administration computer system associated with the financial institution, the central trading computing platform may create order information based on the trade information defining the one or more trades in the one or more mutual funds for the one or more accounts administrated by the financial institution received from the discretionary and managed accounts administration computer system associated with the financial institution. Thereafter, the central trading computing platform may send, via the communication interface, and to a clearing entity computer system, the order information created based on the trade information defining the one or more trades in the one or more mutual funds for the one or more accounts administrated by the financial institution received from the discretionary and managed accounts administration computer system associated with the financial institution. In some instances, the order information created based on the trade information defining the one or more trades in the one or more mutual funds for the one or more accounts administrated by the financial institution received from the discretionary and managed accounts administration computer system associated with the financial institution may be configured to cause the clearing entity computer system to settle the one or more trades in the one or more mutual funds for the one or more accounts administrated by the financial institution with a custodian different from the financial institution.

In some embodiments, the discretionary and managed accounts administration computer system associated with the financial institution may be configured to provide one or more trading user interfaces to one or more managed account advisors associated with the financial institution. In some instances, the discretionary and managed accounts administration computer system associated with the financial institution may be configured to receive trade input specifying the one or more trades in the one or more mutual funds for the one or more accounts administrated by the financial institution via the one or more trading user interfaces provided to the one or more managed account advisors associated with the financial institution.

In some instances, the discretionary and managed accounts administration computer system associated with the financial institution may be configured to provide one or more trading user interfaces to one or more financial advisors associated with the financial institution. In some instances, the discretionary and managed accounts administration computer system associated with the financial institution may be configured to receive trade input specifying the one or more trades in the one or more mutual funds for the one or more accounts administrated by the financial institution via the one or more trading user interfaces provided to the one or more financial advisors associated with the financial institution.

In some instances, validating the trade information defining the one or more trades in the one or more mutual funds for the one or more accounts administrated by the financial institution received from the discretionary and managed accounts administration computer system associated with the financial institution may include accepting the one or more trades in the one or more mutual funds for the one or more accounts administrated by the financial institution based on one or more processing rules associated with the one or more mutual funds and based on one or more product rules associated with the one or more mutual funds.

In some instances, creating the order information based on the trade information defining the one or more trades in the one or more mutual funds for the one or more accounts administrated by the financial institution received from the discretionary and managed accounts administration computer system associated with the financial institution may include adding one or more indicators identifying the custodian different from the financial institution to the trade information defining the one or more trades in the one or more mutual funds for the one or more accounts administrated by the financial institution received from the discretionary and managed accounts administration computer system associated with the financial institution.

In some instances, the custodian may hold one or more assets of the one or more accounts administrated by the financial institution in trust, such that the one or more assets of the one or more accounts administrated by the financial institution are held away from the financial institution.

In some instances, the central trading computing platform may receive, via the communication interface, and from the clearing entity computer system, activity-position information associated with the one or more mutual funds. Subsequently, the central trading computing platform may send, via the communication interface, and to a central tracking computing platform associated with the financial institution, the activity-position information associated with the one or more mutual funds received from the clearing entity computer system.

In some instances, the central tracking computing platform associated with the financial institution may be configured to update billing information, supervision information, and reconciliation information based on the activity-position information associated with the one or more mutual funds received from the clearing entity computer system. In some instances, the central tracking computing platform associated with the financial institution may be configured to allocate changes identified in the activity-position information associated with the one or more mutual funds received from the clearing entity computer system to one or more accountholders associated with the one or more accounts administrated by the financial institution. In some instances, the central tracking computing platform associated with the financial institution may be configured to post the changes identified in the activity-position information associated with the one or more mutual funds received from the clearing entity computer system and allocated to the one or more accountholders associated with the one or more accounts administrated by the financial institution to one or more trading applications provided by the discretionary and managed accounts administration computer system associated with the financial institution.

Some aspects of the disclosure relate to deploying and implementing centralized trading and tracking computing platforms to support tri-party trading associated with managed account advisors of a financial institution and/or financial advisors of a financial institution trading with discretion in exchanged traded funds and/or equities in which assets are held away by a trustee-custodian. In particular, in accordance with one or more embodiments, a central trading computing platform having at least one processor, a memory, and a communication interface may receive, via the communication interface, and from a discretionary and managed accounts administration computer system associated with a financial institution, trade information defining one or more trades in one or more exchange traded funds or equity securities for one or more accounts administrated by the financial institution. Subsequently, the central trading computing platform may validate the trade information defining the one or more trades in the one or more exchange traded funds or equity securities for the one or more accounts administrated by the financial institution received from the discretionary and managed accounts administration computer system associated with the financial institution. After validating the trade information defining the one or more trades in the one or more exchange traded funds or equity securities for the one or more accounts administrated by the financial institution received from the discretionary and managed accounts administration computer system associated with the financial institution, the central trading computing platform may create order information based on the trade information defining the one or more trades in the one or more exchange traded funds or equity securities for the one or more accounts administrated by the financial institution received from the discretionary and managed accounts administration computer system associated with the financial institution. Thereafter, the central trading computing platform may send, via the communication interface, and to a clearing entity computer system, the order information created based on the trade information defining the one or more trades in the one or more exchange traded funds or equity securities for the one or more accounts administrated by the financial institution received from the discretionary and managed accounts administration computer system associated with the financial institution. In some instances, the order information created based on the trade information defining the one or more trades in the one or more exchange traded funds or equity securities for the one or more accounts administrated by the financial institution received from the discretionary and managed accounts administration computer system associated with the financial institution may be configured to cause the clearing entity computer system to settle the one or more trades in the one or more exchange traded funds or equity securities for the one or more accounts administrated by the financial institution with a custodian different from the financial institution.

In some embodiments, the discretionary and managed accounts administration computer system associated with the financial institution may be configured to provide one or more trading user interfaces to one or more managed account advisors associated with the financial institution. In some instances, the discretionary and managed accounts administration computer system associated with the financial institution may be configured to receive trade input specifying the one or more trades in the one or more exchange traded funds or equity securities for the one or more accounts administrated by the financial institution via the one or more trading user interfaces provided to the one or more managed account advisors associated with the financial institution.

In some instances, the discretionary and managed accounts administration computer system associated with the financial institution may be configured to provide one or more trading user interfaces to one or more financial advisors associated with the financial institution. In some instances, the discretionary and managed accounts administration computer system associated with the financial institution may be configured to receive trade input specifying the one or more trades in the one or more exchange traded funds or equity securities for the one or more accounts administrated by the financial institution via the one or more trading user interfaces provided to the one or more financial advisors associated with the financial institution.

In some instances, validating the trade information defining the one or more trades in the one or more exchange traded funds or equity securities for the one or more accounts administrated by the financial institution received from the discretionary and managed accounts administration computer system associated with the financial institution may include accepting the one or more trades in the one or more exchange traded funds or equity securities for the one or more accounts administrated by the financial institution based on one or more processing rules associated with the one or more exchange traded funds or equity securities.

In some instances, creating the order information based on the trade information defining the one or more trades in the one or more exchange traded funds or equity securities for the one or more accounts administrated by the financial institution received from the discretionary and managed accounts administration computer system associated with the financial institution may include adding one or more indicators identifying the custodian different from the financial institution to the trade information defining the one or more trades in the one or more exchange traded funds or equity securities for the one or more accounts administrated by the financial institution received from the discretionary and managed accounts administration computer system associated with the financial institution.

In some instances, the custodian may hold one or more assets of the one or more accounts administrated by the financial institution in trust, such that the one or more assets of the one or more accounts administrated by the financial institution are held away from the financial institution.

In some instances, the central trading computing platform may receive, via the communication interface, and from a trustee computer system associated with the custodian different from the financial institution, activity-position information associated with the one or more exchange traded funds or equity securities. Subsequently, the central trading computing platform may send, via the communication interface, and to a central tracking computing platform associated with the financial institution, the activity-position information associated with the one or more exchange traded funds or equity securities received from the trustee computer system associated with the custodian different from the financial institution.

In some instances, the central tracking computing platform associated with the financial institution may be configured to update billing information, supervision information, and reconciliation information based on the activity-position information associated with the one or more exchange traded funds or equity securities received from the trustee computer system associated with the custodian different from the financial institution. In some instances, the central tracking computing platform associated with the financial institution may be configured to allocate changes identified in the activity-position information associated with the one or more exchange traded funds or equity securities received from the trustee computer system associated with the custodian different from the financial institution to one or more accountholders associated with the one or more accounts administrated by the financial institution. In some instances, the central tracking computing platform associated with the financial institution may be configured to post the changes identified in the activity-position information associated with the one or more exchange traded funds or equity securities received from the trustee computer system associated with the custodian different from the financial institution and allocated to the one or more accountholders associated with the one or more accounts administrated by the financial institution to one or more trading applications provided by the discretionary and managed accounts administration computer system associated with the financial institution.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4K depict an illustrative event sequence for deploying and implementing centralized trading and tracking computing platforms to support tri-party trading in accordance with one or more example embodiments;

FIGS. 5A-5J depict another illustrative event sequence for deploying and implementing centralized trading and tracking computing platforms to support tri-party trading in accordance with one or more example embodiments;

FIGS. 6A-6H depict another illustrative event sequence for deploying and implementing centralized trading and tracking computing platforms to support tri-party trading in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
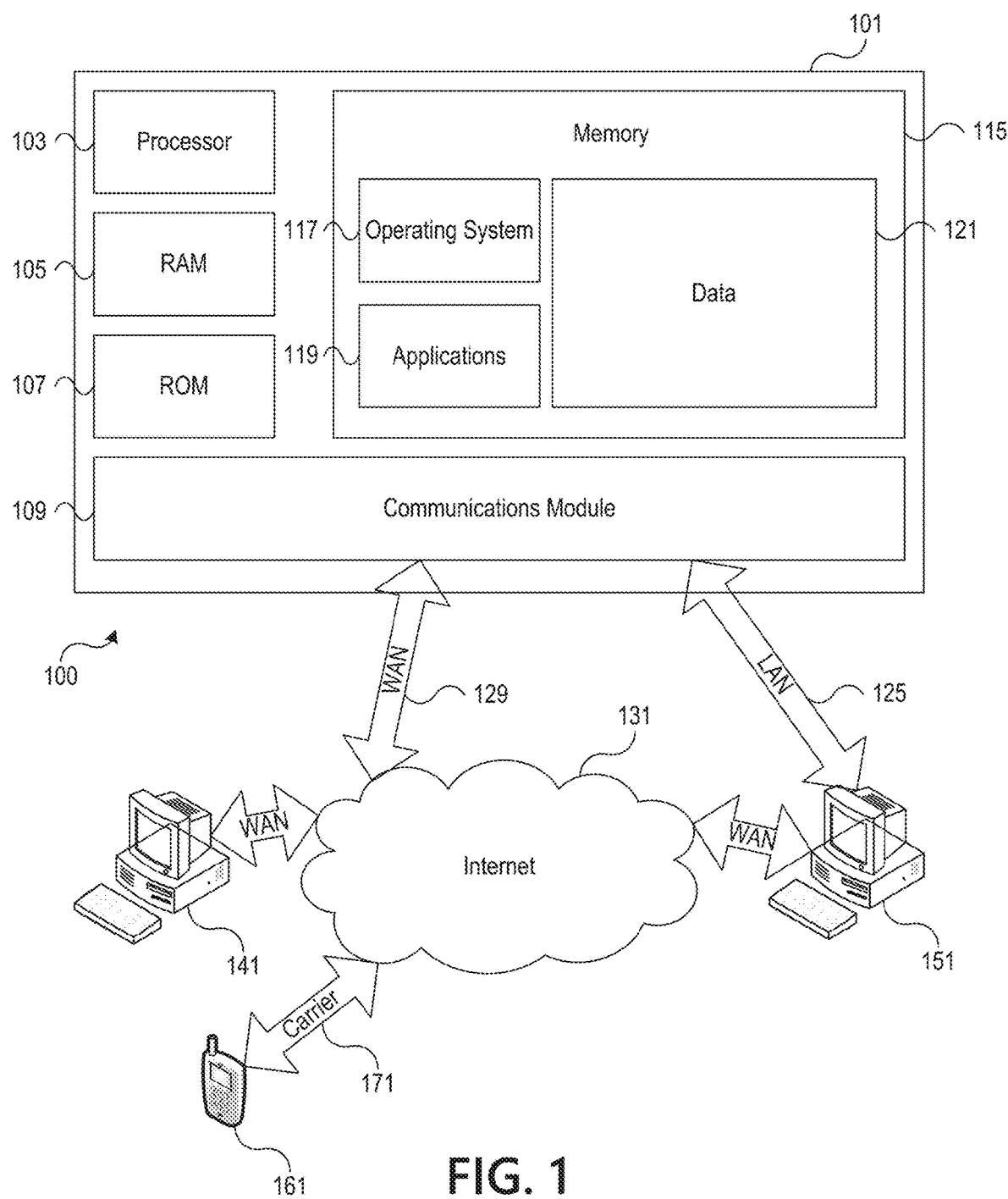
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
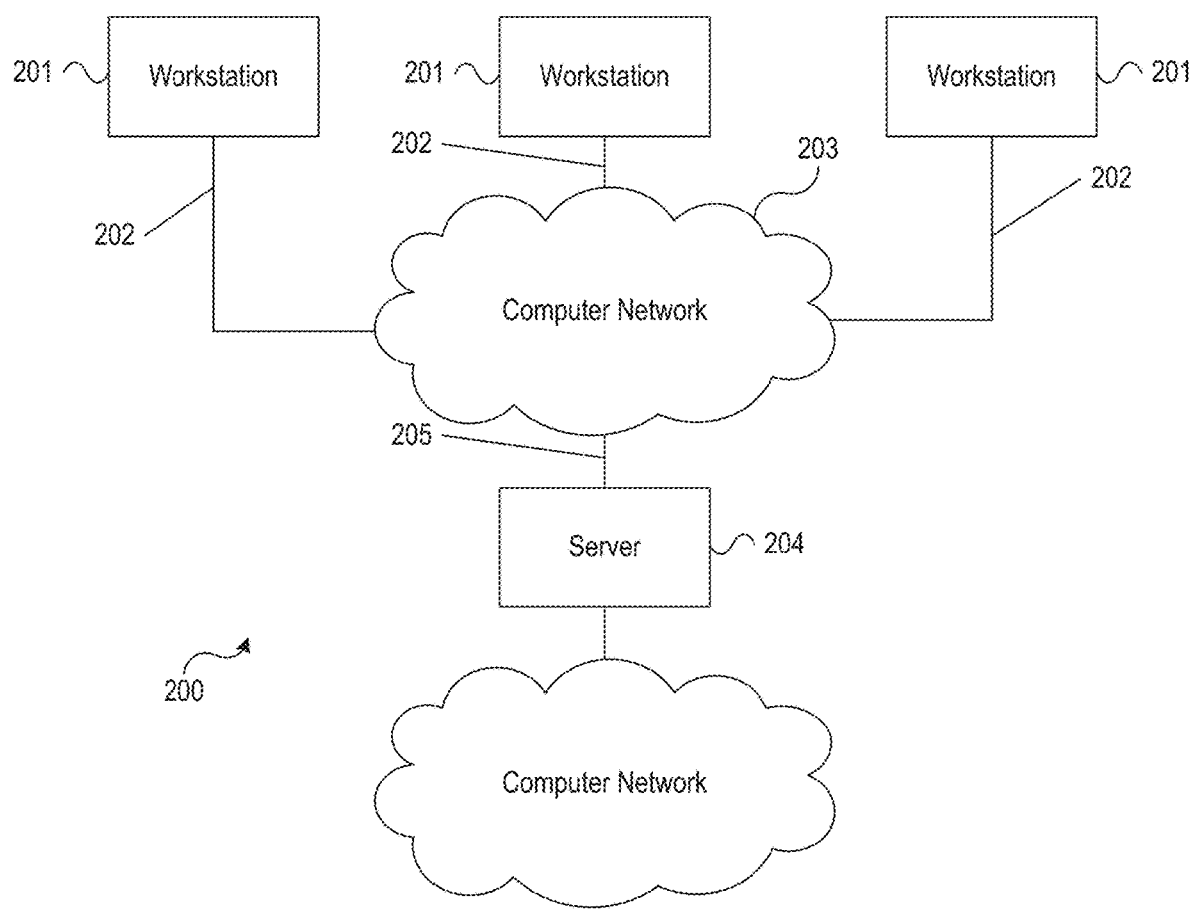
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3A:
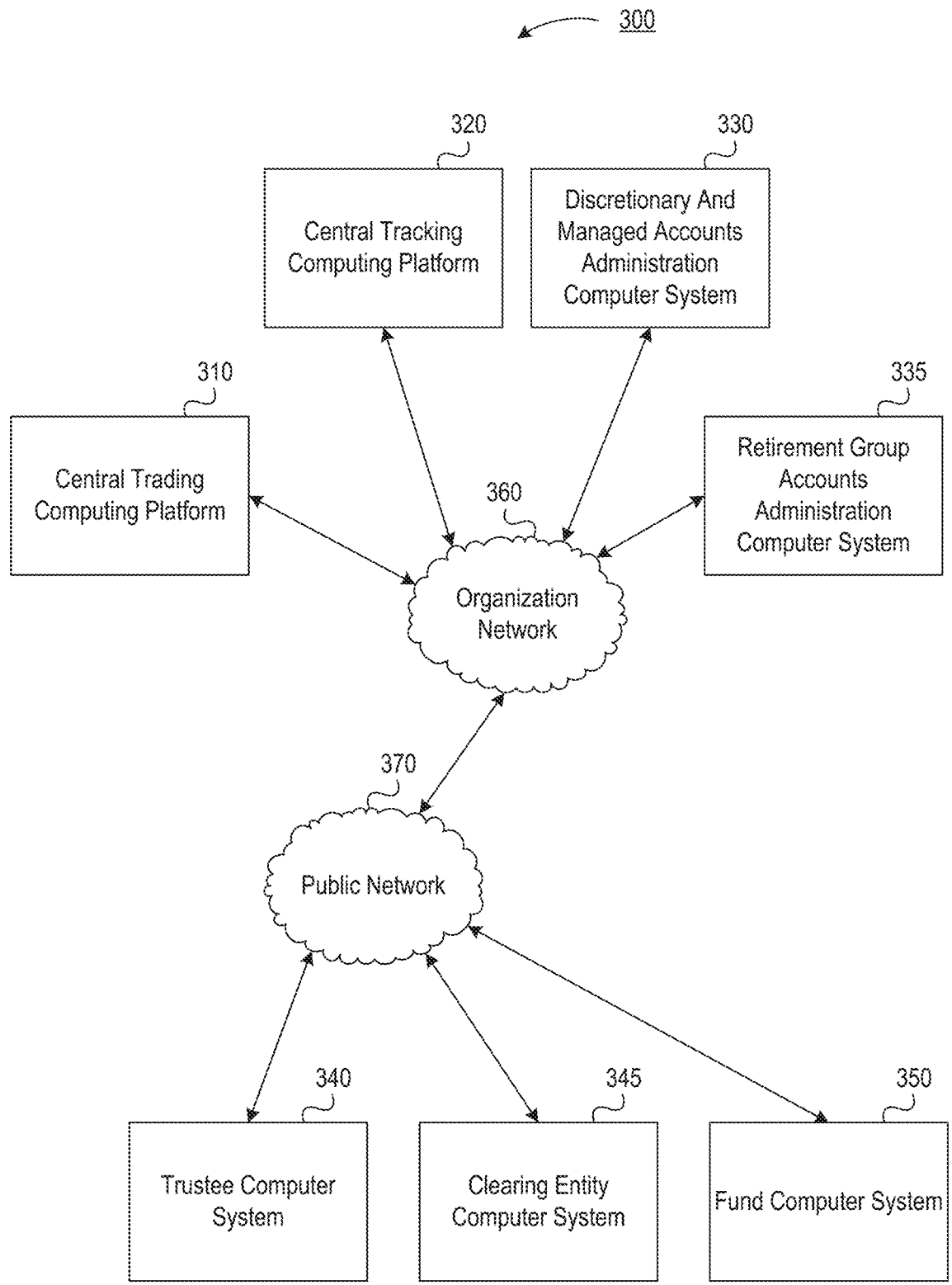
FIG. 3A-3C depict an illustrative computing environment for deploying and implementing centralized trading and tracking computing platforms to support tri-party trading in accordance with one or more example embodiments.
Figure 3B:
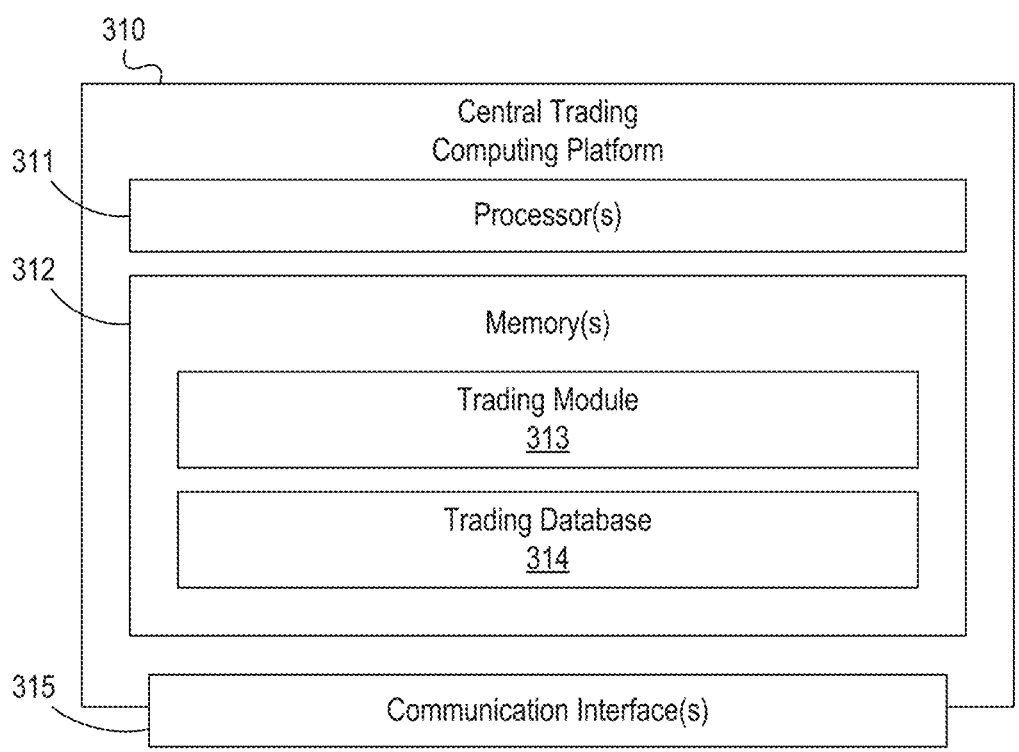
Figure 3C:
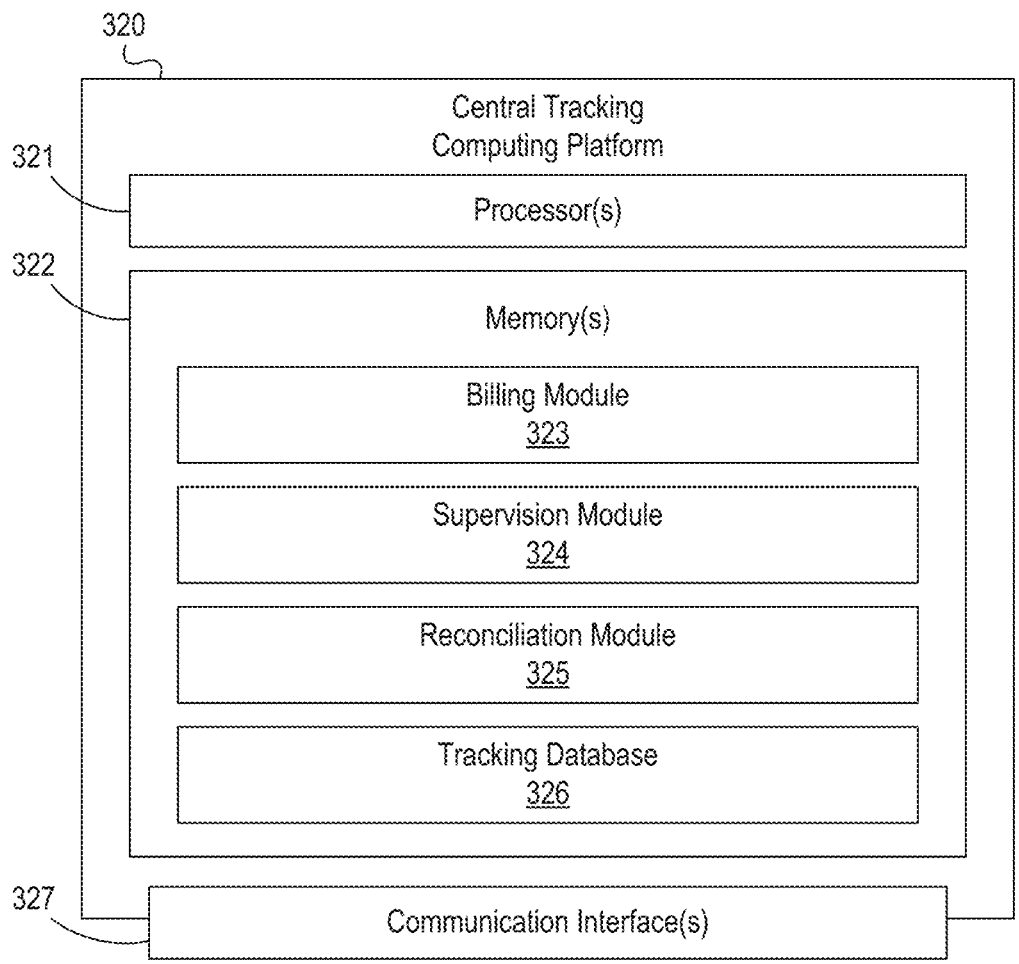

FIG. 3A-3C depict an illustrative computing environment for deploying and implementing centralized trading and tracking computing platforms to support tri-party trading in accordance with one or more example embodiments. Referring to FIG. 3A, computing environment 300 may include one or more computing devices. For example, computing environment 300 may include a discretionary and managed accounts administration computer system 330, a retirement group accounts administration computer system 335, a trustee computer system 340, a clearing entity computer system 345, and a fund computer system 350. Discretionary and managed accounts administration computer system 330 may be used by and/or may be configured to be used by one or more managed account advisors and/or one or more financial advisors who may be associated with a financial institution. In some instances, discretionary and managed accounts administration computer system 330 may execute one or more applications that cause discretionary and managed accounts administration computer system 330 to provide one or more trading user interfaces via which discretionary and managed accounts administration computer system 330 may receive input defining one or more trades from one or more users of discretionary and managed accounts administration computer system 330. Retirement group accounts administration computer system 335 may be used by and/or may be configured to be used by one or more retirement group managers and/or associated who may be associated with a financial institution and/or who may manage one or more retirement plans, such as one or more 401k's and/or one or more other employer-sponsored retirement plans for one or more customers of the financial institution and/or one or more participants in such plans. In some instances, retirement group accounts administration computer system 335 may execute one or more applications that cause retirement group accounts administration computer system 335 to provide one or more participant portal user interfaces via which retirement group accounts administration computer system 335 may receive input defining one or more elections and/or contributions from one or more participants in one or more retirement plans. Additionally or alternatively, retirement group accounts administration computer system 335 may execute one or more applications that cause retirement group accounts administration computer system 335 to provide one or more trading user interfaces via which retirement group accounts administration computer system 335 may receive input defining one or more trades from one or more users of retirement group accounts administration computer system 335.

In some instances, trustee computer system 340 may be used by and/or associated with a trustee-custodian which may hold (e.g., maintain ownership of and/or otherwise hold title to) one or more assets that may be traded (e.g., bought, sold, and/or otherwise traded in) by the financial institution operating retirement group accounts administration computer system 335 and/or discretionary and managed accounts administration computer system 330. In some instances, clearing entity computer system 345 may be used by and/or associated with a clearing entity which may execute and/or settle one or more trades in one or more assets, such as equity securities, exchange traded funds, mutual funds, and/or other types of assets. In some instances, fund computer system 350 may be used by and/or associated with a mutual fund company which may create, sell, and/or manage one or more mutual funds (which may, e.g., be traded by the financial institution operating retirement group accounts administration computer system 335 and/or discretionary and managed accounts administration computer system 330 and/or which may be held by the trustee-custodian operating trustee computer system 340).

In one or more arrangements, discretionary and managed accounts administration computer system 330, retirement group accounts administration computer system 335, trustee computer system 340, clearing entity computer system 345, and fund computer system 350 may be any type of computing device capable of receiving a user interface, receiving input via the user interface, and communicating the received input to one or more other computing devices. For example, discretionary and managed accounts administration computer system 330, retirement group accounts administration computer system 335, trustee computer system 340, clearing entity computer system 345, and fund computer system 350 may, in some instances, be and/or include server computers, desktop computers, laptop computers, tablet computers, smart phones, or the like. As noted above, and as illustrated in greater detail below, any and/or all of discretionary and managed accounts administration computer system 330, retirement group accounts administration computer system 335, trustee computer system 340, clearing entity computer system 345, and fund computer system 350 may, in some instances, be special-purpose computing devices configured to perform specific functions.

Computing environment 300 also may include one or more computing platforms. For example, computing environment 300 may include central trading computing platform 310 and central tracking computing platform 320. As illustrated in greater detail below, central trading computing platform 310 and central tracking computing platform 320 may include one or more computing devices configured to perform one or more of the functions described herein. For example, central trading computing platform 310 and central tracking computing platform 320 each may include one or more computers (e.g., laptop computers, desktop computers, servers, server blades, or the like).

Computing environment 300 also may include one or more networks, which may interconnect one or more of central trading computing platform 310, central tracking computing platform 320, discretionary and managed accounts administration computer system 330, retirement group accounts administration computer system 335, trustee computer system 340, clearing entity computer system 345, and fund computer system 350. For example, computing environment 300 may include organization network 360 and public network 370. Organization network 360 and/or public network 370 may include one or more sub-networks (e.g., LANs, WANs, or the like). Organization network 360 may be associated with a particular organization (e.g., a corporation, financial institution, educational institution, governmental institution, or the like) and may interconnect one or more computing devices associated with the organization. For example, central trading computing platform 310, central tracking computing platform 320, discretionary and managed accounts administration computer system 330, and retirement group accounts administration computer system 335 may be associated with an organization (e.g., a financial institution), and organization network 360 may be associated with and/or operated by the organization, and may include one or more networks (e.g., LANs, WANs, VPNs, or the like) that interconnect central trading computing platform 310, central tracking computing platform 320, discretionary and managed accounts administration computer system 330, and retirement group accounts administration computer system 335 and one or more other computing devices and/or computer systems that are used by, operated by, and/or otherwise associated with the organization. Public network 370 may connect organization network 360 and/or one or more computing devices connected thereto (e.g., central trading computing platform 310, central tracking computing platform 320, discretionary and managed accounts administration computer system 330, and retirement group accounts administration computer system 335) with one or more networks and/or computing devices that are not associated with the organization. For example, trustee computer system 340, clearing entity computer system 345, and fund computer system 350 might not be associated with an organization that operates organization network 360 (e.g., because trustee computer system 340, clearing entity computer system 345, and fund computer system 350 may be owned and/or operated by one or more entities different from the organization that operates organization network 360, such as one or more customers of the organization, rather than being owned and/or operated by the organization itself or an employee or affiliate of the organization), and public network 370 may include one or more networks (e.g., the internet) that connect trustee computer system 340, clearing entity computer system 345, and fund computer system 350 to organization network 360 and/or one or more computing devices connected thereto (e.g., central trading computing platform 310, central tracking computing platform 320, discretionary and managed accounts administration computer system 330, and retirement group accounts administration computer system 335).

Referring to FIG. 3B, central trading computing platform 310 may include one or more processors 311, memory 312, and communication interface 315. A data bus may interconnect processor(s) 311, memory 312, and communication interface 315. Communication interface 315 may be a network interface configured to support communication between central trading computing platform 310 and one or more networks (e.g., organization network 360, public network 370, or the like). Memory 312 may include one or more program modules having instructions that when executed by processor(s) 311 cause central trading computing platform 310 to perform one or more functions described herein and/or one or more databases that may store and/or otherwise maintain information which may be used by such program modules and/or processor(s) 311. In some instances, the one or more program modules and/or databases may be stored by and/or maintained in different memory units of central trading computing platform 310 and/or by different computer systems that may form and/or otherwise make up central trading computing platform 310. For example, memory 312 may include a trading module 313 and a trading database 314. Trading module 313 may provide and/or perform one or more functions that may enable trading of one or more assets by a financial institution, such as generating and/or presenting one or more graphical user interfaces that include trading information and/or via which trading input may be received. Trading database 314 may store trading information that may be created and/or used by central trading computing platform 310 in performing one or more functions.

Referring to FIG. 3C, central tracking computing platform 320 may include one or more processors 321, memory 322, and communication interface 327. Communication interface 327 may be a network interface configured to support communication between central tracking computing platform 320 and one or more networks (e.g., organization network 360, public network 370, or the like). Memory 322 may include one or more program modules having instructions that when executed by processor(s) 321 cause central tracking computing platform 320 to perform one or more functions described herein and/or one or more databases that may store and/or otherwise maintain information which may be used by such program modules and/or processor(s) 321. In some instances, the one or more program modules and/or databases may be stored by and/or maintained in different memory units of central tracking computing platform 320 and/or by different computer systems that may form and/or otherwise make up central tracking computing platform 320. For example, memory 322 may include a billing module 323, a supervision module 324, a reconciliation module 325, and a tracking database 326. Billing module 323 may provide and/or perform one or more billing functions associated with a financial institution's trading activities on behalf of one or more clients. Supervision module 324 may provide and/or perform one or more supervision functions associated with the financial institution's trading activities on behalf of one or more clients. Reconciliation module 325 may provide and/or perform one or more reconciliation functions associated with the financial institution's trading activities on behalf of one or more clients. Tracking database 326 may store trade tracking information that may be created and/or used by central tracking computing platform 320 in performing one or more functions, including one or more billing functions, supervision functions, reconciliation functions, and/or other functions. As illustrated in greater detail below, because central tracking computing platform 320 may receive activity-position position information from trustee computer system 340 and/or clearing entity computer system 345 for one or more assets that are held away from the financial institution operating central tracking computing platform 320, central tracking computing platform 320 may nevertheless provide such billing functions, supervision functions, reconciliation functions, and/or other functions with respect to such assets (which may, e.g., be traded by the financial institution operating central tracking computing platform 320 even though they are held by a trustee-custodian different from the financial institution operating central tracking computing platform 320).

Figure 4C:
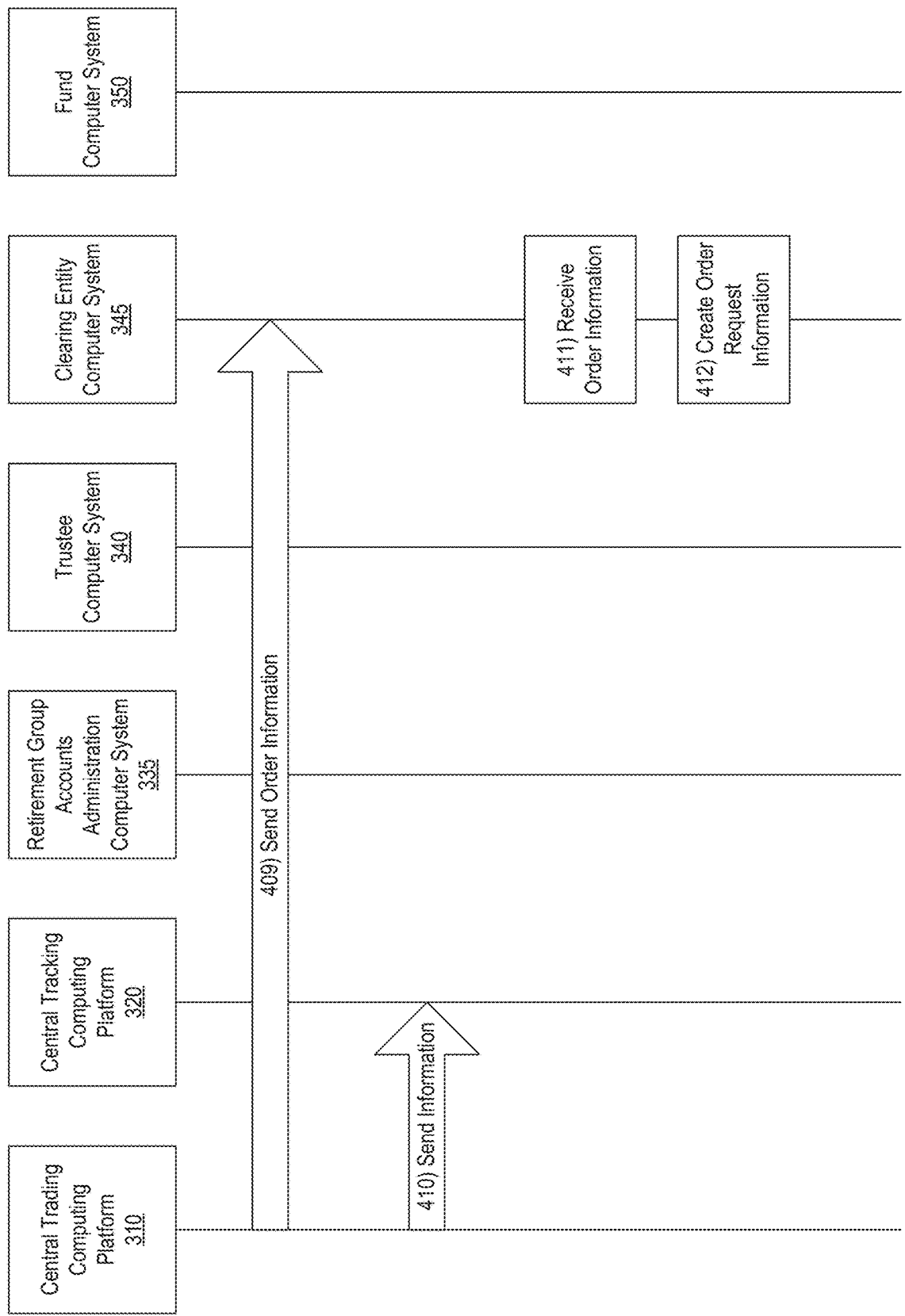

FIGS. 4A-4K depict an illustrative event sequence for deploying and implementing centralized trading and tracking computing platforms to support tri-party trading in accordance with one or more example embodiments. Referring to FIG. 4A, at step 401, retirement group accounts administration computer system 335 may provide a participant portal (which may, e.g., include one or more participant user interfaces via which one or more participants in an employer-sponsored retirement plan or other retirement plan may make elections on investment choices and/or view and/or modify other information associated with the retirement plan). In some instances, the participant portal may be a website, and in providing the participant portal, retirement group accounts administration computer system 335 may generate, serve, and/or otherwise provide one or more pages of the participant portal website. At step 402, retirement group accounts administration computer system 335 may receive one or more participant elections via the participant portal. For example, at step 402, retirement group accounts administration computer system 335 may receive input specifying particular investment elections for a particular participant from the participant.

At step 403, retirement group accounts administration computer system 335 may receive contribution information (which may, e.g., identify one or more monetary contributions made by one or more participants to an employer-sponsored retirement or other retirement plan, for instance, as part of a payroll cycle). At step 404, retirement group accounts administration computer system 335 may calculate one or more trades based on the contribution information and/or based on the participant elections (e.g., to determine how the monetary contributions should be invested for different participants based on their individual elections and based on the monetary amount that they have contributed to the retirement plan, for instance, during the particular payroll cycle). In some instances, retirement group accounts administration computer system 335 may calculate the one or more trades using one or more investment formulas and/or investment allocation algorithms that may use one or more proportions and/or other rules to determine the trades to be made for different participants based on their individual elections and based on the monetary amount that they have contributed to the retirement plan, for instance, during the particular payroll cycle. Referring to FIG. 4B, at step 405, retirement group accounts administration computer system 335 may send trade information (e.g., identifying the one or more trades calculated at step 404) to central trading computing platform 310.

At step 406, central trading computing platform 310 may receive the trade information from retirement group accounts administration computer system 335. For example, at step 406, central trading computing platform 310 may receive, via the communication interface (e.g., communication interface 315), and from a retirement group accounts administration computer system associated with a financial institution (e.g., retirement group accounts administration computer system 335), trade information defining one or more trades in one or more mutual funds for one or more accounts administrated by the financial institution.

In some embodiments, the retirement group accounts administration computer system associated with the financial institution may be configured to provide one or more retirement plan user interfaces to one or more participants in an employer-sponsored retirement plan administered by the financial institution. For example, the retirement group accounts administration computer system associated with the financial institution (e.g., retirement group accounts administration computer system 335) may be configured to provide one or more retirement plan user interfaces to one or more participants in an employer-sponsored retirement plan administered by the financial institution.

In some embodiments, the retirement group accounts administration computer system associated with the financial institution may be configured to receive one or more participant elections from the one or more participants in the employer-sponsored retirement plan administered by the financial institution via the one or more retirement plan user interfaces provided to the one or more participants in the employer-sponsored retirement plan administered by the financial institution. For example, the retirement group accounts administration computer system associated with the financial institution (e.g., retirement group accounts administration computer system 335) may be configured to receive one or more participant elections from the one or more participants in the employer-sponsored retirement plan administered by the financial institution via the one or more retirement plan user interfaces provided to the one or more participants in the employer-sponsored retirement plan administered by the financial institution.

In some embodiments, the retirement group accounts administration computer system associated with the financial institution may be configured to receive contribution information associated with one or more payroll contributions made by the one or more participants in the employer-sponsored retirement plan administered by the financial institution to the employer-sponsored retirement plan administered by the financial institution. For example, the retirement group accounts administration computer system associated with the financial institution (e.g., retirement group accounts administration computer system 335) may be configured to receive contribution information associated with one or more payroll contributions made by the one or more participants in the employer-sponsored retirement plan administered by the financial institution to the employer-sponsored retirement plan administered by the financial institution.

In some embodiments, the retirement group accounts administration computer system associated with the financial institution may be configured to calculate the one or more trades in the one or more mutual funds for the one or more accounts administrated by the financial institution based on the contribution information associated with the one or more payroll contributions made by the one or more participants in the employer-sponsored retirement plan administered by the financial institution to the employer-sponsored retirement plan administered by the financial institution. For example, the retirement group accounts administration computer system associated with the financial institution (e.g., retirement group accounts administration computer system 335) may be configured to calculate the one or more trades in the one or more mutual funds for the one or more accounts administrated by the financial institution based on the contribution information associated with the one or more payroll contributions made by the one or more participants in the employer-sponsored retirement plan administered by the financial institution to the employer-sponsored retirement plan administered by the financial institution.

At step 407, central trading computing platform 310 may validate the trade information received from retirement group accounts administration computer system 335. For example, at step 407, central trading computing platform 310 may validate the trade information defining the one or more trades in the one or more mutual funds for the one or more accounts administrated by the financial institution received from the retirement group accounts administration computer system associated with the financial institution (e.g., retirement group accounts administration computer system 335).

In some embodiments, validating the trade information defining the one or more trades in the one or more mutual funds for the one or more accounts administrated by the financial institution received from the retirement group accounts administration computer system associated with the financial institution may include accepting the one or more trades in the one or more mutual funds for the one or more accounts administrated by the financial institution based on one or more processing rules associated with the one or more mutual funds and based on one or more product rules associated with the one or more mutual funds. For example, in validating the trade information defining the one or more trades in the one or more mutual funds for the one or more accounts administrated by the financial institution received from the retirement group accounts administration computer system associated with the financial institution (e.g., retirement group accounts administration computer system 335), central trading computing platform 310 may accept the one or more trades in the one or more mutual funds for the one or more accounts administrated by the financial institution based on one or more processing rules associated with the one or more mutual funds and based on one or more product rules associated with the one or more mutual funds. Such processing rules and/or product rules may, for instance, be stored and/or otherwise maintained by central trading computing platform 310 in trading database 314.

At step 408, central trading computing platform 310 may create order information (e.g., identifying one or more orders to be executed in accordance with the trade information) based on the trade information received from retirement group accounts administration computer system 335. For example, after validating the trade information defining the one or more trades in the one or more mutual funds for the one or more accounts administrated by the financial institution received from the retirement group accounts administration computer system associated with the financial institution (e.g., retirement group accounts administration computer system 335), central trading computing platform 310 may create order information based on the trade information defining the one or more trades in the one or more mutual funds for the one or more accounts administrated by the financial institution received from the retirement group accounts administration computer system associated with the financial institution (e.g., retirement group accounts administration computer system 335).

In some embodiments, creating the order information based on the trade information defining the one or more trades in the one or more mutual funds for the one or more accounts administrated by the financial institution received from the retirement group accounts administration computer system associated with the financial institution may include adding one or more indicators identifying the custodian different from the financial institution to the trade information defining the one or more trades in the one or more mutual funds for the one or more accounts administrated by the financial institution received from the retirement group accounts administration computer system associated with the financial institution. For example, in creating the order information based on the trade information defining the one or more trades in the one or more mutual funds for the one or more accounts administrated by the financial institution received from the retirement group accounts administration computer system associated with the financial institution 20 (e.g., retirement group accounts administration computer system 335), central trading computing platform 310 may add one or more indicators identifying the custodian different from the financial institution to the trade information defining the one or more trades in the one or more mutual funds for the one or more accounts administrated by the financial institution received from the retirement group accounts administration computer system associated with the financial institution (e.g., retirement group accounts administration computer system 335). Such indicators may, for instance, enable and/or cause the trades to be settled with the custodian operating trustee computer system 340 instead of with the financial institution operating central trading computing platform 310.

Referring to FIG. 4C, at step 409, central trading computing platform 310 may send the order information to clearing entity computer system 345. For example, at step 409, central trading computing platform 310 may send, via the communication interface (e.g., communication interface 315), and to a clearing entity computer system (e.g., clearing entity computer system 345), the order information created based on the trade information defining the one or more trades in the one or more mutual funds for the one or more accounts administrated by the financial institution received from the retirement group accounts administration computer system associated with the financial institution (e.g., retirement group accounts administration computer system 335). In addition, the order information created based on the trade information defining the one or more trades in the one or more mutual funds for the one or more accounts administrated by the financial institution received from the retirement group accounts administration computer system associated with the financial institution may be configured to cause the clearing entity computer system to settle the one or more trades in the one or more mutual funds for the one or more accounts administrated by the financial institution with a custodian different from the financial institution. For example, the order information created by central trading computing platform 310 based on the trade information defining the one or more trades in the one or more mutual funds for the one or more accounts administrated by the financial institution received from the retirement group accounts administration computer system associated with the financial institution (e.g., retirement group accounts administration computer system 335) may be configured to cause the clearing entity computer system (e.g., clearing entity computer system 345) to settle the one or more trades in the one or more mutual funds for the one or more accounts administrated by the financial institution with a custodian different from the financial institution.

In some embodiments, the custodian may hold one or more assets of the employer-sponsored retirement plan administered by the financial institution in trust, such that the one or more assets of the employer-sponsored retirement plan administered by the financial institution are held away from the financial institution. In addition, in some instances, the one or more assets of the employer-sponsored retirement plan administered by the financial institution may be held in a single combined account, and the computer system may provide omnibus processing for the financial institution by allocating the one or more assets of the employer-sponsored retirement plan administered by the financial institution to the one or more participants in the employer-sponsored retirement plan administered by the financial institution. For example, central trading computing platform 310 may provide omnibus processing for the financial institution by allocating the one or more assets of the employer-sponsored retirement plan administered by the financial institution to the one or more participants in the employer-sponsored retirement plan administered by the financial institution, as illustrated in greater detail below.

At step 410, central trading computing platform 310 may send extended order information to central tracking computing platform 320. At step 411, clearing entity computer system 345 may receive the order information from central trading computing platform 310. At step 412, clearing entity computer system 345 may create order request information (e.g., identifying one or more shares of one or more mutual funds to be purchased, sold, or otherwise processed in accordance with the order information) based on the order information received from central trading computing platform 310.

Figure 4D:
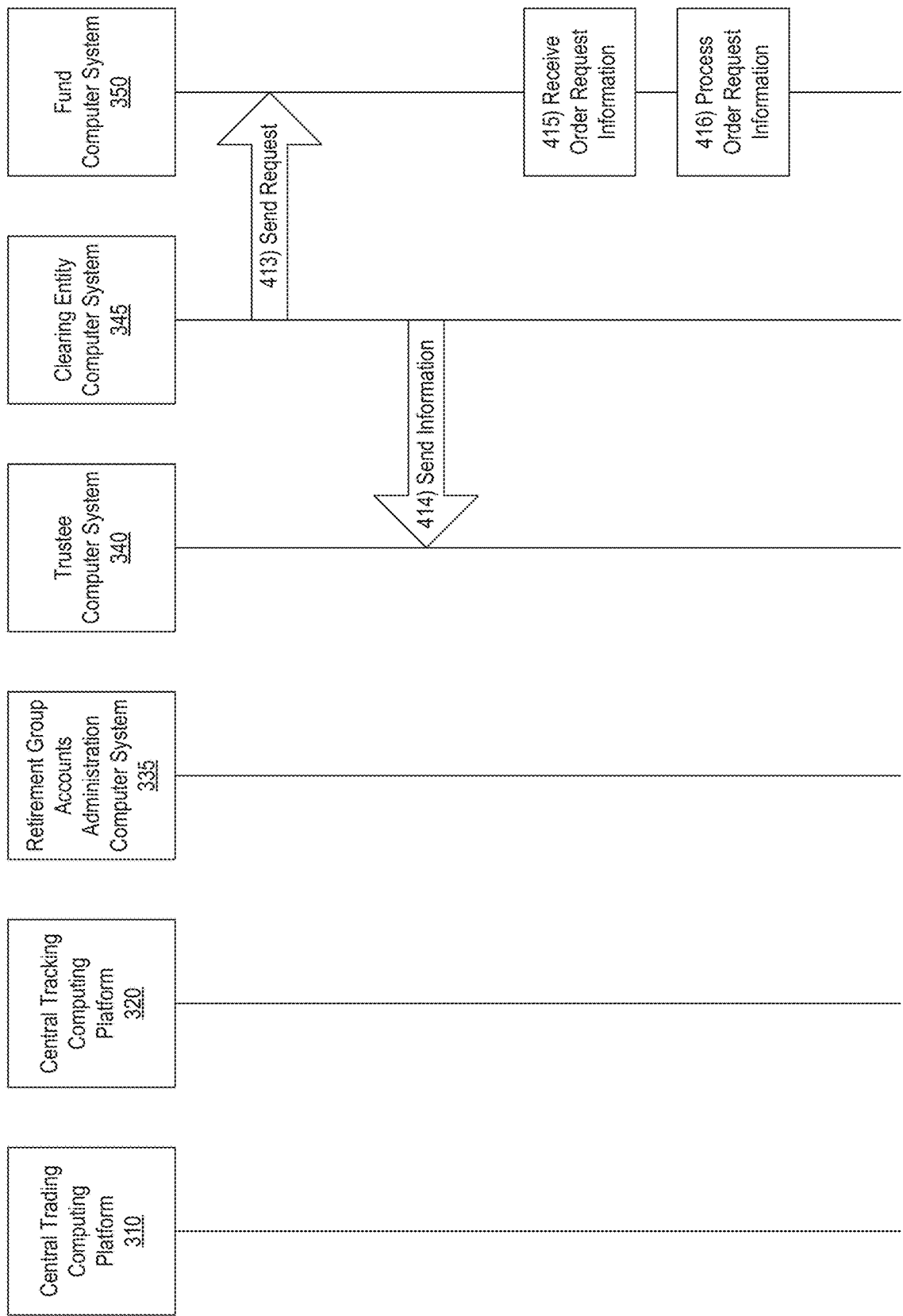

Referring to FIG. 4D, at step 413, clearing entity computer system 345 may send the order request information to fund computer system 350. At step 414, clearing entity computer system 345 may send the order request information to trustee computer system 340. At step 415, fund computer system 350 may receive the order request information from clearing entity computer system 345. At step 416, fund computer system 350 may process the order request information.

Figure 4E:
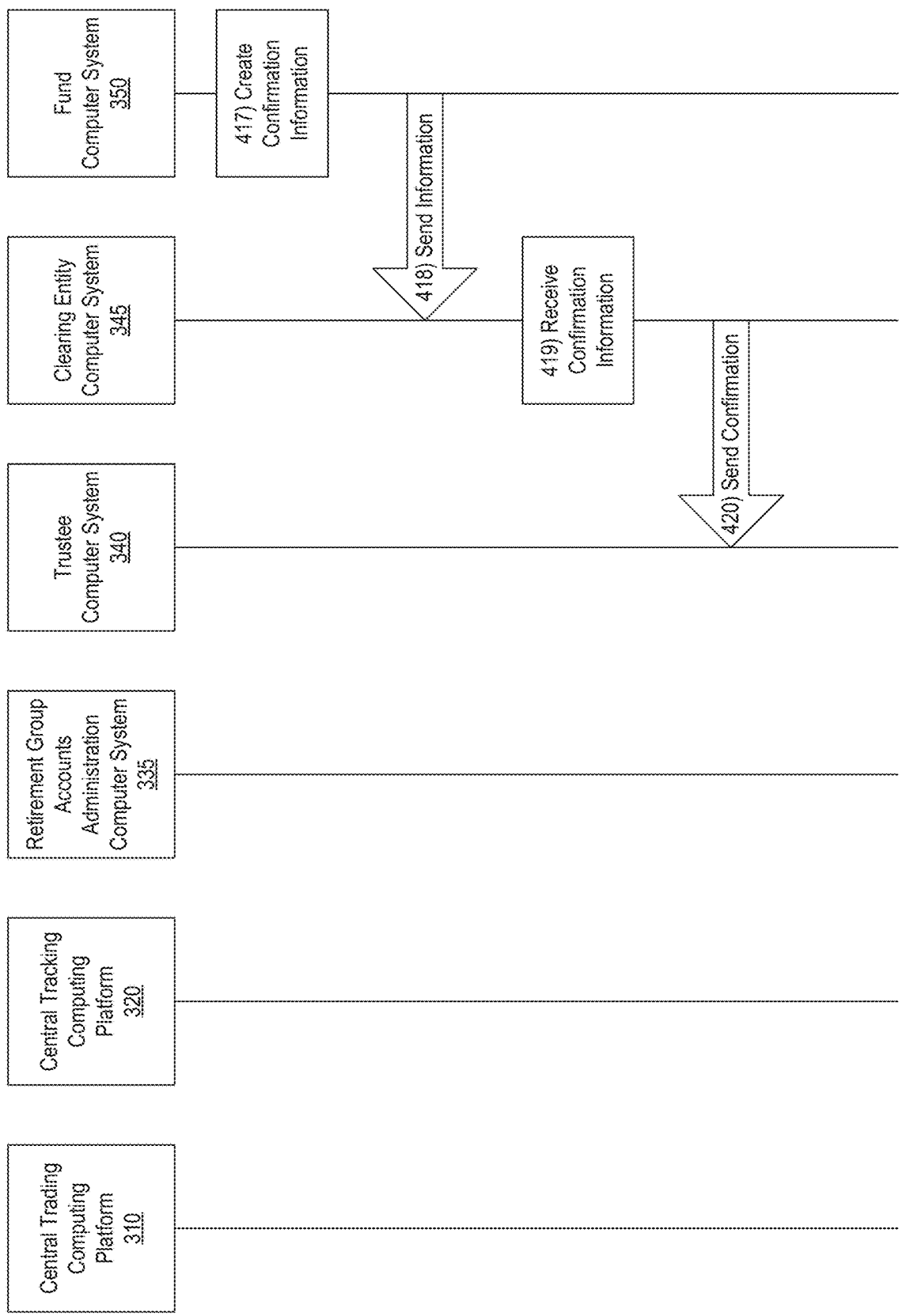

Referring to FIG. 4E, at step 417, fund computer system 350 may create confirmation information (e.g., confirming and/or otherwise indicating that one or more shares of one or more mutual funds have been purchased, sold, or otherwise processed in accordance with the order request information). At step 418, fund computer system 350 may send the confirmation information to clearing entity computer system 345. At step 419, clearing entity computer system 345 may receive the confirmation information from fund computer system 350. At step 420, clearing entity computer system 345 may send the confirmation information to trustee computer system 340.

Referring to FIG. 4F, at step 421, clearing entity computer system 345 may send the confirmation information to central trading computing platform 310. At step 422, central trading computing platform 310 may receive the confirmation information from clearing entity computer system 345. At step 423, central trading computing platform 310 may send the confirmation information to central tracking computing platform 320. At step 424, central tracking computing platform 320 may receive the confirmation information from central trading computing platform 310.

Figure 4G:
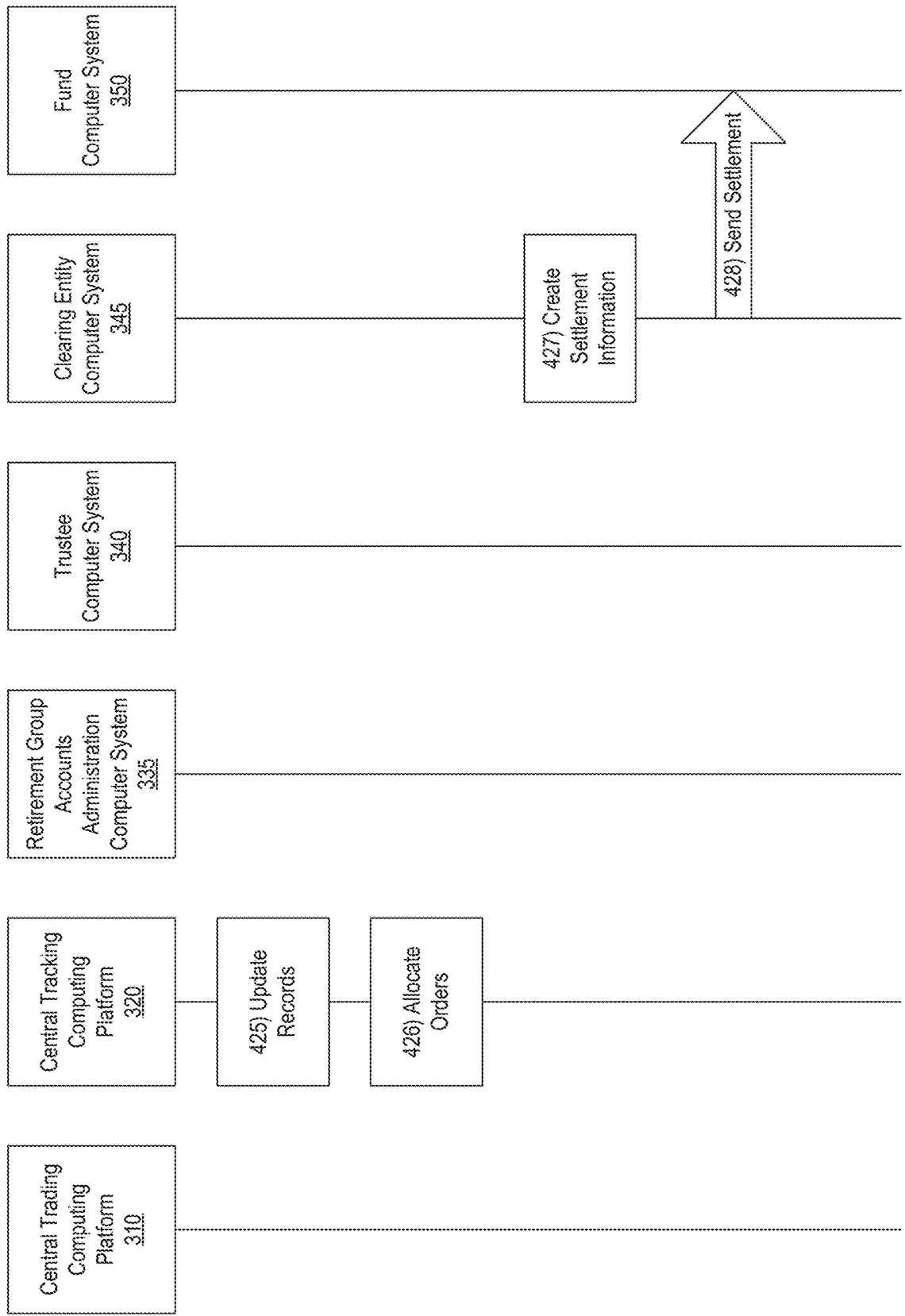

Referring to FIG. 4G, at step 425, central tracking computing platform 320 may update one or more records based on the confirmation information received from central trading computing platform 310. At step 426, central tracking computing platform 320 may allocate one or more orders to individual participants in the retirement plan (e.g., by creating and/or updating records identifying particular participants as owning and/or having the rights to particular assets that were purchased, sold, or otherwise affected by the orders that were processed and/or executed, for instance, by clearing entity computer system 345). At step 427, clearing entity computer system 345 may create settlement information (which may, e.g., include information that enables settlement between the parties by facilitating the transfer of the assets that were purchased, for instance, from an entity operating fund computer system 350 to the trustee-custodian operating trustee computer system 340 and/or by facilitating the transfer of funds from the trustee-custodian operating trustee computer system 340 to the entity operating fund computer system 350 for the assets that were purchased). At step 428, clearing entity computer system 345 may send the settlement information to fund computer system 350.

Referring to FIG. 4H, at step 429, clearing entity computer system 345 may send the settlement information to trustee computer system 340. At step 430, fund computer system 350 may send activity-position information (e.g., identifying changes in one or more positions of one or more mutual funds created and/or maintained by the entity operating fund computer system 350) to clearing entity computer system 345. At step 431, clearing entity computer system 345 may receive the activity-position information from fund computer system 350. At step 432, clearing entity computer system 345 may send the activity-position information to trustee computer system 340.

Referring to FIG. 4I, at step 433, clearing entity computer system 345 may send the activity-position information to central trading computing platform 310. At step 434, central trading computing platform 310 may receive the activity-position information from clearing entity computer system 345. For example, at step 434, central trading computing platform 310 may receive, via the communication interface (e.g., communication interface 315), and from the clearing entity computer system (e.g., clearing entity computer system 345), activity-position information associated with the one or more mutual funds. At step 435, central trading computing platform 310 may send the activity-position information to central tracking computing platform 320. For example, at step 435, central trading computing platform 310 may send, via the communication interface (e.g., communication interface 315), and to a central tracking computing platform associated with the financial institution (e.g., central tracking computing platform 320), the activity-position information associated with the one or more mutual funds received from the clearing entity computer system (e.g., clearing entity computer system 345).

In some embodiments, the central tracking computing platform associated with the financial institution may be configured to update billing information, supervision information, and reconciliation information based on the activity-position information associated with the one or more mutual funds received from the clearing entity computer system. For example, the central tracking computing platform associated with the financial institution (e.g., central tracking computing platform 320) may be configured to update billing information, supervision information, and reconciliation information based on the activity-position information associated with the one or more mutual funds received from the clearing entity computer system (e.g., clearing entity computer system 345).

In some embodiments, the central tracking computing platform associated with the financial institution may be configured to allocate changes identified in the activity-position information associated with the one or more mutual funds received from the clearing entity computer system to the one or more participants in the employer-sponsored retirement plan administered by the financial institution. For example, the central tracking computing platform associated with the financial institution (e.g., central tracking computing platform 320) may be configured to allocate changes identified in the activity-position information associated with the one or more mutual funds received from the clearing entity computer system (e.g., clearing entity computer system 345) to the one or more participants in the employer-sponsored retirement plan administered by the financial institution.

In some embodiments, the central tracking computing platform associated with the financial institution may be configured to post the changes identified in the activity-position information associated with the one or more mutual funds received from the clearing entity computer system and allocated to the one or more participants in the employer-sponsored retirement plan administered by the financial institution to a participant portal provided by the retirement group accounts administration computer system associated with the financial institution. For example, the central tracking computing platform associated with the financial institution (e.g., central tracking computing platform 320) may be configured to post the changes identified in the activity-position information associated with the one or more mutual funds received from the clearing entity computer system (e.g., clearing entity computer system 345) and allocated to the one or more participants in the employer-sponsored retirement plan administered by the financial institution to a participant portal provided by the retirement group accounts administration computer system associated with the financial institution (e.g., retirement group accounts administration computer system 335).

At step 436, central tracking computing platform 320 may receive the activity-position information from central trading computing platform 310. Referring to FIG. 4J, at step 437, central tracking computing platform 320 may update one or more records based on the activity-position information received from central trading computing platform 310. At step 438, central tracking computing platform 320 may allocate one or more changes in positions identified in the activity-position information to individual participants in the retirement plan (e.g., by creating and/or updating records identifying particular participants as owning and/or having the rights to particular assets that have changed in position as identified in the activity-position information). At step 439, central tracking computing platform 320 may post the one or more changes to the participant portal. At step 440, central tracking computing platform 320 may send the one or more changes to retirement group accounts administration computer system 335 (e.g., to facilitate updates to the participant portal provided by retirement group accounts administration computer system 335). Referring to FIG. 4K, at step 441, retirement group accounts administration computer system 335 may provide an updated participant portal (e.g., to one or more participants in a retirement plan).

Figure 5A:
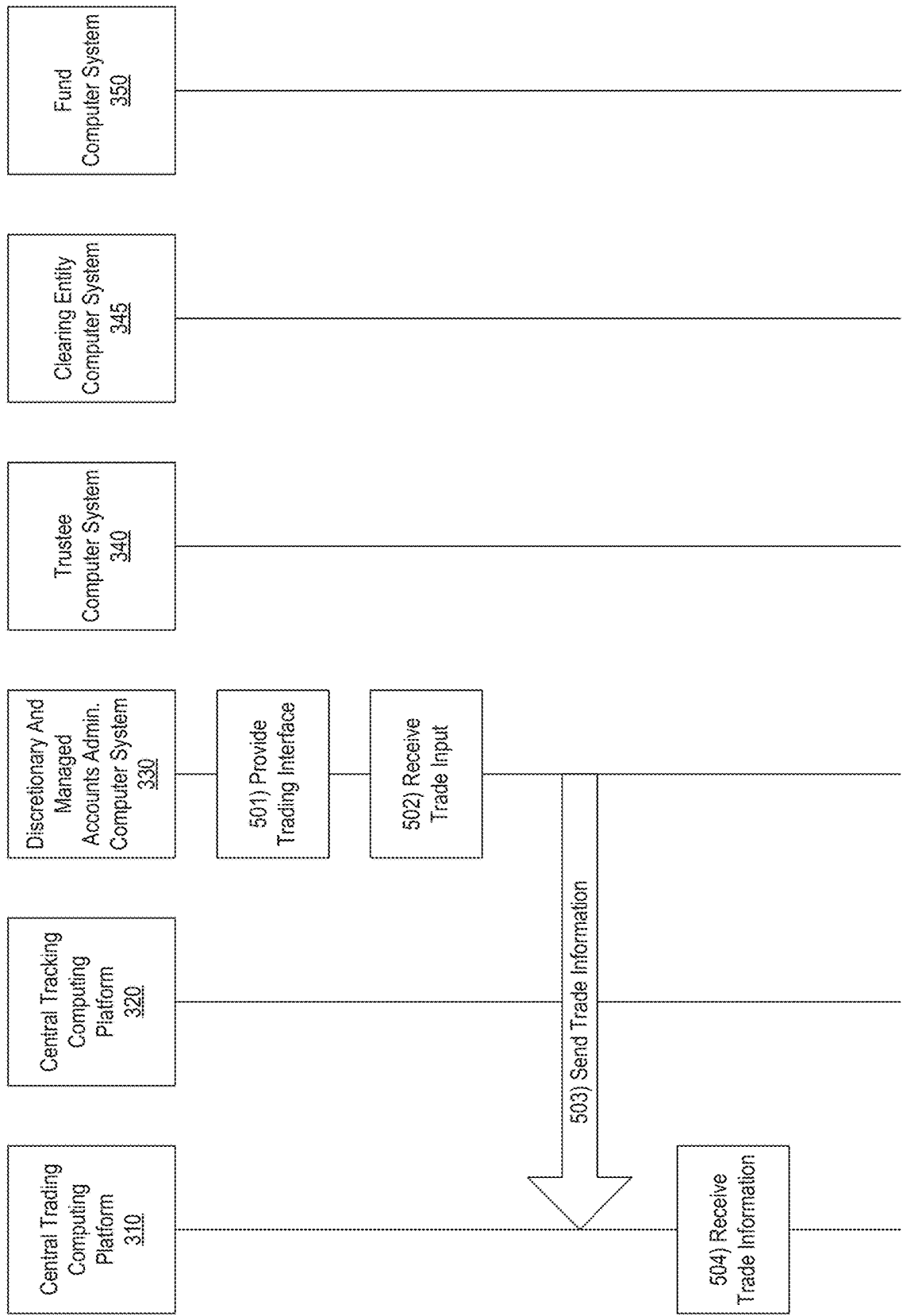

FIGS. 5A-5J depict another illustrative event sequence for deploying and implementing centralized trading and tracking computing platforms to support tri-party trading in accordance with one or more example embodiments. Referring to FIG. 5A, at step 501, discretionary and managed accounts administration computer system 330 may provide a trading interface (which may, e.g., include one or more trading user interfaces via which one or more managed account advisors of a financial institution and/or one or more financial advisors of a financial institution trading with discretion may create, initiate, and/or cancel one or more trades in one or more assets and/or view and/or modify other information associated with trading operations associated with the financial institution). In some instances, the trading interface may be a website, and in providing the trading interface, discretionary and managed accounts administration computer system 330 may generate, serve, and/or otherwise provide one or more pages of the trading interface website. At step 502, discretionary and managed accounts administration computer system 330 may receive trade input. For example, at step 502, discretionary and managed accounts administration computer system 330 may receive input specifying particular trades for particular accounts maintained by the financial institution. At step 503, discretionary and managed accounts administration computer system 330 may send trade information (e.g., identifying one or more trades corresponding to the trade input received at step 502) to central trading computing platform 310.

At step 504, central trading computing platform 310 may receive the trade information from discretionary and managed accounts administration computer system 330. For example, at step 504, central trading computing platform 310 may receive, via the communication interface (e.g., communication interface 315), and from a discretionary and managed accounts administration computer system associated with a financial institution (e.g., discretionary and managed accounts administration computer system 330), trade information defining one or more trades in one or more mutual funds for one or more accounts administrated by the financial institution.

In some embodiments, the discretionary and managed accounts administration computer system associated with the financial institution may be configured to provide one or more trading user interfaces to one or more managed account advisors associated with the financial institution. For example, the discretionary and managed accounts administration computer system associated with the financial institution (e.g., discretionary and managed accounts administration computer system 330) may be configured to provide one or more trading user interfaces to one or more managed account advisors associated with the financial institution.

In some embodiments, the discretionary and managed accounts administration computer system associated with the financial institution may be configured to receive trade input specifying the one or more trades in the one or more mutual funds for the one or more accounts administrated by the financial institution via the one or more trading user interfaces provided to the one or more managed account advisors associated with the financial institution. For example, the discretionary and managed accounts administration computer system associated with the financial institution (e.g., discretionary and managed accounts administration computer system 330) may be configured to receive trade input specifying the one or more trades in the one or more mutual funds for the one or more accounts administrated by the financial institution via the one or more trading user interfaces provided to the one or more managed account advisors associated with the financial institution.

In some embodiments, the discretionary and managed accounts administration computer system associated with the financial institution may be configured to provide one or more trading user interfaces to one or more financial advisors associated with the financial institution. For example, the discretionary and managed accounts administration computer system associated with the financial institution (e.g., discretionary and managed accounts administration computer system 330) may be configured to provide one or more trading user interfaces to one or more financial advisors associated with the financial institution.

In some embodiments, the discretionary and managed accounts administration computer system associated with the financial institution may be configured to receive trade input specifying the one or more trades in the one or more mutual funds for the one or more accounts administrated by the financial institution via the one or more trading user interfaces provided to the one or more financial advisors associated with the financial institution. For example, the discretionary and managed accounts administration computer system associated with the financial institution (e.g., discretionary and managed accounts administration computer system 330) may be configured to receive trade input specifying the one or more trades in the one or more mutual funds for the one or more accounts administrated by the financial institution via the one or more trading user interfaces provided to the one or more financial advisors associated with the financial institution.

Referring to FIG. 5B, at step 505, central trading computing platform 310 may validate the trade information received from discretionary and managed accounts administration computer system 330. For example, at step 505, central trading computing platform 310 may validate the trade information defining the one or more trades in the one or more mutual funds for the one or more accounts administrated by the financial institution received from the discretionary and managed accounts administration computer system associated with the financial institution (e.g., discretionary and managed accounts administration computer system 330).

In some embodiments, validating the trade information defining the one or more trades in the one or more mutual funds for the one or more accounts administrated by the financial institution received from the discretionary and managed accounts administration computer system associated with the financial institution may include accepting the one or more trades in the one or more mutual funds for the one or more accounts administrated by the financial institution based on one or more processing rules associated with the one or more mutual funds and based on one or more product rules associated with the one or more mutual funds. For example, in validating the trade information defining the one or more trades in the one or more mutual funds for the one or more accounts administrated by the financial institution received from the discretionary and managed accounts administration computer system associated with the financial institution (e.g., discretionary and managed accounts administration computer system 330), central trading computing platform 310 may accept the one or more trades in the one or more mutual funds for the one or more accounts administrated by the financial institution based on one or more processing rules associated with the one or more mutual funds and based on one or more product rules associated with the one or more mutual funds. Such processing rules and/or product rules may, for instance, be stored and/or otherwise maintained by central trading computing platform 310 in trading database 314.

At step 506, central trading computing platform 310 may create order information (e.g., identifying one or more orders to be executed in accordance with the trade information) based on the trade information received from discretionary and managed accounts administration computer system 330. For example, after validating the trade information defining the one or more trades in the one or more mutual funds for the one or more accounts administrated by the financial institution received from the discretionary and managed accounts administration computer system associated with the financial institution (e.g., discretionary and managed accounts administration computer system 330), central trading computing platform 310 may create order information based on the trade information defining the one or more trades in the one or more mutual funds for the one or more accounts administrated by the financial institution received from the discretionary and managed accounts administration computer system associated with the financial institution (e.g., discretionary and managed accounts administration computer system 330).

In some embodiments, creating the order information based on the trade information defining the one or more trades in the one or more mutual funds for the one or more accounts administrated by the financial institution received from the discretionary and managed accounts administration computer system associated with the financial institution may include adding one or more indicators identifying the custodian different from the financial institution to the trade information defining the one or more trades in the one or more mutual funds for the one or more accounts administrated by the financial institution received from the discretionary and managed accounts administration computer system associated with the financial institution. For example, in creating the order information based on the trade information defining the one or more trades in the one or more mutual funds for the one or more accounts administrated by the financial institution received from the discretionary and managed accounts administration computer system associated with the financial institution (e.g., discretionary and managed accounts administration computer system 330), central trading computing platform 310 may add one or more indicators identifying the custodian different from the financial institution to the trade information defining the one or more trades in the one or more mutual funds for the one or more accounts administrated by the financial institution received from the discretionary and managed accounts administration computer system associated with the financial institution (e.g., discretionary and managed accounts administration computer system 330). Such indicators may, for instance, enable and/or cause the trades to be settled with the custodian operating trustee computer system 340 instead of with the financial institution operating central trading computing platform 310.

At step 507, central trading computing platform 310 may send the order information to clearing entity computer system 345. For example, at step 507, central trading computing platform 310 may send, via the communication interface (e.g., communication interface 315), and to a clearing entity computer system (e.g., clearing entity computer system 345), the order information created based on the trade information defining the one or more trades in the one or more mutual funds for the one or more accounts administrated by the financial institution received from the discretionary and managed accounts administration computer system associated with the financial institution (e.g., discretionary and managed accounts administration computer system 330). In addition, the order information created based on the trade information defining the one or more trades in the one or more mutual funds for the one or more accounts administrated by the financial institution received from the discretionary and managed accounts administration computer system associated with the financial institution may be configured to cause the clearing entity computer system to settle the one or more trades in the one or more mutual funds for the one or more accounts administrated by the financial institution with a custodian different from the financial institution. For example, the order information created by central trading computing platform 310 based on the trade information defining the one or more trades in the one or more mutual funds for the one or more accounts administrated by the financial institution received from the discretionary and managed accounts administration computer system associated with the financial institution (e.g., discretionary and managed accounts administration computer system 330) may be configured to cause the clearing entity computer system (e.g., clearing entity computer system 345) to settle the one or more trades in the one or more mutual funds for the one or more accounts administrated by the financial institution with a custodian different from the financial institution. In some embodiments, the custodian may hold one or more assets of the one or more accounts administrated by the financial institution in trust, such that the one or more assets of the one or more accounts administrated by the financial institution are held away from the financial institution.

Figure 5C:
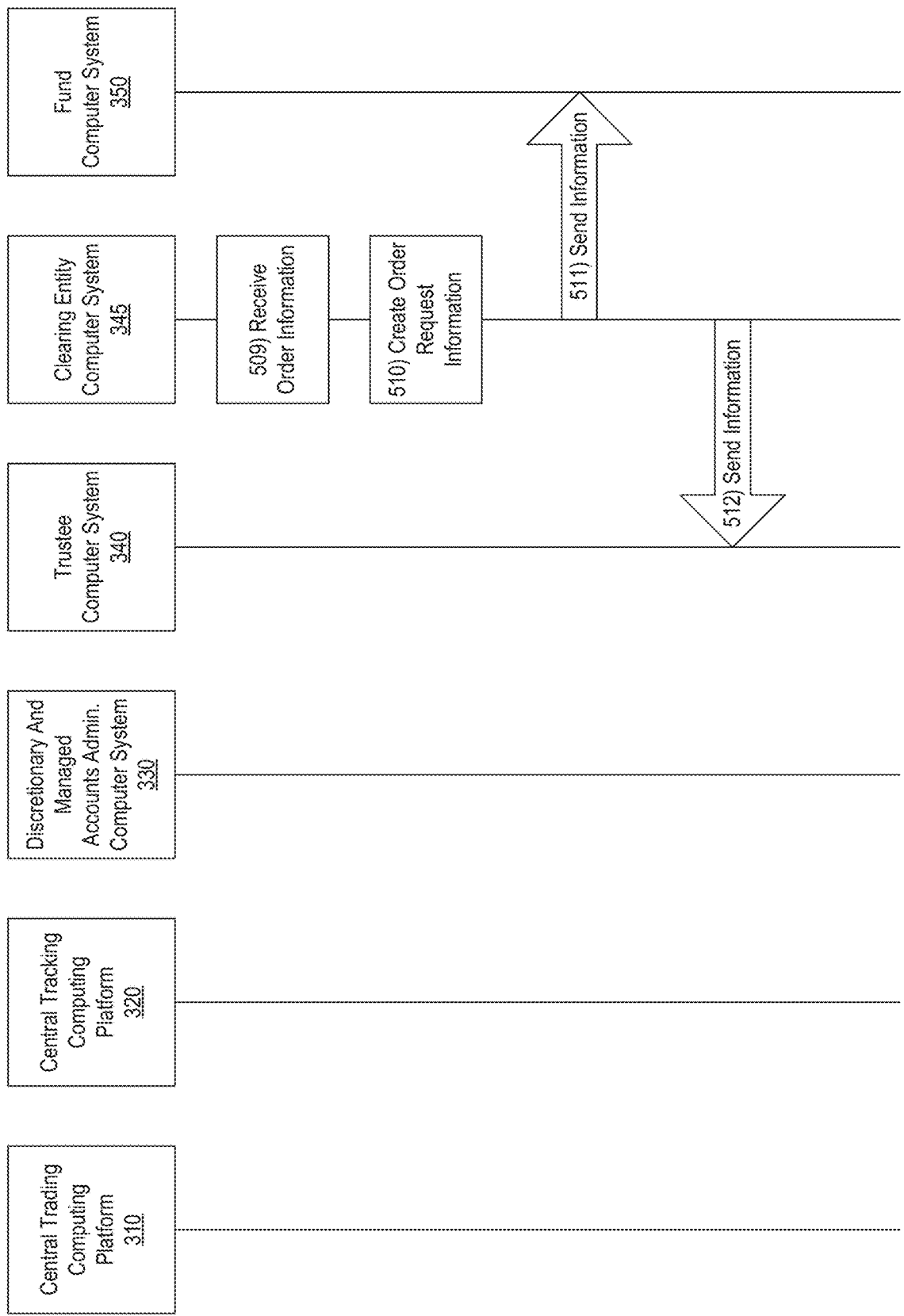

At step 508, central trading computing platform 310 may send extended order information to central tracking computing platform 320. Referring to FIG. 5C, at step 509, clearing entity computer system 345 may receive the order information from central trading computing platform 310. At step 510, clearing entity computer system 345 may create order request information (e.g., identifying one or more shares of one or more mutual funds to be purchased, sold, or otherwise processed in accordance with the order information) based on the order information received from central trading computing platform 310. At step 511, clearing entity computer system 345 may send the order request information to fund computer system 350. At step 512, clearing entity computer system 345 may send the order request information to trustee computer system 340.

Figure 5D:
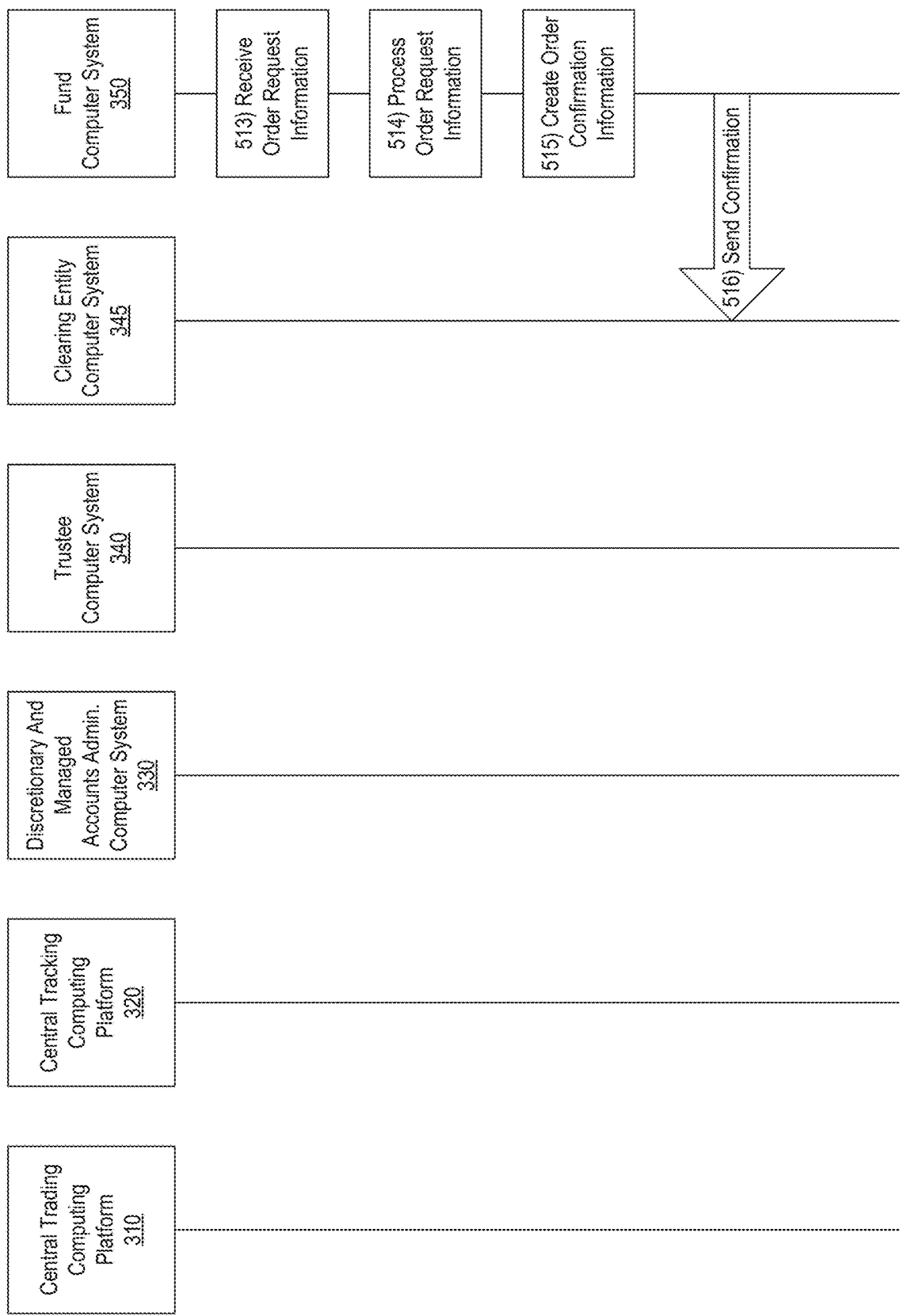

Referring to FIG. 5D, at step 513, fund computer system 350 may receive the order request information from clearing entity computer system 345. At step 514, fund computer system 350 may process the order request information. At step 515, fund computer system 350 may create order confirmation information (e.g., confirming and/or otherwise indicating that one or more shares of one or more mutual funds have been purchased, sold, or otherwise processed in accordance with the order request information). At step 516, fund computer system 350 may send the order confirmation information to clearing entity computer system 345.

Figure 5E:
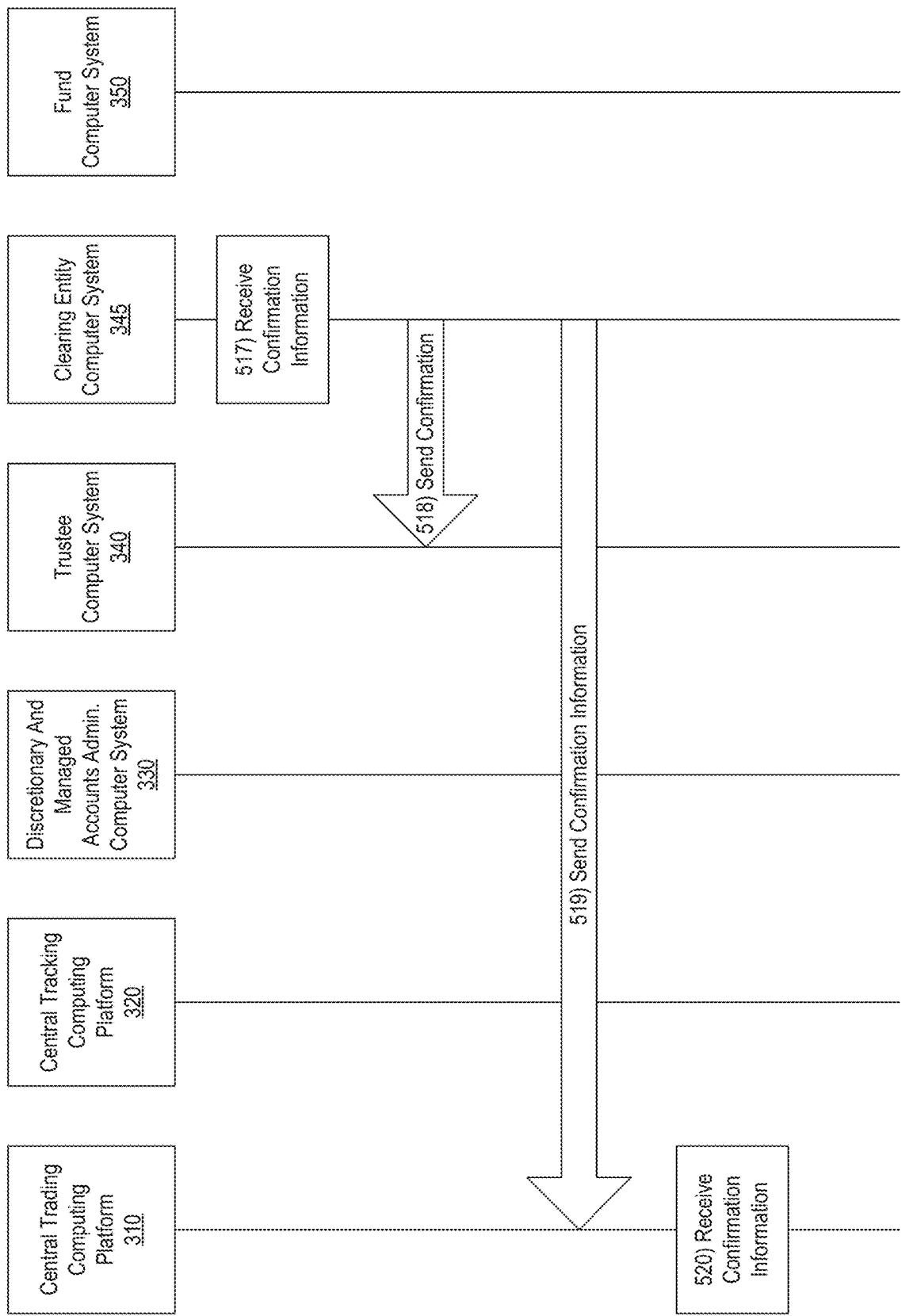

Referring to FIG. 5E, at step 517, clearing entity computer system 345 may receive the order confirmation information from fund computer system 350. At step 518, clearing entity computer system 345 may send the order confirmation information to trustee computer system 340. At step 519, clearing entity computer system 345 may send the order confirmation information to central trading computing platform 310. At step 520, central trading computing platform 310 may receive the order confirmation information from clearing entity computer system 345.

Referring to FIG. 5F, at step 521, central trading computing platform 310 may send the order confirmation information to central tracking computing platform 320. At step 522, central tracking computing platform 320 may receive the order confirmation information from central trading computing platform 310. At step 523, central tracking computing platform 320 may update one or more records based on the order confirmation information. At step 524, central tracking computing platform 320 may allocate one or more orders to one or more individual accountholders (e.g., by creating and/or updating records identifying particular accountholders as owning and/or having the rights to particular assets that were purchased, sold, or otherwise affected by the orders that were processed and/or executed, for instance, by clearing entity computer system 345).

Figure 5G:
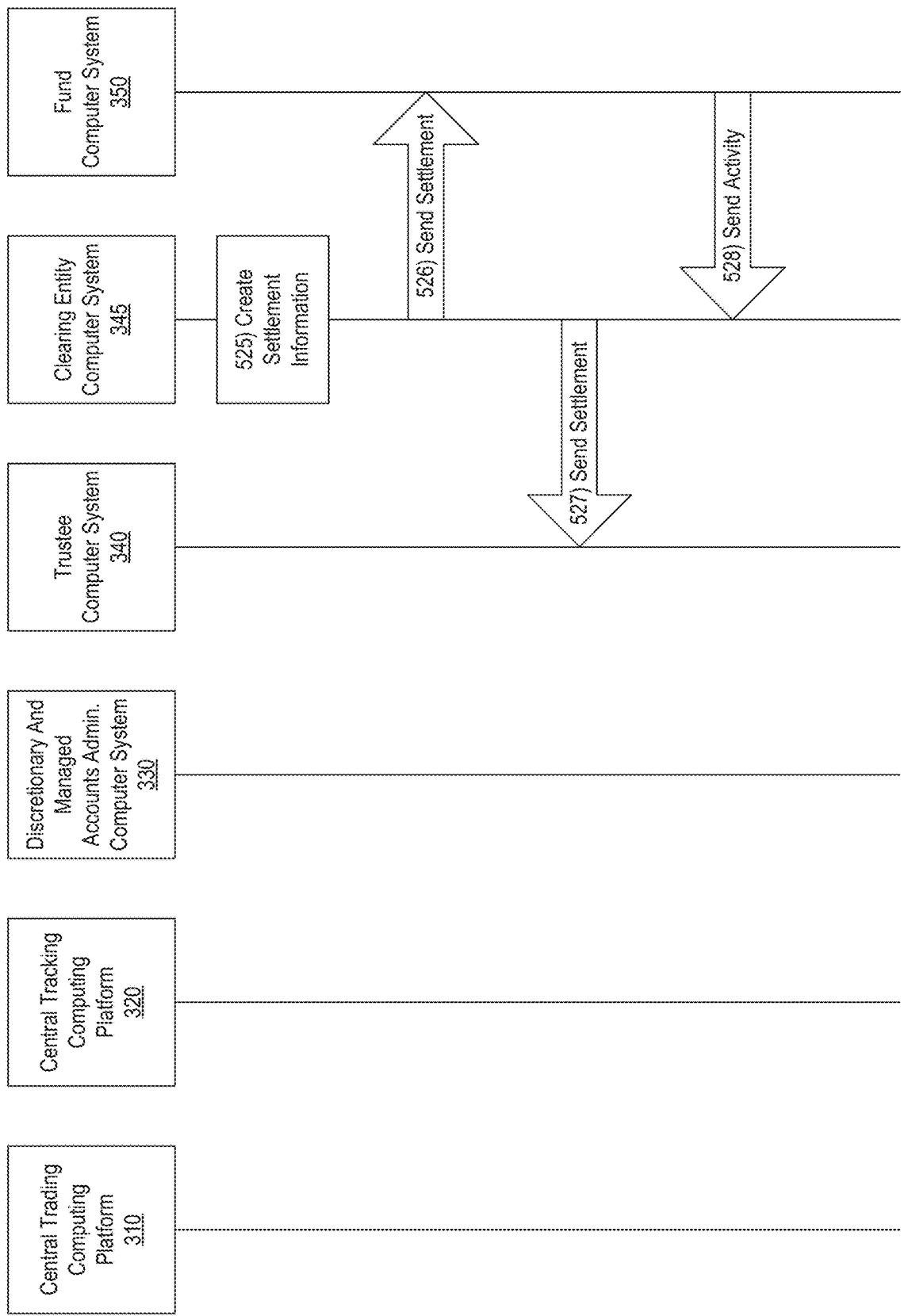

Referring to FIG. 5G, at step 525, clearing entity computer system 345 may create settlement information (which may, e.g., include information that enables settlement between the parties by facilitating the transfer of the assets that were purchased, for instance, from an entity operating fund computer system 350 to the trustee-custodian operating trustee computer system 340 and/or by facilitating the transfer of funds from the trustee-custodian operating trustee computer system 340 to the entity operating fund computer system 350 for the assets that were purchased). At step 526, clearing entity computer system 345 may send the settlement information to fund computer system 350. At step 527, clearing entity computer system 345 may send the settlement information to trustee computer system 340. At step 528, fund computer system 350 may send activity-position information (e.g., identifying changes in one or more positions of one or more mutual funds created and/or maintained by the entity operating fund computer system 350) to clearing entity computer system 345.

Figure 5H:
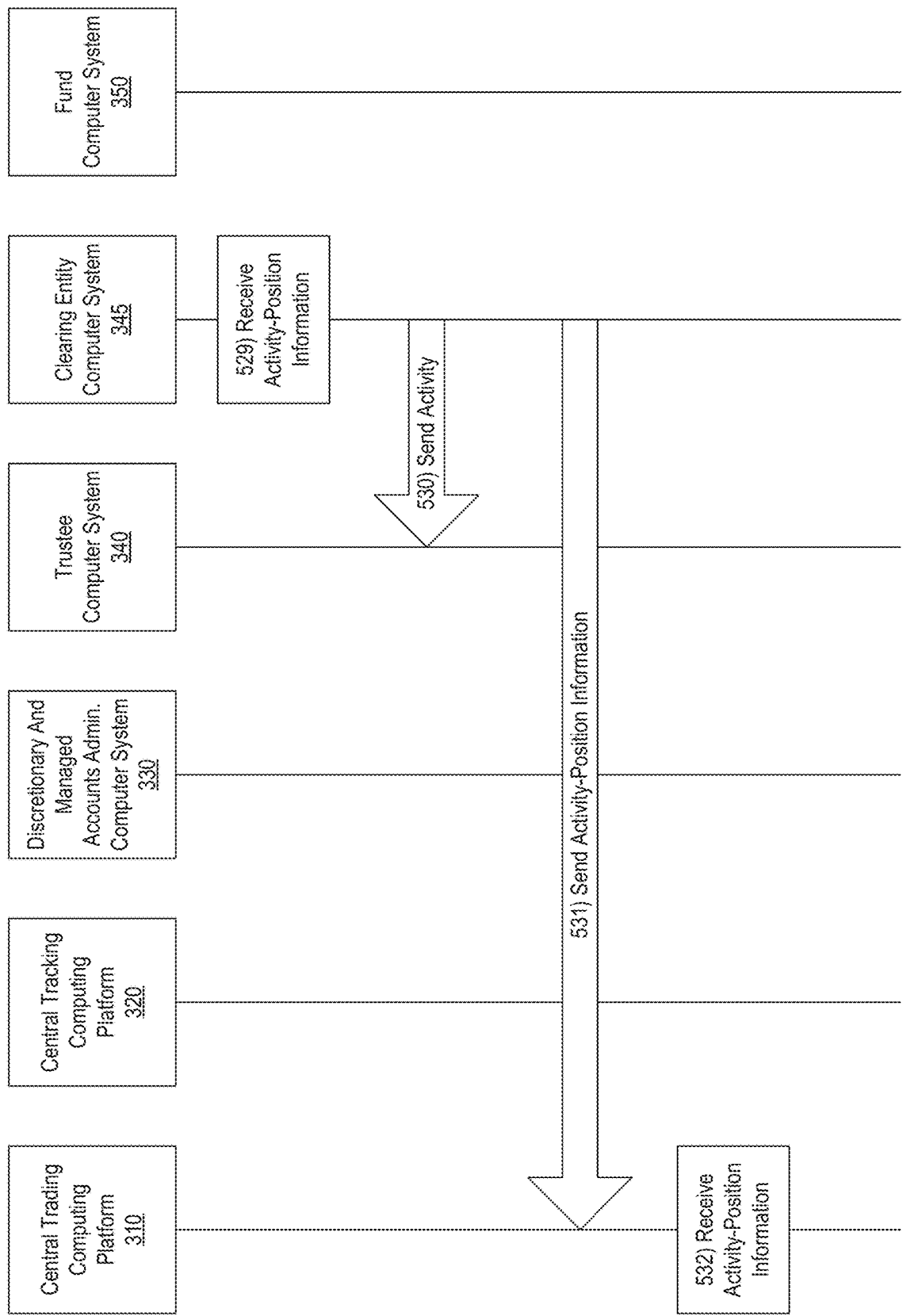

Referring to FIG. 5H, at step 529, clearing entity computer system 345 may receive the activity-position information from fund computer system 350. At step 530, clearing entity computer system 345 may send the activity-position information to trustee computer system 340. At step 531, clearing entity computer system 345 may send the activity-position information to central trading computing platform 310. At step 532, central trading computing platform 310 may receive the activity-position information from clearing entity computer system 345. For example, at step 532, central trading computing platform 310 may receive, via the communication interface (e.g., communication interface 315), and from the clearing entity computer system (e.g., clearing entity computer system 345), activity-position information associated with the one or more mutual funds.

Figure 5I:
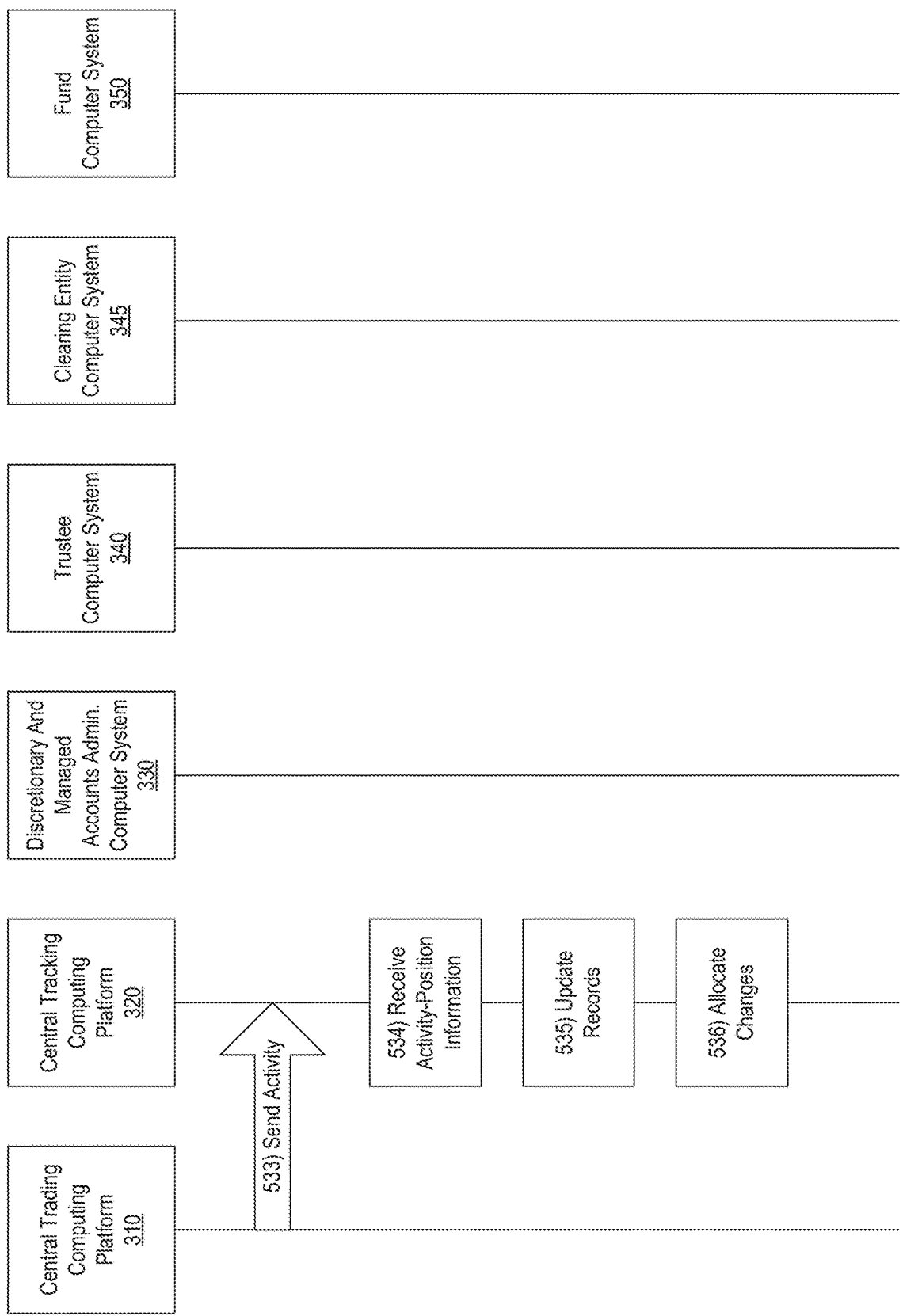

Referring to FIG. 5I, at step 533, central trading computing platform 310 may send the activity-position information to central tracking computing platform 320. For example, at step 533, central trading computing platform 310 may send, via the communication interface (e.g., communication interface 315), and to a central tracking computing platform associated with the financial institution (e.g., central tracking computing platform 320), the activity-position information associated with the one or more mutual funds received from the clearing entity computer system (e.g., clearing entity computer system 345).

In some embodiments, the central tracking computing platform associated with the financial institution may be configured to update billing information, supervision information, and reconciliation information based on the activity-position information associated with the one or more mutual funds received from the clearing entity computer system. For example, the central tracking computing platform associated with the financial institution (e.g., central tracking computing platform 320) may be configured to update billing information, supervision information, and reconciliation information based on the activity-position information associated with the one or more mutual funds received from the clearing entity computer system (e.g., clearing entity computer system 345).

In some embodiments, the central tracking computing platform associated with the financial institution may be configured to allocate changes identified in the activity-position information associated with the one or more mutual funds received from the clearing entity computer system to one or more accountholders associated with the one or more accounts administrated by the financial institution. For example, the central tracking computing platform associated with the financial institution (e.g., central tracking computing platform 320) may be configured to allocate changes identified in the activity-position information associated with the one or more mutual funds received from the clearing entity computer system (e.g., clearing entity computer system 345) to one or more accountholders associated with the one or more accounts administrated by the financial institution.

In some embodiments, the central tracking computing platform associated with the financial institution may be configured to post the changes identified in the activity-position information associated with the one or more mutual funds received from the clearing entity computer system and allocated to the one or more accountholders associated with the one or more accounts administrated by the financial institution to one or more trading applications provided by the discretionary and managed accounts administration computer system associated with the financial institution. For example, the central tracking computing platform associated with the financial institution (e.g., central tracking computing platform 320) may be configured to post the changes identified in the activity-position information associated with the one or more mutual funds received from the clearing entity computer system (e.g., clearing entity computer system 345) and allocated to the one or more accountholders associated with the one or more accounts administrated by the financial institution to one or more trading applications provided by the discretionary and managed accounts administration computer system associated with the financial institution (e.g., discretionary and managed accounts administration computer system 330).

At step 534, central tracking computing platform 320 may receive the activity-position information from central trading computing platform 310. At step 535, central tracking computing platform 320 may update one or more records based on the activity-position information received from central trading computing platform 310. At step 536, central tracking computing platform 320 may allocate one or more changes in positions identified in the activity-position information to individual accountholders (e.g., by creating and/or updating records identifying particular accountholders as owning and/or having the rights to particular assets that have changed in position as identified in the activity-position information).

Figure 5J:
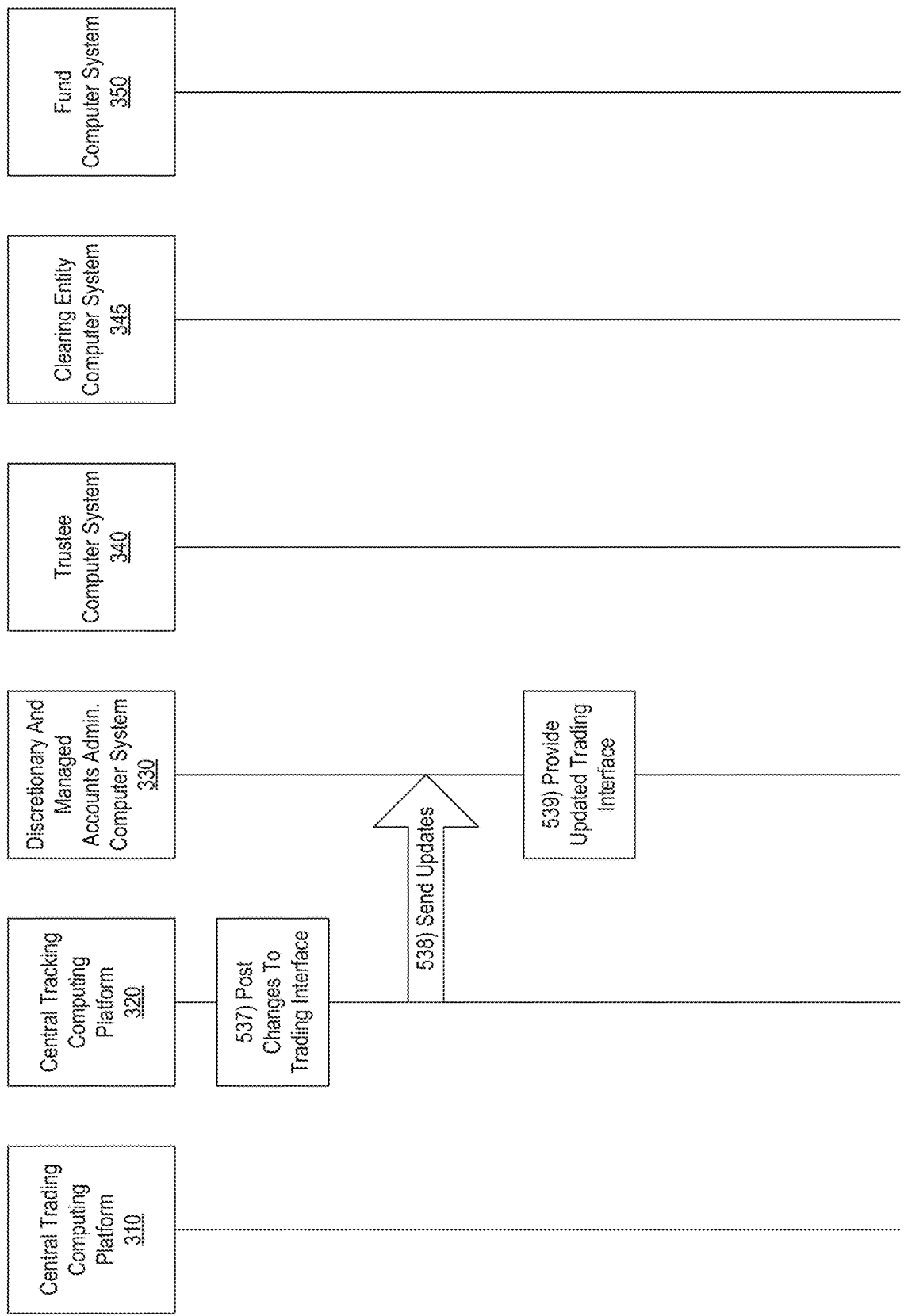

Referring to FIG. 5J, at step 537, central tracking computing platform 320 may post the one or more changes to the trading interface. At step 538, central tracking computing platform 320 may send the one or more changes to discretionary and managed accounts administration computer system 330 (e.g., to facilitate updates to the trading interface provided by discretionary and managed accounts administration computer system 330). At step 539, discretionary and managed accounts administration computer system 330 may provide an updated trading interface (e.g., to one or more managed account advisors of the financial institution, to one or more financial advisors of the financial institution trading with discretion, or the like).

Figure 6A:
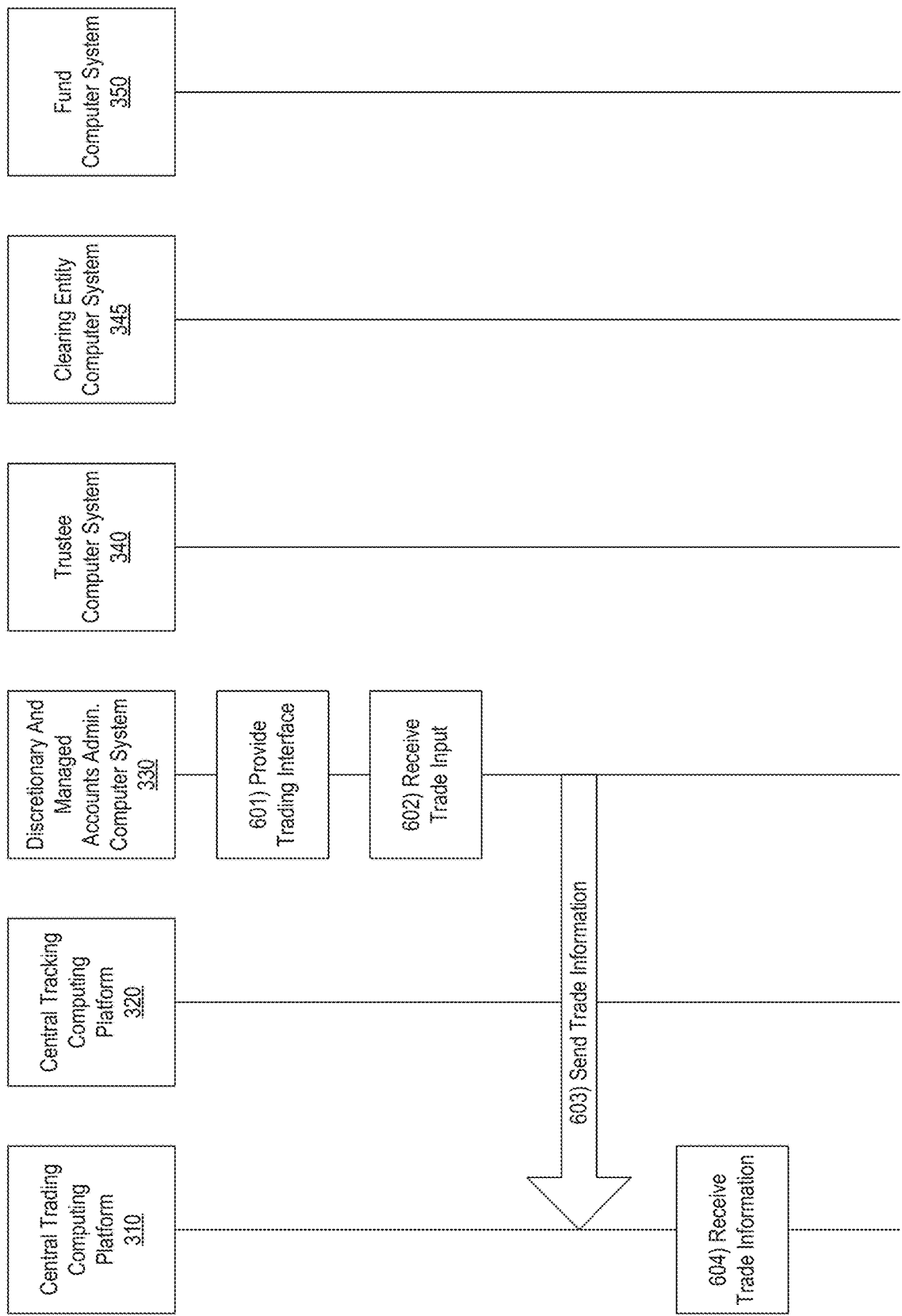

FIGS. 6A-6H depict another illustrative event sequence for deploying and implementing centralized trading and tracking computing platforms to support tri-party trading in accordance with one or more example embodiments. Referring to FIG. 6A, at step 601, discretionary and managed accounts administration computer system 330 may provide a trading interface (which may, e.g., include one or more trading user interfaces via which one or more managed account advisors of a financial institution and/or one or more financial advisors of a financial institution trading with discretion may create, initiate, and/or cancel one or more trades in one or more assets and/or view and/or modify other information associated with trading operations associated with the financial institution). In some instances, the trading interface may be a website, and in providing the trading interface, discretionary and managed accounts administration computer system 330 may generate, serve, and/or otherwise provide one or more pages of the trading interface website. At step 602, discretionary and managed accounts administration computer system 330 may receive trade input. For example, at step 602, discretionary and managed accounts administration computer system 330 may receive input specifying particular trades for particular accounts maintained by the financial institution. At step 603, discretionary and managed accounts administration computer system 330 may send trade information (e.g., identifying one or more trades corresponding to the trade input received at step 602) to central trading computing platform 310.

At step 604, central trading computing platform 310 may receive the trade information from discretionary and managed accounts administration computer system 330. For example, at step 604, central trading computing platform 310 may receive, via the communication interface (e.g., communication interface 315), and from a discretionary and managed accounts administration computer system associated with a financial institution (e.g., discretionary and managed accounts administration computer system 330), trade information defining one or more trades in one or more exchange traded funds or equity securities for one or more accounts administrated by the financial institution.

In some embodiments, the discretionary and managed accounts administration computer system associated with the financial institution may be configured to provide one or more trading user interfaces to one or more managed account advisors associated with the financial institution. For example, the discretionary and managed accounts administration computer system associated with the financial institution (e.g., discretionary and managed accounts administration computer system 330) may be configured to provide one or more trading user interfaces to one or more managed account advisors associated with the financial institution.

In some embodiments, the discretionary and managed accounts administration computer system associated with the financial institution may be configured to receive trade input specifying the one or more trades in the one or more exchange traded funds or equity securities for the one or more accounts administrated by the financial institution via the one or more trading user interfaces provided to the one or more managed account advisors associated with the financial institution. For example, the discretionary and managed accounts administration computer system associated with the financial institution (e.g., discretionary and managed accounts administration computer system 330) may be configured to receive trade input specifying the one or more trades in the one or more exchange traded funds or equity securities for the one or more accounts administrated by the financial institution via the one or more trading user interfaces provided to the one or more managed account advisors associated with the financial institution.

In some embodiments, the discretionary and managed accounts administration computer system associated with the financial institution may be configured to provide one or more trading user interfaces to one or more financial advisors associated with the financial institution. For example, the discretionary and managed accounts administration computer system associated with the financial institution (e.g., discretionary and managed accounts administration computer system 330) may be configured to provide one or more trading user interfaces to one or more financial advisors associated with the financial institution.

In some embodiments, the discretionary and managed accounts administration computer system associated with the financial institution may be configured to receive trade input specifying the one or more trades in the one or more exchange traded funds or equity securities for the one or more accounts administrated by the financial institution via the one or more trading user interfaces provided to the one or more financial advisors associated with the financial institution. For example, the discretionary and managed accounts administration computer system associated with the financial institution (e.g., discretionary and managed accounts administration computer system 330) may be configured to receive trade input specifying the one or more trades in the one or more exchange traded funds or equity securities for the one or more accounts administrated by the financial institution via the one or more trading user interfaces provided to the one or more financial advisors associated with the financial institution.

Figure 6B:
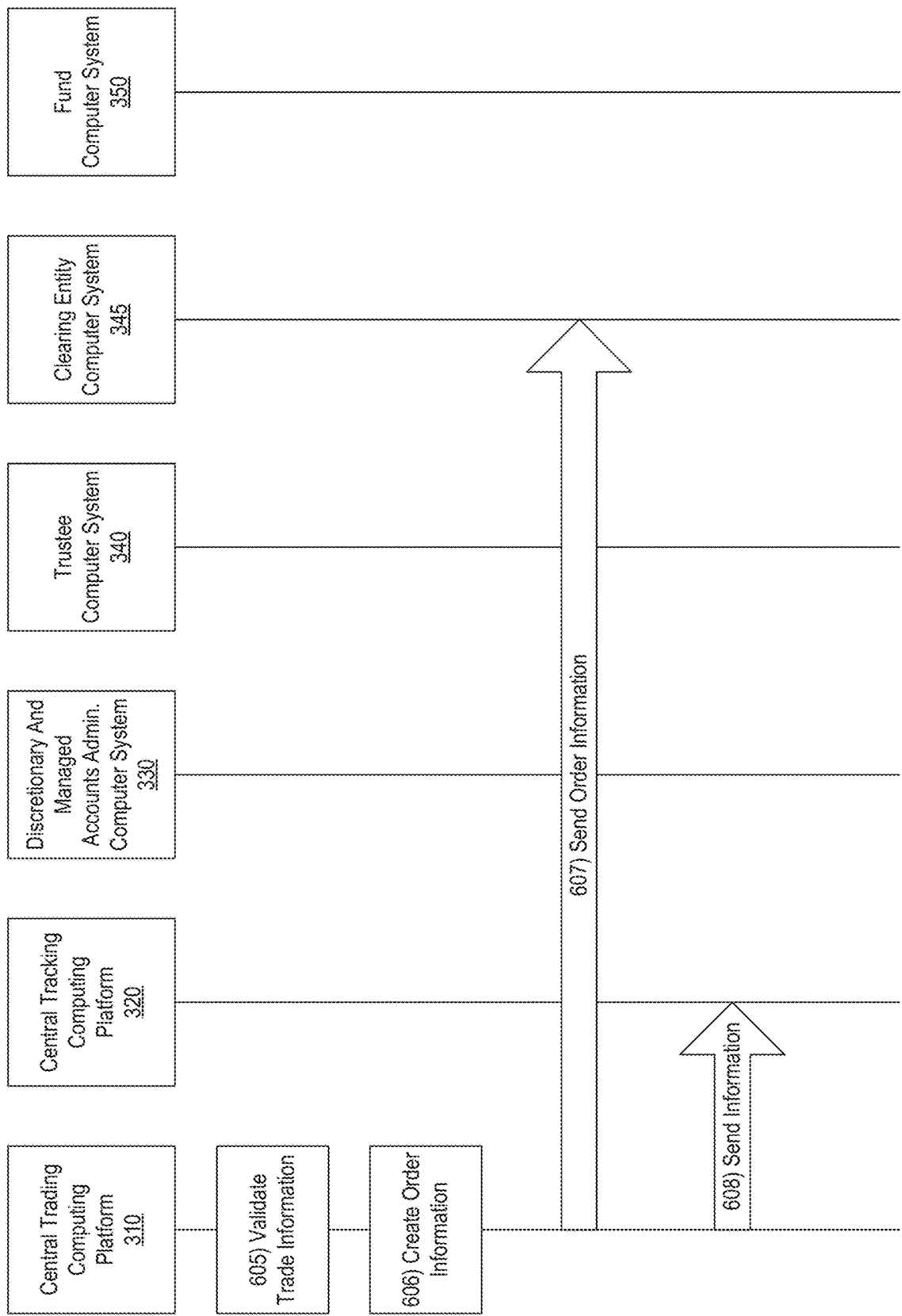

Referring to FIG. 6B, at step 605, central trading computing platform 310 may validate the trade information received from discretionary and managed accounts administration computer system 330. For example, at step 605, central trading computing platform 310 may validate the trade information defining the one or more trades in the one or more exchange traded funds or equity securities for the one or more accounts administrated by the financial institution received from the discretionary and managed accounts administration computer system associated with the financial institution (e.g., discretionary and managed accounts administration computer system 330).

In some embodiments, validating the trade information defining the one or more trades in the one or more exchange traded funds or equity securities for the one or more accounts administrated by the financial institution received from the discretionary and managed accounts administration computer system associated with the financial institution may include accepting the one or more trades in the one or more exchange traded funds or equity securities for the one or more accounts administrated by the financial institution based on one or more processing rules associated with the one or more exchange traded funds or equity securities. For example, in validating the trade information defining the one or more trades in the one or more exchange traded funds or equity securities for the one or more accounts administrated by the financial institution received from the discretionary and managed accounts administration computer system associated with the financial institution (e.g., discretionary and managed accounts administration computer system 330), central trading computing platform 310 may accept the one or more trades in the one or more exchange traded funds or equity securities for the one or more accounts administrated by the financial institution based on one or more processing rules associated with the one or more exchange traded funds or equity securities. Such processing rules may, for instance, be stored and/or otherwise maintained by central trading computing platform 310 in trading database 314.

At step 606, central trading computing platform 310 may create order information (e.g., identifying one or more orders to be executed in accordance with the trade information) based on the trade information received from discretionary and managed accounts administration computer system 330. For example, after validating the trade information defining the one or more trades in the one or more exchange traded funds or equity securities for the one or more accounts administrated by the financial institution received from the discretionary and managed accounts administration computer system associated with the financial institution (e.g., discretionary and managed accounts administration computer system 330), central trading computing platform 310 may create order information based on the trade information defining the one or more trades in the one or more exchange traded funds or equity securities for the one or more accounts administrated by the financial institution received from the discretionary and managed accounts administration computer system associated with the financial institution (e.g., discretionary and managed accounts administration computer system 330).

In some embodiments, creating the order information based on the trade information defining the one or more trades in the one or more exchange traded funds or equity securities for the one or more accounts administrated by the financial institution received from the discretionary and managed accounts administration computer system associated with the financial institution may include adding one or more indicators identifying the custodian different from the financial institution to the trade information defining the one or more trades in the one or more exchange traded funds or equity securities for the one or more accounts administrated by the financial institution received from the discretionary and managed accounts administration computer system associated with the financial institution. For example, in creating the order information based on the trade information defining the one or more trades in the one or more exchange traded funds or equity securities for the one or more accounts administrated by the financial institution received from the discretionary and managed accounts administration computer system associated with the financial institution (e.g., discretionary and managed accounts administration computer system 330), central trading computing platform 310 may add one or more indicators identifying the custodian different from the financial institution to the trade information defining the one or more trades in the one or more exchange traded funds or equity securities for the one or more accounts administrated by the financial institution received from the discretionary and managed accounts administration computer system associated with the financial institution (e.g., discretionary and managed accounts administration computer system 330). Such indicators may, for instance, enable and/or cause the trades to be settled with the custodian operating trustee computer system 340 instead of with the financial institution operating central trading computing platform 310.

At step 607, central trading computing platform 310 may send the order information to clearing entity computer system 345. For example, at step 607, central trading computing platform 310 may send, via the communication interface (e.g., communication interface 315), and to a clearing entity computer system (e.g., clearing entity computer system 345), the order information created based on the trade information defining the one or more trades in the one or more exchange traded funds or equity securities for the one or more accounts administrated by the financial institution received from the discretionary and managed accounts administration computer system associated with the financial institution (e.g., discretionary and managed accounts administration computer system 330). In addition, the order information created based on the trade information defining the one or more trades in the one or more exchange traded funds or equity securities for the one or more accounts administrated by the financial institution received from the discretionary and managed accounts administration computer system associated with the financial institution may be configured to cause the clearing entity computer system to settle the one or more trades in the one or more exchange traded funds or equity securities for the one or more accounts administrated by the financial institution with a custodian different from the financial institution. For example, the order information created by central trading computing platform 310 based on the trade information defining the one or more trades in the one or more exchange traded funds or equity securities for the one or more accounts administrated by the financial institution received from the discretionary and managed accounts administration computer system associated with the financial institution (e.g., discretionary and managed accounts administration computer system 330) may be configured to cause the clearing entity computer system (e.g., clearing entity computer system 345) to settle the one or more trades in the one or more exchange traded funds or equity securities for the one or more accounts administrated by the financial institution with a custodian different from the financial institution. In some embodiments, the custodian may hold one or more assets of the one or more accounts administrated by the financial institution in trust, such that the one or more assets of the one or more accounts administrated by the financial institution are held away from the financial institution.

At step 608, central trading computing platform 310 may send extended order information to central tracking computing platform 320. Referring to FIG. 6C, at step 609, clearing entity computer system 345 may receive the order information from central trading computing platform 310. At step 610, clearing entity computer system 345 may send the order information to trustee computer system 340. At step 611, clearing entity computer system 345 may process the order information. In processing the order information (e.g., at step 611), clearing entity computer system 345 may, for instance, place and/or execute one or more trades in accordance with the order information. At step 612, clearing entity computer system 345 may create confirmation information (e.g., confirming and/or otherwise indicating that one or more shares of one or more equity securities, exchange traded funds, and/or other securities have been purchased, sold, or otherwise processed in accordance with the order information).

Referring to FIG. 6D, at step 613, clearing entity computer system 345 may send the confirmation information to trustee computer system 340. At step 614, clearing entity computer system 345 may send the confirmation information to central trading computing platform 310. At step 615, central trading computing platform 310 may receive the confirmation information. At step 616, central trading computing platform 310 may send the confirmation information to central tracking computing platform 320.

Referring to FIG. 6E, at step 617, central tracking computing platform 320 may receive the confirmation information. At step 618, central tracking computing platform 320 may update one or more records based on the confirmation information. At step 619, central tracking computing platform 320 may allocate one or more orders to one or more individual accountholders (e.g., by creating and/or updating records identifying particular accountholders as owning and/or having the rights to particular assets that were purchased, sold, or otherwise affected by the orders that were processed and/or executed, for instance, by clearing entity computer system 345). At step 620, clearing entity computer system 345 may create settlement information (which may, e.g., include information that enables settlement between the parties by facilitating the transfer of the assets that were purchased, for instance, from an entity operating clearing entity computer system 345 to the trustee-custodian operating trustee computer system 340 and/or by facilitating the transfer of funds from the trustee-custodian operating trustee computer system 340 to the entity operating clearing entity computer system 345 for the assets that were purchased).

Figure 6F:
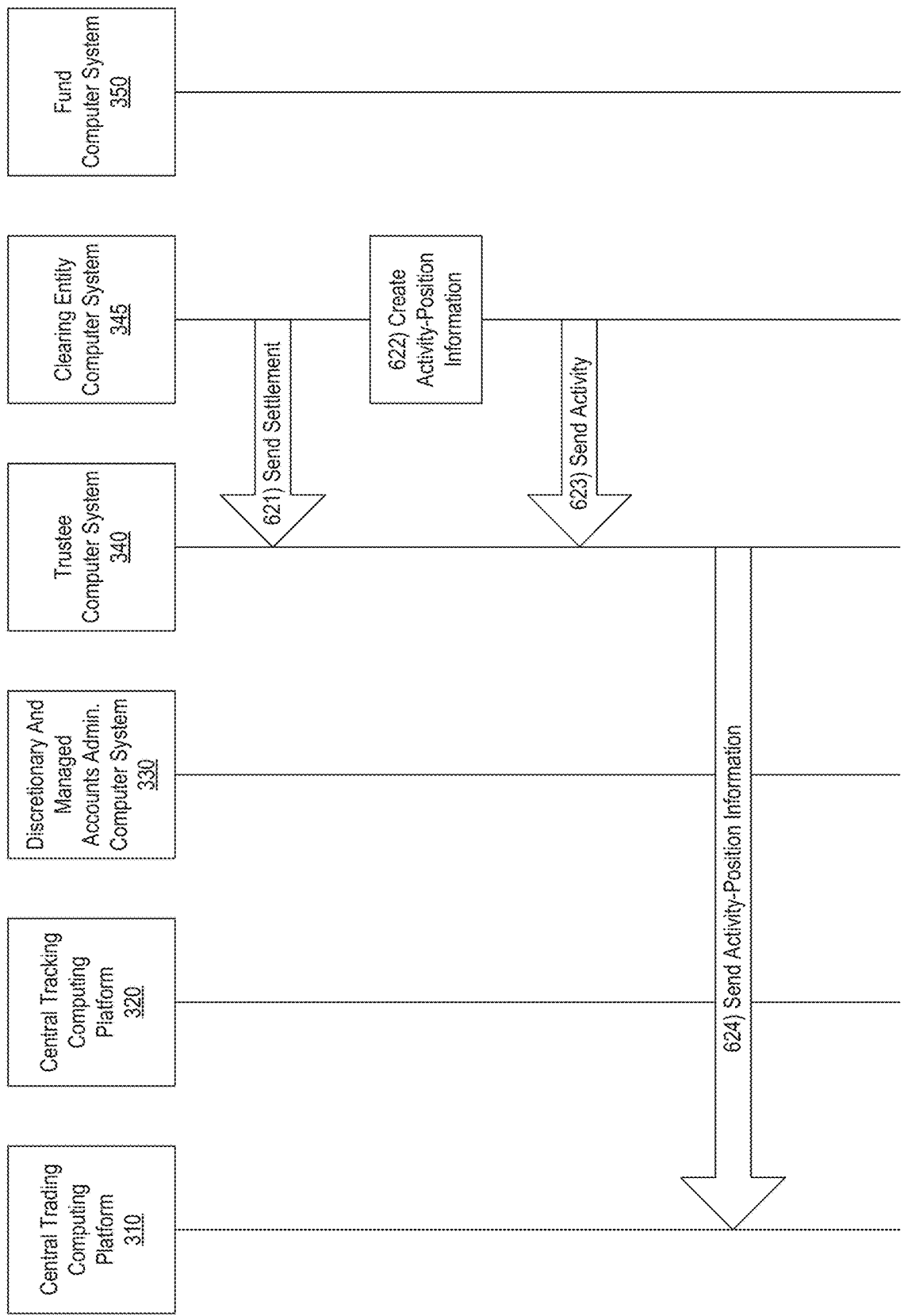

Referring to FIG. 6F, at step 621, clearing entity computer system 345 may send the settlement information to trustee computer system 340. At step 622, clearing entity computer system 345 may create activity-position information. For example, at step 622, clearing entity computer system 345 may create such activity-position information based on activity and/or changes in position of particular equity securities, exchanged traded funds, and/or other securities during a predetermined time period, such as at the end of the business day, at the end of the week, or the like. In addition, such activity-position information may, for instance, identify the changes in position of particular equity securities, exchanged traded funds, and/or other securities during a predetermined time period, such as at the end of the business day, at the end of the week, or the like, by including information associated with a current value and/or other attributes of such equity securities, exchanged traded funds, and/or other securities. At step 623, clearing entity computer system 345 may send the activity-position information to trustee computer system 340. At step 624, trustee computer system 340 may send the activity-position information to central trading computing platform 310. By receiving the activity-position information from trustee computer system 340, central trading computing platform 310 and/or central tracking computing platform 320 may be able to provide one or more users of discretionary and managed accounts administration computer system 330 with current and accurate information about the assets that are held by the trustee-custodian operating trustee computer system 340, such as the current quantity of such assets, the current price of such assets, the current value of such assets, and/or the like. In some instances, the activity-position information received by central trading computing platform 310 from trustee computer system 340 may include only the activity-position information received by trustee computer system 340 from clearing entity computer system 345 at step 623. In other instances, the activity-position information received by central trading computing platform 310 from trustee computer system 340 may include the activity-position information received by trustee computer system 340 from clearing entity computer system 345 at step 623 and/or other activity-position information associated with other assets and/or all assets that are held by the trustee-custodian operating trustee computer system 340 for the benefit of one or more specific accountholders.

In one or more alternative arrangements, rather than trustee computer system 340 sending activity-position information to central trading computing platform 310 (which may, e.g., then send the activity-position information to central tracking computing platform 320 as discussed in greater detail below), trustee computer system 340 may send the activity-position information directly to central tracking computing platform 320. In other alternative arrangements, activity-position information may be sent from trustee computer system 340 to central trading computing platform 310 and/or central tracking computing platform 320 via one or more third-party entities and/or computer systems, such as via one or more vendors and/or vendor computer systems which may support the operations of central trading computing platform 310 and/or central tracking computing platform 320 and/or which may support the operations of a financial institution operating central trading computing platform 310 and/or central tracking computing platform 320.

Referring to FIG. 6G, at step 625, central trading computing platform 310 may receive the activity-position information from trustee computer system 340. For example, at step 625, central trading computing platform 310 may receive, via the communication interface (e.g., communication interface 315), and from the trustee computer system associated with the custodian different from the financial institution (e.g., trustee computer system 340), activity-position information associated with the one or more exchange traded funds or equity securities. At step 626, central trading computing platform 310 may send the activity-position information to central tracking computing platform 320. For example, at step 626, central trading computing platform 310 may send, via the communication interface (e.g., communication interface 315), and to a central tracking computing platform associated with the financial institution (e.g., central tracking computing platform 320), the activity-position information associated with the one or more exchange traded funds or equity securities received from the trustee computer system associated with the custodian different from the financial institution (e.g., trustee computer system 340).

In some embodiments, the central tracking computing platform associated with the financial institution may be configured to update billing information, supervision information, and reconciliation information based on the activity-position information associated with the one or more exchange traded funds or equity securities received from the trustee computer system associated with the custodian different from the financial institution. For example, the central tracking computing platform associated with the financial institution (e.g., central tracking computing platform 320) may be configured to update billing information, supervision information, and reconciliation information based on the activity-position information associated with the one or more exchange traded funds or equity securities received from the trustee computer system associated with the custodian different from the financial institution (e.g., trustee computer system 340).

In some embodiments, the central tracking computing platform associated with the financial institution may be configured to allocate changes identified in the activity-position information associated with the one or more exchange traded funds or equity securities received from the trustee computer system associated with the custodian different from the financial institution to one or more accountholders associated with the one or more accounts administrated by the financial institution. For example, the central tracking computing platform associated with the financial institution (e.g., central tracking computing platform 320) may be configured to allocate changes identified in the activity-position information associated with the one or more exchange traded funds or equity securities received from the trustee computer system associated with the custodian different from the financial institution (e.g., trustee computer system 340) to one or more accountholders associated with the one or more accounts administrated by the financial institution.

In some embodiments, the central tracking computing platform associated with the financial institution may be configured to post the changes identified in the activity-position information associated with the one or more exchange traded funds or equity securities received from the trustee computer system associated with the custodian different from the financial institution and allocated to the one or more accountholders associated with the one or more accounts administrated by the financial institution to one or more trading applications provided by the discretionary and managed accounts administration computer system associated with the financial institution. For example, the central tracking computing platform associated with the financial institution (e.g., central tracking computing platform 320) may be configured to post the changes identified in the activity-position information associated with the one or more exchange traded funds or equity securities received from the trustee computer system associated with the custodian different from the financial institution (e.g., trustee computer system 340) and allocated to the one or more accountholders associated with the one or more accounts administrated by the financial institution to one or more trading applications provided by the discretionary and managed accounts administration computer system associated with the financial institution (e.g., discretionary and managed accounts administration computer system 330).

At step 627, central tracking computing platform 320 may receive the activity-position information from central trading computing platform 310. At step 628, central tracking computing platform 320 may update one or more records based on the activity-position information received from central trading computing platform 310. Referring to FIG. 6H, at step 629, central tracking computing platform 320 may allocate one or more changes in positions identified in the activity-position information to individual accountholders (e.g., by creating and/or updating records identifying particular accountholders as owning and/or having the rights to particular assets that have changed in position as identified in the activity-position information). At step 630, central tracking computing platform 320 may post the one or more changes to the trading interface. At step 631, central tracking computing platform 320 may send the one or more changes to discretionary and managed accounts administration computer system 330 (e.g., to facilitate updates to the trading interface provided by discretionary and managed accounts administration computer system 330). At step 632, discretionary and managed accounts administration computer system 330 may provide an updated trading interface (e.g., to one or more managed account advisors of the financial institution, to one or more financial advisors of the financial institution trading with discretion, or the like).

Figure 7:
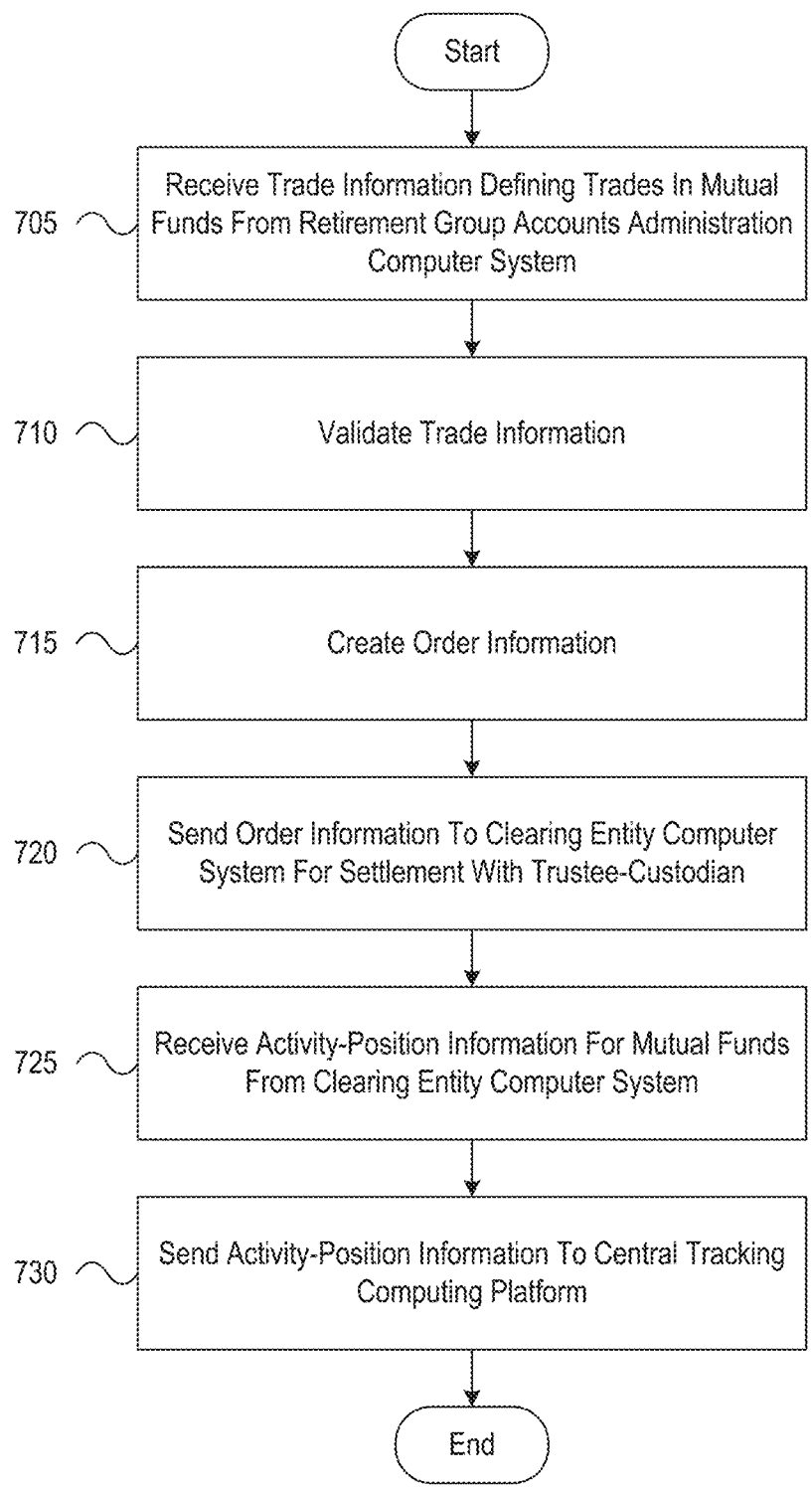
FIG. 7 depicts an illustrative method for deploying and implementing centralized trading and tracking computing platforms to support tri-party trading in accordance with one or more example embodiments.

FIG. 7 depicts an illustrative method for deploying and implementing centralized trading and tracking computing platforms to support tri-party trading in accordance with one or more example embodiments. Referring to FIG. 7, at step 705, a computing platform may receive, via a communication interface, and from a retirement group accounts administration computer system associated with a financial institution, trade information defining one or more trades in one or more mutual funds for one or more accounts administrated by the financial institution. At step 710, the computing platform may validate the trade information defining the one or more trades in the one or more mutual funds for the one or more accounts administrated by the financial institution received from the retirement group accounts administration computer system associated with the financial institution. At step 715, after validating the trade information defining the one or more trades in the one or more mutual funds for the one or more accounts administrated by the financial institution received from the retirement group accounts administration computer system associated with the financial institution, the computing platform may create order information based on the trade information defining the one or more trades in the one or more mutual funds for the one or more accounts administrated by the financial institution received from the retirement group accounts administration computer system associated with the financial institution.

At step 720, the computing platform may send, via the communication interface, and to a clearing entity computer system, the order information created based on the trade information defining the one or more trades in the one or more mutual funds for the one or more accounts administrated by the financial institution received from the retirement group accounts administration computer system associated with the financial institution, where the order information created based on the trade information defining the one or more trades in the one or more mutual funds for the one or more accounts administrated by the financial institution received from the retirement group accounts administration computer system associated with the financial institution is configured to cause the clearing entity computer system to settle the one or more trades in the one or more mutual funds for the one or more accounts administrated by the financial institution with a custodian different from the financial institution. At step 725, the computing platform may receive, via the communication interface, and from the clearing entity computer system, activity-position information associated with the one or more mutual funds. At step 730, the computing platform may send, via the communication interface, and to a central tracking computing platform associated with the financial institution, the activity-position information associated with the one or more mutual funds received from the clearing entity computer system.

Figure 8:
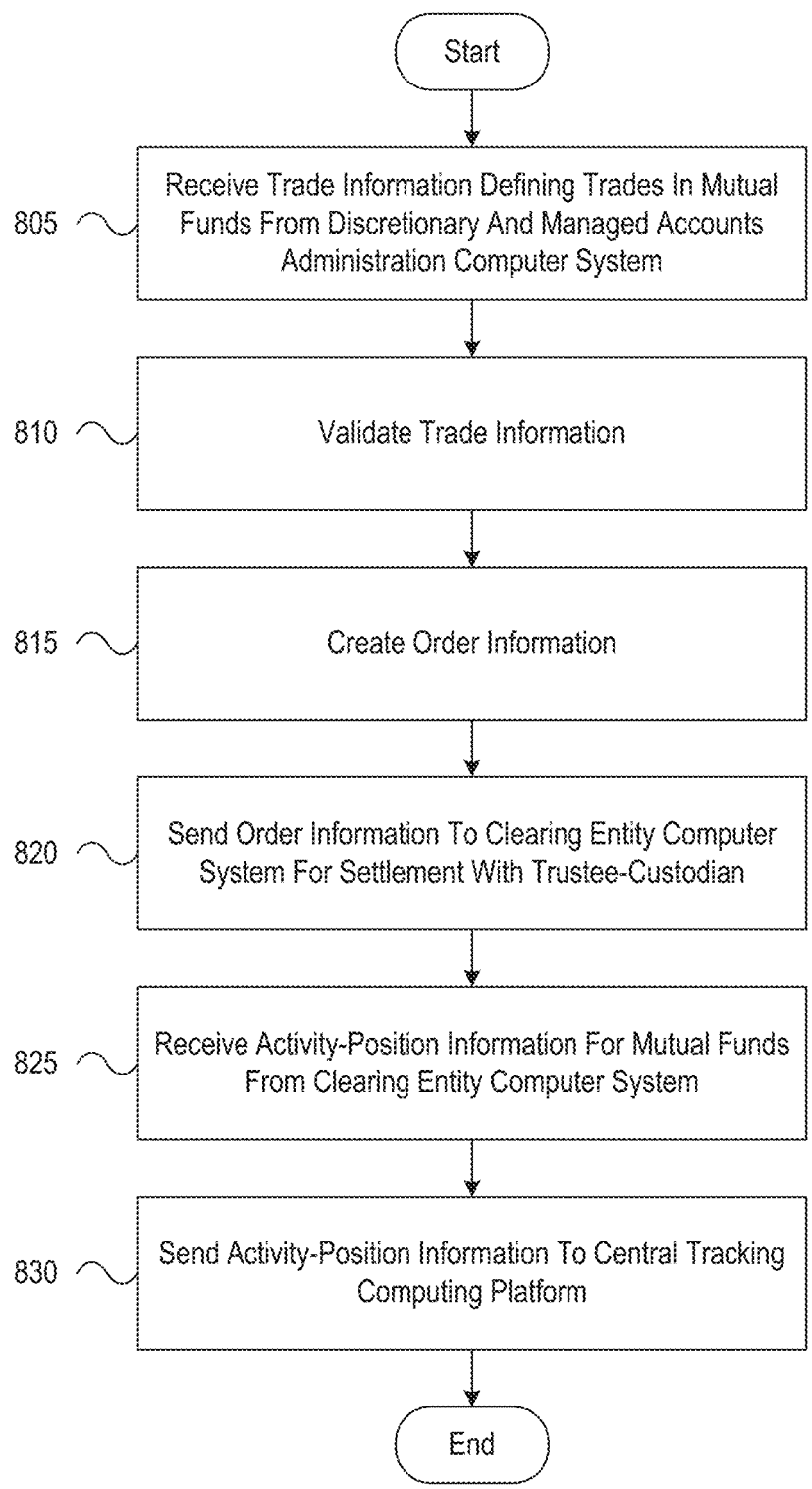
FIG. 8 depicts another illustrative method for deploying and implementing centralized trading and tracking computing platforms to support tri-party trading in accordance with one or more example embodiments.

FIG. 8 depicts another illustrative method for deploying and implementing centralized trading and tracking computing platforms to support tri-party trading in accordance with one or more example embodiments. Referring to FIG. 8, at step 805, a computing platform may receive, via a communication interface, and from a discretionary and managed accounts administration computer system associated with a financial institution, trade information defining one or more trades in one or more mutual funds for one or more accounts administrated by the financial institution. At step 810, the computing platform may validate the trade information defining the one or more trades in the one or more mutual funds for the one or more accounts administrated by the financial institution received from the discretionary and managed accounts administration computer system associated with the financial institution. At step 815, after validating the trade information defining the one or more trades in the one or more mutual funds for the one or more accounts administrated by the financial institution received from the discretionary and managed accounts administration computer system associated with the financial institution, the computing platform may create order information based on the trade information defining the one or more trades in the one or more mutual funds for the one or more accounts administrated by the financial institution received from the discretionary and managed accounts administration computer system associated with the financial institution.

At step 820, the computing platform may send, via the communication interface, and to a clearing entity computer system, the order information created based on the trade information defining the one or more trades in the one or more mutual funds for the one or more accounts administrated by the financial institution received from the discretionary and managed accounts administration computer system associated with the financial institution, where the order information created based on the trade information defining the one or more trades in the one or more mutual funds for the one or more accounts administrated by the financial institution received from the discretionary and managed accounts administration computer system associated with the financial institution is configured to cause the clearing entity computer system to settle the one or more trades in the one or more mutual funds for the one or more accounts administrated by the financial institution with a custodian different from the financial institution. At step 825, the computing platform may receive, via the communication interface, and from the clearing entity computer system, activity-position information associated with the one or more mutual funds. At step 830, the computing platform may send, via the communication interface, and to a central tracking computing platform associated with the financial institution, the activity-position information associated with the one or more mutual funds received from the clearing entity computer system.

Figure 9:
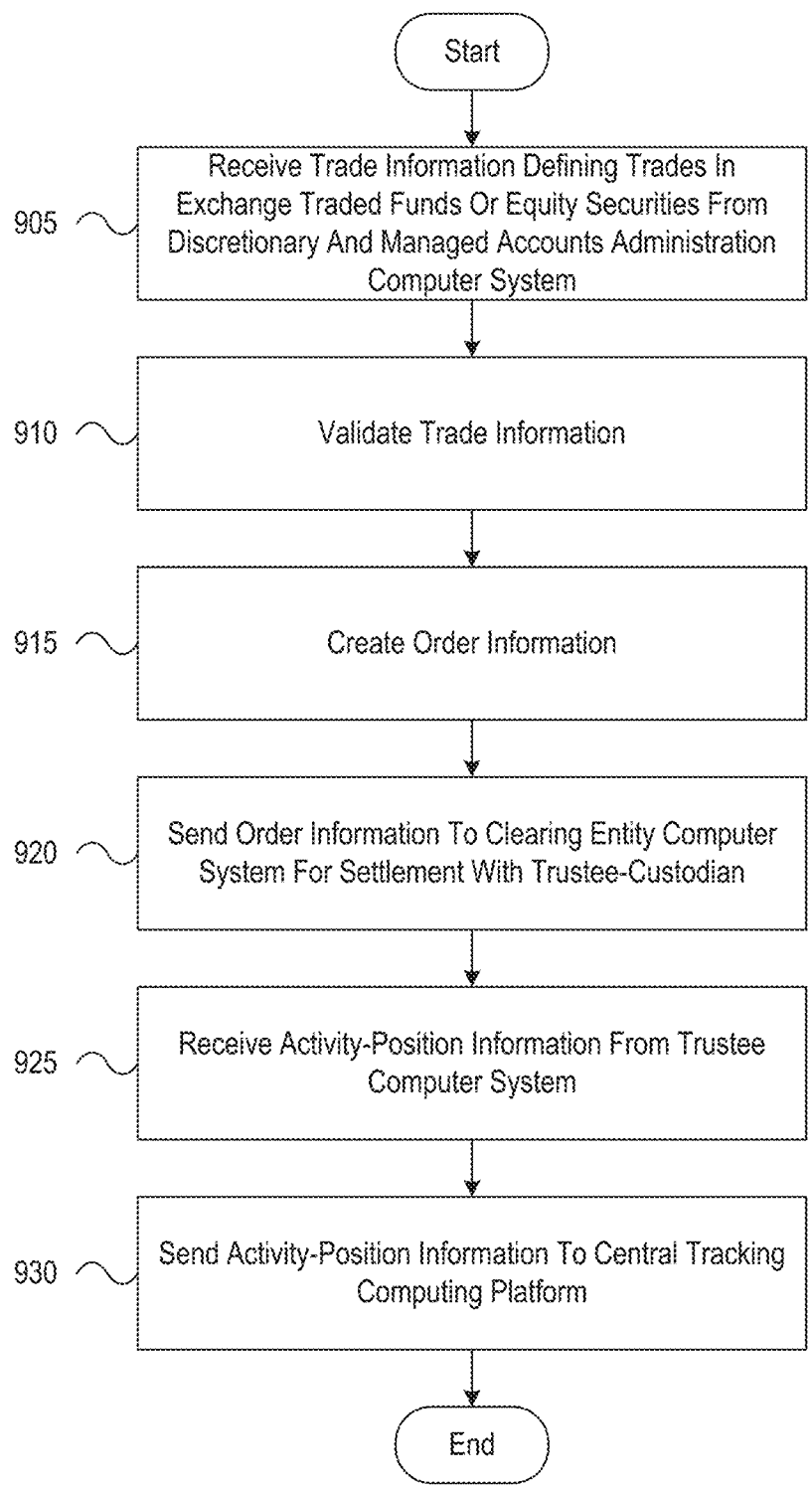
FIG. 9 depicts another illustrative method for deploying and implementing centralized trading and tracking computing platforms to support tri-party trading in accordance with one or more example embodiments.

FIG. 9 depicts another illustrative method for deploying and implementing centralized trading and tracking computing platforms to support tri-party trading in accordance with one or more example embodiments. Referring to FIG. 9, at step 905, a computing platform may receive, via a communication interface, and from a discretionary and managed accounts administration computer system associated with a financial institution, trade information defining one or more trades in one or more exchange traded funds or equity securities for one or more accounts administrated by the financial institution. At step 910, the computing platform may validate the trade information defining the one or more trades in the one or more exchange traded funds or equity securities for the one or more accounts administrated by the financial institution received from the discretionary and managed accounts administration computer system associated with the financial institution. At step 915, after validating the trade information defining the one or more trades in the one or more exchange traded funds or equity securities for the one or more accounts administrated by the financial institution received from the discretionary and managed accounts administration computer system associated with the financial institution, the computing platform may create order information based on the trade information defining the one or more trades in the one or more exchange traded funds or equity securities for the one or more accounts administrated by the financial institution received from the discretionary and managed accounts administration computer system associated with the financial institution.

At step 920, the computing platform may send, via the communication interface, and to a clearing entity computer system, the order information created based on the trade information defining the one or more trades in the one or more exchange traded funds or equity securities for the one or more accounts administrated by the financial institution received from the discretionary and managed accounts administration computer system associated with the financial institution, where the order information created based on the trade information defining the one or more trades in the one or more exchange traded funds or equity securities for the one or more accounts administrated by the financial institution received from the discretionary and managed accounts administration computer system associated with the financial institution is configured to cause the clearing entity computer system to settle the one or more trades in the one or more exchange traded funds or equity securities for the one or more accounts administrated by the financial institution with a custodian different from the financial institution. At step 925, the computing platform may receive, via the communication interface, and from a trustee computer system associated with the custodian different from the financial institution, activity-position information associated with the one or more exchange traded funds or equity securities. At step 930, the computing platform may send, via the communication interface, and to a central tracking computing platform associated with the financial institution, the activity-position information associated with the one or more exchange traded funds or equity securities received from the trustee computer system associated with the custodian different from the financial institution.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface communicatively coupled to the at least one processor; and
   memory storing computer-readable instructions that, when executed by the at least one processor, cause the system to:
   receive, via the communication interface, and from a first computer system associated with a financial institution, trade information defining one or more trades in one or more complex assets for one or more accounts administrated by the financial institution;
   create order information based on the trade information defining the one or more trades in the one or more complex assets for the one or more accounts administrated by the financial institution received from the first computer system associated with the financial institution,
      wherein creating the order information based on the trade information defining the one or more trades in the one or more complex assets for the one or more accounts administrated by the financial institution received from the first computer system associated with the financial institution comprises adding one or more indicators identifying a custodian different from the financial institution to the trade information defining the one or more trades in the one or more complex assets for the one or more accounts administrated by the financial institution received from the first computer system associated with the financial institution;
   send, via the communication interface, and to a second computer system, the order information created based on the trade information defining the one or more trades in the one or more complex assets for the one or more accounts administrated by the financial institution received from the first computer system associated with the financial institution,
      wherein sending the order information created based on the trade information defining the one or more trades in the one or more complex assets for the one or more accounts administrated by the financial institution received from the first computer system associated with the financial institution to the second computer system causes the second computer system to settle the one or more trades in the one or more complex assets for the one or more accounts administrated by the financial institution with the custodian different from the financial institution;
   receive, via the communication interface, and from the second computer system, activity-position information associated with the one or more complex assets; and
   send, via the communication interface, and to a tracking platform associated with the financial institution, the activity-position information associated with the one or more complex assets received from the second computer system,
      wherein sending the activity-position information associated with the one or more complex assets received from the second computer system to the tracking platform associated with the financial institution causes the tracking platform associated with the financial institution to:
         allocate changes identified in the activity-position information associated with the one or more complex assets received from the second computer system to one or more accountholders associated with the one or more accounts administrated by the financial institution; and
         post the changes identified in the activity-position information associated with the one or more complex assets received from the second computer system and allocated to the one or more accountholders associated with the one or more accounts administrated by the financial institution to one or more trading applications provided by the first computer system associated with the financial institution.

2. The system of claim 1, wherein the first computer system associated with the financial institution is configured to provide one or more trading user interfaces to one or more managed account advisors associated with the financial institution.

3. The system of claim 2, wherein the first computer system associated with the financial institution is configured to receive trade input specifying the one or more trades in the one or more complex assets for the one or more accounts administrated by the financial institution via the one or more trading user interfaces provided to the one or more managed account advisors associated with the financial institution.

4. The system of claim 1, wherein the first computer system associated with the financial institution is configured to provide one or more trading user interfaces to one or more financial advisors associated with the financial institution.

5. The system of claim 4, wherein the first computer system associated with the financial institution is configured to receive trade input specifying the one or more trades in the one or more complex assets for the one or more accounts administrated by the financial institution via the one or more trading user interfaces provided to the one or more financial advisors associated with the financial institution.

6. The system of claim 1, wherein the instructions further cause the system to:
   validate the trade information defining the one or more trades in the one or more complex assets for the one or more accounts administrated by the financial institution received from the first computer system associated with the financial institution, wherein validating the trade information defining the one or more trades in the one or more complex assets for the one or more accounts administrated by the financial institution received from the first computer system associated with the financial institution comprises accepting the one or more trades in the one or more complex assets for the one or more accounts administrated by the financial institution based on one or more processing rules associated with the one or more complex assets and based on one or more product rules associated with the one or more complex assets.

7. The system of claim 1, wherein the custodian holds one or more assets of the one or more accounts administrated by the financial institution in trust, such that the one or more assets of the one or more accounts administrated by the financial institution are held away from the financial institution.

8. The system of claim 1, wherein the tracking platform associated with the financial institution updates billing information, supervision information, and reconciliation information based on the activity-position information associated with the one or more complex assets received from the second computer system.

9. The system of claim 1, wherein the tracking platform associated with the financial institution allocates the changes identified in the activity-position information associated with the one or more complex assets received from the second computer system to the one or more accountholders associated with the one or more accounts administrated by the financial institution by updating records identifying specific participants as owning or having rights to specific assets that have changed in position.

10. A method, comprising:
   at a computing platform comprising at least one processor, memory, and a communication interface:
      receiving, by the at least one processor, via the communication interface, and from a first computer system associated with a financial institution, trade information defining one or more trades in one or more complex assets for one or more accounts administrated by the financial institution;
      creating, by the at least one processor, order information based on the trade information defining the one or more trades in the one or more complex assets for the one or more accounts administrated by the financial institution received from the first computer system associated with the financial institution,
         wherein creating the order information based on the trade information defining the one or more trades in the one or more complex assets for the one or more accounts administrated by the financial institution received from the first computer system associated with the financial institution comprises adding one or more indicators identifying a custodian different from the financial institution to the trade information defining the one or more trades in the one or more complex assets for the one or more accounts administrated by the financial institution received from the first computer system associated with the financial institution;
      sending, by the at least one processor, via the communication interface, and to a second computer system, the order information created based on the trade information defining the one or more trades in the one or more complex assets for the one or more accounts administrated by the financial institution received from the first computer system associated with the financial institution,
         wherein sending the order information created based on the trade information defining the one or more trades in the one or more complex assets for the one or more accounts administrated by the financial institution received from the first computer system associated with the financial institution to the second computer system causes the second computer system to settle the one or more trades in the one or more complex assets for the one or more accounts administrated by the financial institution with the custodian different from the financial institution;
      receiving, by the at least one processor, via the communication interface, and from the second computer system, activity-position information associated with the one or more complex assets; and
      sending, by the at least one processor, via the communication interface, and to a tracking platform associated with the financial institution, the activity-position information associated with the one or more complex assets received from the second computer system,
         wherein sending the activity-position information associated with the one or more complex assets received from the second computer system to the tracking platform associated with the financial institution causes the tracking platform associated with the financial institution to:
            allocate changes identified in the activity-position information associated with the one or more complex assets received from the second computer system to one or more accountholders associated with the one or more accounts administrated by the financial institution; and
            post the changes identified in the activity-position information associated with the one or more complex assets received from the second computer system and allocated to the one or more accountholders associated with the one or more accounts administrated by the financial institution to one or more trading applications provided by the first computer system associated with the financial institution.

11. The method of claim 10, wherein the first computer system associated with the financial institution is configured to provide one or more trading user interfaces to one or more managed account advisors associated with the financial institution.

12. The method of claim 11, wherein the first computer system associated with the financial institution is configured to receive trade input specifying the one or more trades in the one or more complex assets for the one or more accounts administrated by the financial institution via the one or more trading user interfaces provided to the one or more managed account advisors associated with the financial institution.

13. The method of claim 10, wherein the first computer system associated with the financial institution is configured to provide one or more trading user interfaces to one or more financial advisors associated with the financial institution.

14. The method of claim 13, wherein the first computer system associated with the financial institution is configured to receive trade input specifying the one or more trades in the one or more complex assets for the one or more accounts administrated by the financial institution via the one or more trading user interfaces provided to the one or more financial advisors associated with the financial institution.

15. The method of claim 10, further including validating, by the at least one processor, the trade information defining the one or more trades in the one or more complex assets for the one or more accounts administrated by the financial institution received from the first computer system associated with the financial institution, wherein validating the trade information defining the one or more trades in the one or more complex assets for the one or more accounts administrated by the financial institution received from the first computer system associated with the financial institution comprises accepting the one or more trades in the one or more complex assets for the one or more accounts administrated by the financial institution based on one or more processing rules associated with the one or more complex assets and based on one or more product rules associated with the one or more complex assets.

16. The method of claim 10, wherein the custodian holds one or more assets of the one or more accounts administrated by the financial institution in trust, such that the one or more assets of the one or more accounts administrated by the financial institution are held away from the financial institution.

17. The method of claim 10, wherein the tracking platform associated with the financial institution updates billing information, supervision information, and reconciliation information based on the activity-position information associated with the one or more complex assets received from the second computer system.

18. The method of claim 10, wherein the tracking platform associated with the financial institution allocates the changes identified in the activity-position information associated with the one or more complex assets received from the second computer system to the one or more accountholders associated with the one or more accounts administrated by the financial institution by updating records identifying specific participants as owning or having rights to specific assets that have changed in position.

19. One or more non-transitory computer-readable media storing instructions that, when executed by a computer system comprising at least one processor, memory, and a communication interface, cause the computer system to:
receive, via the communication interface, and from a first computer system associated with a financial institution, trade information defining one or more trades in one or more complex assets for one or more accounts administrated by the financial institution;
create order information based on the trade information defining the one or more trades in the one or more complex assets for the one or more accounts administrated by the financial institution received from the first computer system associated with the financial institution,
wherein creating the order information based on the trade information defining the one or more trades in the one or more complex assets for the one or more accounts administrated by the financial institution received from the first computer system associated with the financial institution comprises adding one or more indicators identifying a custodian different from the financial institution to the trade information defining the one or more trades in the one or more complex assets for the one or more accounts administrated by the financial institution received from the first computer system associated with the financial institution;
send, via the communication interface, and to a second computer system, the order information created based on the trade information defining the one or more trades in the one or more complex assets for the one or more accounts administrated by the financial institution received from the first computer system associated with the financial institution,
wherein sending the order information created based on the trade information defining the one or more trades in the one or more complex assets for the one or more accounts administrated by the financial institution received from the first computer system associated with the financial institution to the second computer system causes the second computer system to settle the one or more trades in the one or more complex assets for the one or more accounts administrated by the financial institution with the custodian different from the financial institution;
receive, via the communication interface, and from the second computer system, activity-position information associated with the one or more complex assets; and
send, via the communication interface, and to a tracking platform associated with the financial institution, the activity-position information associated with the one or more complex assets received from the second computer system,
wherein sending the activity-position information associated with the one or more complex assets received from the second computer system to the tracking platform associated with the financial institution causes the tracking platform associated with the financial institution to:
allocate changes identified in the activity-position information associated with the one or more complex assets received from the second computer system to one or more accountholders associated with the one or more accounts administrated by the financial institution; and
post the changes identified in the activity-position information associated with the one or more complex assets received from the second computer system and allocated to the one or more accountholders associated with the one or more accounts administrated by the financial institution to one or more trading applications provided by the first computer system associated with the financial institution.

20. The one or more non-transitory computer-readable media of claim 19, wherein the tracking platform associated with the financial institution allocates the changes identified in the activity-position information associated with the one or more complex assets received from the second computer system to the one or more accountholders associated with the one or more accounts administrated by the financial institution by updating records identifying specific participants as owning or having rights to specific assets that have changed in position.

* * * * *